US007840803B2

(12) United States Patent
Clarke et al.

(10) Patent No.: US 7,840,803 B2
(45) Date of Patent: Nov. 23, 2010

(54) AUTHENTICATION OF INTEGRATED CIRCUITS

(75) Inventors: Dwaine Clarke, Christ Church (BB);
Blaise Gassend, San Carlos, CA (US);
Marten Van Dijk, Cambridge, MA (US); Srinivas Devadas, Lexington, MA (US)

(73) Assignees: Massachusetts Institute of Technology, Cambridge, MA (US); Intrinsic ID B.V., Eindhoven (NL)

( * ) Notice: Subject to any disclaimer, the term of this patent is extended or adjusted under 35 U.S.C. 154(b) by 1686 days.

(21) Appl. No.: 10/407,603

(22) Filed: Apr. 4, 2003

(65) Prior Publication Data

US 2003/0204743 A1    Oct. 30, 2003

Related U.S. Application Data

(60) Provisional application No. 60/373,140, filed on Apr. 16, 2002, provisional application No. 60/387,373, filed on Jun. 10, 2002, provisional application No. 60/444,910, filed on Feb. 3, 2003, provisional application No. 60/444,906, filed on Feb. 3, 2003.

(51) Int. Cl.
*G08B 29/00* (2006.01)
*G06F 21/02* (2006.01)
*H01L 23/58* (2006.01)

(52) U.S. Cl. .................. 713/168; 380/232; 726/34; 257/E23.179

(58) Field of Classification Search .................. 713/168; 380/232
See application file for complete search history.

(56) References Cited

U.S. PATENT DOCUMENTS

| 4,558,176 | A | * | 12/1985 | Arnold et al. ............... 713/190 |
| 4,985,614 | A | * | 1/1991 | Pease et al. ................. 235/440 |
| 5,177,352 | A | | 1/1993 | Carson et al. |
| 5,180,901 | A | | 1/1993 | Hiramatsu |
| 5,204,902 | A | * | 4/1993 | Reeds et al. ................ 380/248 |
| 5,247,577 | A | | 9/1993 | Bailey et al. |

(Continued)

FOREIGN PATENT DOCUMENTS

CA    2344429    3/2000

(Continued)

OTHER PUBLICATIONS

Arazi, B. "Interleaving Security and Efficiency Considerations In The Design of Inexpensive IC Cards". IEEE Proceedings on Computers and Digital Techniques. vol. 141, Issue 5. Pub. date: Sep. 1994. Relevant pp. 265-270. Found on the World Wide Web at: http://ieeexplore.ieee.org/stamp/stamp.jsp?tp=&arnumber=326786.*

(Continued)

*Primary Examiner*—William R Korzuch
*Assistant Examiner*—Jeremiah Avery
(74) *Attorney, Agent, or Firm*—Occhiuti Rohlicek & Tsao LLP

(57) ABSTRACT

A group of devices are fabricated based on a common design, each device having a corresponding plurality of measurable characteristics that is unique in the group to that device, each device having a measurement module for measuring the measurable characteristics. Authentication of one of the group of devices is enabled by selective measurement of one or more of the plurality of measurable characteristics of the device.

17 Claims, 50 Drawing Sheets

U.S. PATENT DOCUMENTS

| | | | |
|---|---|---|---|
| 5,375,169 A | 12/1994 | Seheidt et al. | |
| 5,388,157 A | 2/1995 | Austin | |
| 5,528,231 A | 6/1996 | Patarin | |
| 5,768,382 A * | 6/1998 | Schneier et al. | 380/251 |
| 5,818,738 A | 10/1998 | Effing | |
| 5,883,956 A | 3/1999 | Le et al. | |
| 5,896,300 A | 4/1999 | Raghavan et al. | |
| 5,920,628 A * | 7/1999 | Indeck et al. | 360/25 |
| 6,026,293 A * | 2/2000 | Osborn | 455/411 |
| 6,049,624 A * | 4/2000 | Wilson et al. | 382/145 |
| 6,161,213 A | 12/2000 | Lofstrom | |
| 6,246,254 B1 | 6/2001 | Choukalos et al. | |
| 6,289,292 B1 | 9/2001 | Charlton et al. | |
| 6,289,453 B1 * | 9/2001 | Walker et al. | 713/175 |
| 6,289,455 B1 | 9/2001 | Kocher et al. | |
| 6,301,695 B1 | 10/2001 | Burnham et al. | |
| 6,305,005 B1 | 10/2001 | Burnham | |
| 6,324,676 B1 | 11/2001 | Burnham et al. | |
| 6,363,485 B1 | 3/2002 | Adams | |
| 6,366,585 B1 * | 4/2002 | Dapper et al. | 370/409 |
| 6,386,456 B1 | 5/2002 | Chen et al. | |
| 6,402,028 B1 | 6/2002 | Graham, Jr. et al. | |
| 6,535,016 B2 | 3/2003 | Choukalos et al. | |
| 6,553,558 B2 | 4/2003 | Palmer et al. | |
| 6,640,305 B2 | 10/2003 | Kocher et al. | |
| 6,708,273 B1 | 3/2004 | Ober et al. | |
| 6,738,788 B1 | 5/2004 | Horng et al. | |
| 6,802,447 B2 | 10/2004 | Horng | |
| 6,813,599 B1 | 11/2004 | Court et al. | |
| 6,848,049 B1 * | 1/2005 | Tailliet | 713/168 |
| 6,898,708 B2 | 5/2005 | Hori et al. | |
| 6,941,180 B1 * | 9/2005 | Fischer et al. | 700/94 |
| 6,941,536 B2 | 9/2005 | Muranaka | |
| 6,966,022 B1 | 11/2005 | Stenfort et al. | |
| 7,005,733 B2 | 2/2006 | Kommerling et al. | |
| 7,110,982 B2 * | 9/2006 | Feldman et al. | 705/51 |
| 7,131,001 B1 | 10/2006 | Johnson | |
| 7,143,436 B2 * | 11/2006 | Yamaguchi et al. | 726/6 |
| 7,191,339 B1 | 3/2007 | Trimberger | |
| 7,191,340 B2 | 3/2007 | Wuidart et al. | |
| 7,216,232 B1 | 5/2007 | Cox | |
| 7,243,236 B1 | 7/2007 | Sibert | |
| 7,249,108 B1 | 7/2007 | Walmsley et al. | |
| 7,251,730 B2 * | 7/2007 | Rose et al. | 713/176 |
| 7,316,934 B2 * | 1/2008 | Mangell | 438/7 |
| 2001/0032318 A1 | 10/2001 | Yip | |
| 2001/0033012 A1 | 10/2001 | Kömmerling et al. | |
| 2002/0095594 A1 | 7/2002 | Dellmo et al. | |
| 2002/0106087 A1 | 8/2002 | Lotspiech et al. | |
| 2002/0107798 A1 | 8/2002 | Hameau et al. | |
| 2002/0128983 A1 | 9/2002 | Wrona et al. | |
| 2002/0150252 A1 | 10/2002 | Wong | |
| 2002/0188857 A1 | 12/2002 | Orlando et al. | |
| 2002/0199110 A1 | 12/2002 | Kean | |
| 2003/0140241 A1 | 7/2003 | England et al. | |
| 2003/0204731 A1 | 10/2003 | Pochuev et al. | |
| 2003/0219121 A1 | 11/2003 | Van Someren | |
| 2004/0148509 A1 | 7/2004 | Wu | |
| 2005/0051351 A1 | 3/2005 | De Jongh et al. | |

FOREIGN PATENT DOCUMENTS

| | | |
|---|---|---|
| DE | 19843424 | 3/2000 |
| EP | 1100058 | 5/2001 |
| EP | 1 341 214 | 9/2003 |
| WO | WO 00/17826 | 3/2000 |
| WO | 01/50530 | 7/2001 |
| WO | WO 02/13452 | 2/2002 |
| WO | 02/45139 | 6/2002 |
| WO | WO03/107201 | 12/2003 |
| WO | WO2007/036024 | 4/2007 |

OTHER PUBLICATIONS

Srinivas Devadas et al. "Synthesis of Robust Delay-Fault Testable Circuits: Practice". Massachusetts Institute of Technology, Cammbridge, MA. Mar. 1992.

Srinivas Devadas et al. "Synthesis of Robust Delay-Fault Testable Circuits: Theory". Massachusetts Institute of Technology, Cammbridge, MA. Jan. 1992.

Duane S. Boning et al. "Models of Process Variations in Device and Interconnect". Massachusetts Institute of Technology, Cambridge, MA. Aug. 23, 1999.

Bennet Yee. "Using Secure Coprocessors". Carnegie Mellon University, Pittsburgh, PA. May 1994.

Hon-Sum Wong et al. "Three-Dimensional "Atomistic" Simulation of Discrete Random Dopant Distribution Effects in Sub-0.1$\mu m$ MOSFET's".IEDM, 29(2):705-708, 1993.

Sean W. Smith et al. "Building a High-Performance, Programmable Secure Coprocessor". IBM T.J. Watson Research Center, Yorktown Heights, NY. Oct. 16, 1998.

Pappu Srinivasa Ravikanth. "Physical One-Way Functions". Massachusetts Institute of Technology, Cambridge, MA. Mar. 2001.

Ross Anderson et al. "Low Cost Attacks on Tamper Resistant Devices". Cambridge University, Cambridge, England. Apr. 1997.

Ross Anderson et al. "Tamper Resistance—a Cautionary Note". Cambridge University, Cambridge, England. Nov. 1996.

Omura, J.K., Novel Applications of Cryptogrtaphy in Digital Communications, IEEE Comm. Mag., May 1990, pp. 21-29.

Milor et al., "Logic Product Speed Evaluation and Forecasting During the Early Phases of Process Technology Development Using Ring Oscillator Data", AMD, Sunnyvale, CA (Abstract), (1997).

Ranasinghe et al., "Security and Provacy Solutions for Low-Cost RFID Systems," (2004).

* cited by examiner

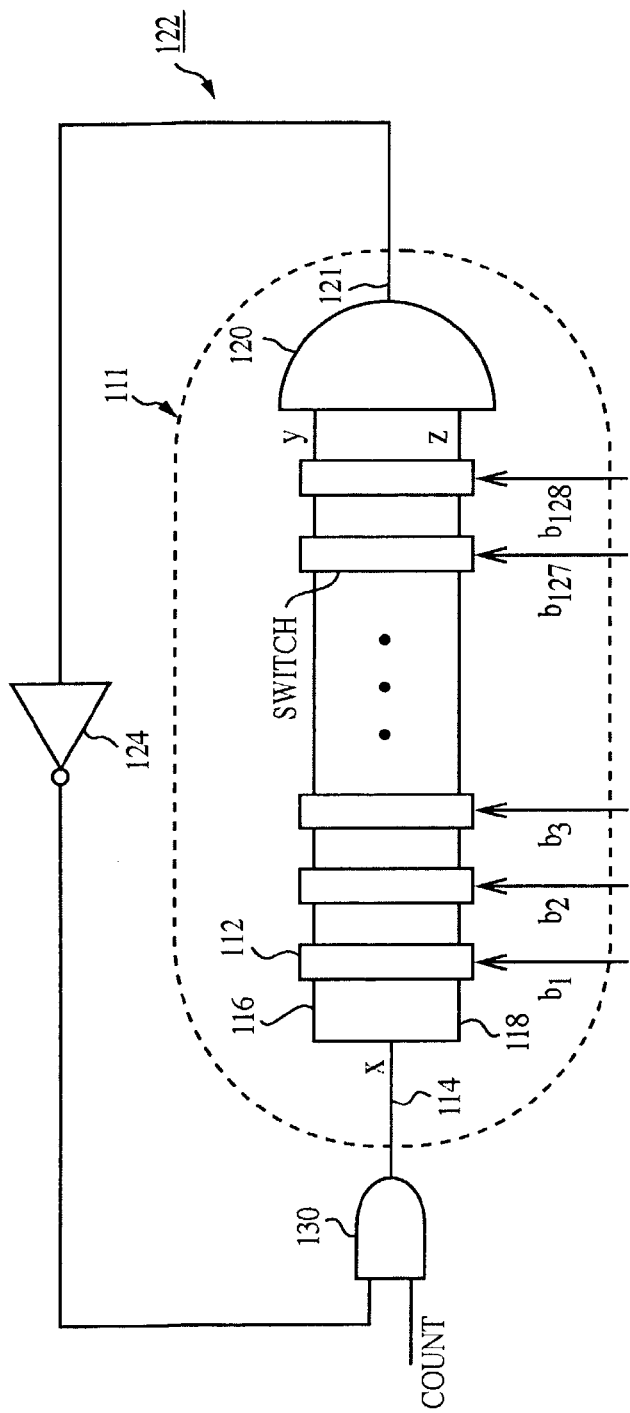
FIG. 4
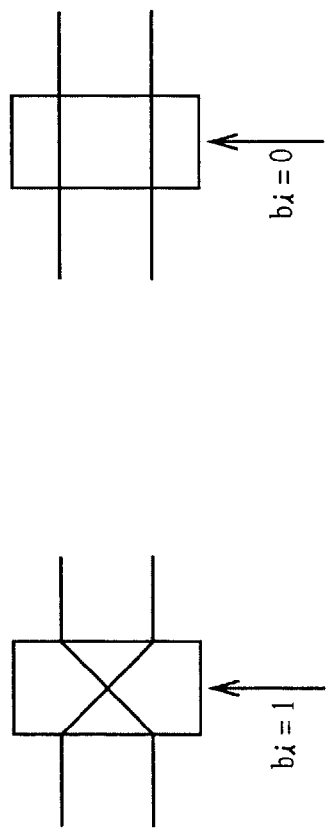
FIG. 5
FIG. 6

```
/* Various values encrypted with OwnerSecret. */
ESeed = ...
EPreChallengeSeed = ...
EUserPubKey = ...
ECertChallenge = ...

begin program
     OwnerSecret = GetSecret(OwnerChallenge);
     Seed = Decrypt(ESeed, OwnerSecret);
     PreChallengeSeed =
          Decrypt(EPreChallengeSeed, OwnerSecret);
     UserPubKey =
          Decrypt(EUserPubKey, OwnerSecret);
     CertChallenge =
          Decrypt(ECertChallenge, OwnerSecret);
     CertSecret = GetSecret(CertChallenge);
     PreChallenge =
          Hash(UserPubKey, PreChallengeSeed);
     NewChallenge = HashWithProg(PreChallenge);
     ChangePersonality(Seed);
     NewResponse = GetResponse(PreChallenge);
     Mesg1 = (NewChallenge, NewResponse);
     Mesg2 = PublicEncrypt(Msg1, UserPubKey);
     Mesg3 = (Mesg2, MAC(Mesg2, OwnerSecret));
     Mesg4 = Blind(Mesg3, OwnerSecret);
     Mesg5 = (Mesg4, MAC(Mesg4, CertSecret));
     Mesg6 = EncryptAndMAC(Mesg5, OwnerSecret);
     Output(Mesg6);
end program
```

FIG. 31

AUTHENTICATION OF INTEGRATED CIRCUITS

RELATED APPLICATIONS

This application claims priority to U.S. Provisional Application Ser. No. 60/373,140, filed Apr. 16, 2002, U.S. Provisional Application Ser. No. 60/387,373, filed Jun. 10, 2002, U.S. Provisional Application Ser. No. 60/444,910, filed Feb. 3, 2003, and U.S. Provisional Application Ser. No. 60/444,906, filed Feb. 3, 2003, the contents of which are incorporated herein by reference.

This invention was developed with government support under Grant No. N66001-99-2-891702, awarded by the Navy. The government has certain rights in the invention.

TECHNICAL FIELD

This invention relates to authentication of integrated circuits.

BACKGROUND

Integrated circuits that are fabricated using the same lithography masks can be uniquely identified by embedding a unique identifier in the chip, such as a serial number embedded in the chip by the manufacturer. Another example of generating a unique identifier is to incorporate an array of transistors in the chip, measure the threshold voltages of the transistors in the array, and output the measurements as the identifier. For a given number of chips made from the same lithography masks, if the number of transistors in the array is large enough, the identifiers generated from the array will be unique. Due to process variations in the fabrication of the chip, no two chips will have arrays of transistors whose threshold voltages are exactly the same.

A unique identifier that is secretly embedded in a chip can be used to authenticate the chip. Authentication means proving to a user that the chip is not a counterfeit, or proving that certain processing results are processed by the chip and not some other chip. An example of a unique identifier is a secret key embedded in a smartcard. A card reader reads the secret key from the smartcard and compares it with a secret key previously stored in a database. If there is a match, the smartcard is authenticated, and the card reader can proceed to transact with the smartcard. The secret key needs to remain secret so that an adversary cannot duplicate the key and falsify identity.

An adversary may probe the chip to attempt to find the secret key using invasive methods, e.g., removal of the package and layers of the integrated circuit, or non-invasive methods, e.g., differential power analysis that attempts to determine the key by stimulating the integrated circuit chip and observing the power and ground rails. To prevent physical invasion of the chip, sensing circuitry may be included in the packaging of the chip to detect intrusion and erase sensitive information upon detection of intrusion.

SUMMARY

By designing an integrated circuit chip with a large set of measurable physical characteristics that are difficult to duplicate accurately, it is possible to authenticate the chip by selectively measuring a subset of the physical characteristics and comparing the measured results with pre-stored measurements. If they match, the chip is authenticated. The chip can be designed so that the number of measurable physical characteristics is sufficiently large such that it is impractical for an adversary to measure all of the physical characteristics exhaustively and store the measured results. The chip can also be configured so that it is difficult for the adversary to create a model of the chip by measuring a subset of the physical characteristics. Because the adversary cannot know in advance which subset of physical characteristics will be chosen and measured, the adversary cannot falsify the identity of the chip by producing correct measurements in response to challenges. The identity of the chip can be obtained only if the adversary is in possession of the chip. The secret key or keys to authenticating the chip is inseparable from the chip itself.

In general, in one aspect, the invention features a method that includes providing a first device from a group of devices fabricated based on a common design, each device having a corresponding plurality of measurable characteristics that is unique in the group to that device, each device having a measurement module for measuring the measurable characteristics. The method further includes enabling authentication of the first device by selective measurement of one or more of the plurality of measurable characteristics of the device.

Implementations of the invention may include one or more of the following features. Enabling authentication of the first device includes enrolling the first device by transmitting selection information to the first device, receiving from the first device response information generated by selective measurement of one of the plurality of characteristics based on the selection information, and storing the received response information in association with the first device and the selection information. Enabling authentication of the first device further includes authenticating the first device by repeating the steps of transmitting the selection information to the first device, receiving response information generated by the selective measurement of the one of the characteristics, and comparing the received response information with the stored response information.

Each of enrolling the first device and authenticating the first device includes selectively measuring the one of the plurality of characteristics based on the selection information and generating the measurement information. The method further includes enrolling each of the group of devices, including for each of the devices: transmitting selection information to the device that identifies a subset of the measurable characteristics, receiving from the device response information generated by selective measurement of each of the subset of measurable characteristics identified in the selection information, and storing the received response information in association with the first device and the selection information.

The method further includes determining a different subset of the measurable characteristics for each of the devices. Determining the different subset for each device includes randomly choosing the members of each of the subsets. The method further includes authenticating the first device, including: transmitting selection information to the first device that identifies one of the subset of measurable characteristics for the first device, receiving from the first device response information generated by selective measurement of the identified one of the subset of measurable characteristics, and comparing the received response information with the stored response information received during enrollment of the first device.

The method further includes fabricating the devices in the group of devices according to a common design. Fabricating the devices includes fabricating the group of devices according to a common set of lithography masks. The corresponding plurality of measurable characteristics of the devices include characteristics determined during fabrication of the devices.

The characteristics determined during fabrication of the devices include uncontrolled characteristics of a fabrication process. Providing the first device from the group of devices includes providing a first integrated circuit.

The corresponding plurality of measurable characteristics include delay characteristics of a plurality of signal paths in the integrated circuit. The plurality of signal paths include multiple paths through each of a set of circuit components. The circuit components include passive transmission lines. The circuit components include active semiconductor elements. The active semiconductor elements include logic gates. The corresponding plurality of measurable characteristics comprise optical characteristics. The optical characteristics include reflection characteristics. The reflection characteristics include speckle patterns.

The number of measurable characteristics of each device may be greater than 2, 4, 16, 256, $2^{16}$, $2^{32}$, $2^{64}$, or $2^{128}$. Each device includes a functional component and a measurable component that have the plurality of measurable characteristics. The method further includes packaging the device in a package. The functional component and the measurable component are disposed in the package in a way such that the functional component cannot be physically accessed without altering the plurality of measurable characteristics.

The method further includes receiving a selection signal at the first device encoding selection information that includes an identifier, and selecting one of the plurality of measurable characteristics using the identifier. Selecting the one of the measurable characteristics includes applying a one-way function using the identifier as an argument. Applying the one-way function further uses a second identifier as an argument. The second identifier includes an identification of the device. The identification of the device includes a serial number stored in the device. The second identifier includes an identification of a personality.

The method further includes measuring the selected characteristic. The selected characteristic includes a delay characteristic of a selected signal path. Measuring the delay characteristic includes generating an oscillating signal using the selected delay path. Measuring the delay characteristic further includes determining a quantity related to an oscillation frequency of the oscillating signal. Determining the quantity related to the oscillation frequency includes counting a number of oscillations during a timed interval. Determining the quantity related to the oscillation frequency includes applying a phase-locked loop to the oscillating signal. Measuring the selected characteristic includes compensating for variations in the measurement of the selected characteristic due to changes in an environment of the device.

The method further includes measuring a reference characteristic, and computing a ratio of a measurement of the selected characteristic to a measurement of the reference characteristic. The method further includes correcting errors in a measurement of the selected characteristic. The method further includes determining response information using the measured characteristic, and transmitting a response signal from the first device encoding the response information. Determining the response information includes applying a one-way function using the measured characteristic as an argument. The method further includes providing a result signal encoding a result generated by the device, and wherein applying the one-way function further uses an argument determined from the result. The method further includes accepting code for executing an operation on a processor in the device, and wherein applying the one-way function further uses an argument determined from the code.

The method further includes accepting a command for execution in the device, and wherein applying the one-way function further uses an argument determined from the command. Providing the response signal includes providing an acknowledgement that the command was executed in the device. The method further includes accepting a second selection signal at the first device encoding a second identifier, measuring a second of the characteristics selected according to the second identifier, and providing a result signal encoding the measurement of the second of the characteristics. Applying the one-way function further uses an argument determined from the measurement of the second of the characteristics.

The method further includes receiving a selection signal at the first device encoding selection information that includes an identifier, selecting a first one of the plurality of measurable characteristics using the identifier, and selecting a second one of the plurality of measurable characteristics also using the identifier. The method further includes measuring the first selected characteristic to generate a first measurement, measuring the second selected characteristic to generate a second measurement, and comparing the first measurement to the second measurement. The method further includes generate a one-bit response according to the comparison of the first and second measurements. The method further includes generating an n-bit response by repeating n−1 times the steps of receiving a selection signal encoding selection information that includes an identifier, selecting a first one and a second one of the plurality of measurable characteristics using the identifier, measuring the first one and second one of the measurable characteristics to generate a first measurement and a second measurement, and comparing the first and second measurements to generate one bit of the n-bit response.

The method further includes in a first operating mode, accepting a first selection signal at the first device encoding a first identifier, applying a first one-way function using the first identifier as an argument, selecting one of the plurality of characteristic using the result of the first one-way function, measuring the selected characteristic, and providing a first response signal that encodes an identifier of the selected characteristic and the measured characteristic. In a second operating mode, accepting a second selection signal at the first device encoding a second identifier, selecting one of the plurality of characteristic using the second identifier, measuring the selected characteristic, applying a second one-way function using the measured characteristic as an argument, and providing a second response signal that encodes the result of applying the second one-way function. The second identifier is the same as the result of applying the first one-way function using the first identifier as an argument.

In general, in another aspect, the invention features a method that includes providing a first device from a group of devices fabricated based on a common design, each device having a corresponding plurality of measurable characteristics that is unique in the group to that device, the measurable characteristics having discrete values. The method further includes enabling authentication of the first device by selective measurement of one or more of the plurality of measurable characteristics of the device. The corresponding plurality of measurable characteristics include delay characteristics of a plurality of signal paths in the first device. The corresponding plurality of measurable characteristics include optical characteristics.

In general, in another aspect, the invention features a method that includes providing a first device from a group of devices fabricated based on a common design, each device having a corresponding plurality of measurable characteristics that is unique in the group to that device, each device having a processor. The method further includes selectively measuring one or more of the plurality of measurable characteristics of the first device, accepting code for executing an operation on a processor of the first device, and applying a one-way function using a first argument determined from the code.

Implementations of the invention may include one or more of the following features. Applying the one-way function further includes using a second argument determined from a measured characteristic. The code includes a public encryption key. The method further includes determining the second argument by using the public encryption key to encrypt a value derived from the measured characteristic. The code includes selection information that identifies a subset of the measurable characteristics. Selectively measuring one or more of the plurality of measurable characteristics includes selectively measuring each of the subset of measurable characteristics identified by the selection information. Applying the one-way function further includes using a second argument determined from the selection information. The corresponding plurality of measurable characteristics include delay characteristics of a plurality of signal paths in the first device.

In general, in another aspect, the invention features a method that includes providing a first device from a group of devices fabricated based on a common design, each device having a corresponding plurality of electrically measurable characteristics that is unique in the group to that device. The method further includes enabling authentication of the first device by selective measurement of one or more of the plurality of measurable characteristics of the device.

Implementations of the invention may include one or more of the following features. The corresponding plurality of measurable characteristics include delay characteristics of a plurality of signal paths in the first device.

In general, in another aspect, the invention features an apparatus that includes a device selected from a group of devices fabricated based on a common design, each device in the group having a corresponding plurality of measurable characteristics that is unique in the group to that device, the device including a measuring component that measures a selected characteristic.

Implementations of the invention may include one or more of the following features. The device includes an integrated circuit. The integrated circuit includes signal paths, and the plurality of measurable characteristics comprise the delay characteristics of the signal paths. The integrated circuit comprise a set of circuit components, and the signal paths include paths through each of a set of the circuit components. The device further includes a processor. The processor implements a one-way function. The device includes an array of light emitting components, an array of light detection components, and a light transmission medium that creates a speckle pattern that can be detected by the array of light detection components when one or more of the light emitting components are emitting light. The apparatus further includes a storage device to store identifiers and responses associated with the device, each identifier identifying one or more measurable characteristics, each response corresponding to one or more identifiers and is derived from one or more measurements of the measurable characteristics identified by the one or more identifiers.

Other features and advantages of the invention will be apparent from the description and drawings, and from the claims.

DESCRIPTION OF DRAWINGS

FIG. 4 shows a delay circuit.

FIGS. 5 and 6 show switches used in the delay circuit of FIG. 4.

FIG. 31 shows a program for anonymous introduction.

Like reference symbols in the various drawings indicate like elements.

DETAILED DESCRIPTION

IC Implemented PUF

Figure 1:
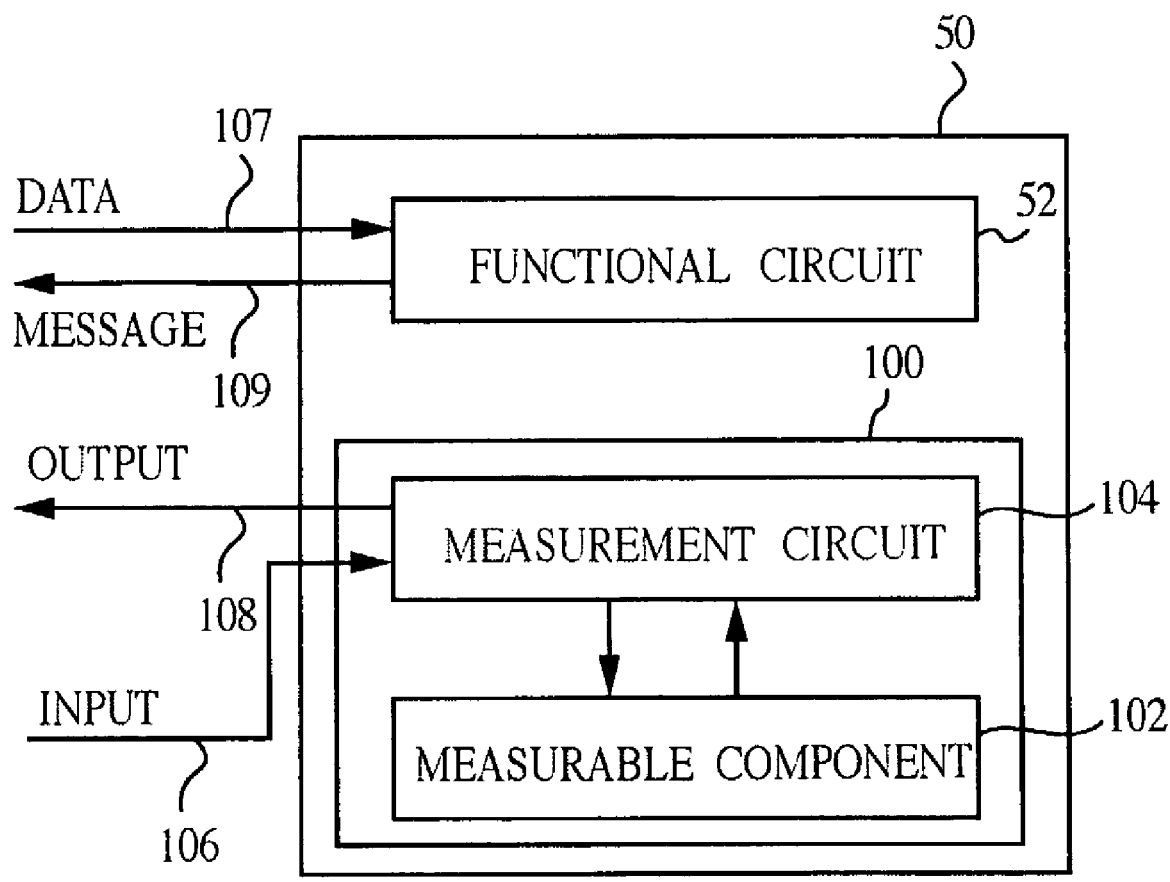
FIG. 1 shows a chip that implements a physical random function (PUF).

Referring to FIG. 1, a semiconductor integrated circuit (referred to below as an "IC" or a "chip") 50 includes a functional module 52 and a physical random function (also called a physical unknown function, or "PUF") circuit 100. Chip 50 is a specific instance of a chip that has been fabricated according to a chip design, for example, according to a set of lithography masks, for the chip.

PUF circuit 100 is an implementation of a physical random function (PUF) that maps an input to an output in a way that is difficult to predict based on the design of the chip, such as based on a lithography mask for fabricating the chip, or based on a non-destructive physical inspection of the chip. The mapping of inputs to outputs by a PUF circuit does not necessarily have to be truly "random" such that the outputs of the PUF circuit are evenly distributed among the range of all possible outputs. For example, depending on the fabrication of a particular PUF circuit, it is possible that the outputs generated by that PUF circuit are more concentrated around particular values. Functional module 52 implements a desired operation of the chip, for example by receiving data on an input line 107, processing the data, and generating a message based on the processing of the data on a message line 109.

PUF circuit 100 receives an input on a signal line 106 and generates an output on line 108. Each (input, output) pair is specific to chip 50 and depends on characteristics of a portion of the physical structure associated with chip 50. Different chips fabricated using the same lithography masks will in general have somewhat different physical structure, for instance due to small variations in the fabrication process. Therefore, such different chips will, in general, map the same PUF input to different outputs. As is described more fully below, the (input, output) pairs can be used to authenticate and identify chip 50 or to prove that the message is generated by a particular chip, i.e., chip 50, and not by a counterfeit chip.

In the description below, the term "PUF" refers to the physical random function that maps inputs to outputs, and the term "PUF circuit" refers to the circuit that implements the function. The term "PUF $f$ circuit" refers to a circuit that implements a particular physical random function $f$. The term "PUF chip" refers to a chip that includes a PUF circuit.

Chip 50 is fabricated using a set of lithography masks that define the circuit patterns of chip 50. When the same lithography masks are used to produce a set of chips, due to slight variations in the manufacturing process, in general, no two chips are exactly alike. There will be slight variations in various parameters (e.g., length and width of conducting wires, concentration of doping regions, thickness of dielectric layers) within each chip as well as across different chips. Functional module 52 is designed to be sufficiently robust so that despite of the variations in the parameters, the functions performed by the functional module 52 remain the same for all chips made from the same set of lithography masks. PUF circuit 100, on the other hand, is designed to take advantage of the variations in the various parameters across different chips. The "function" of PUF circuit 100 is, in general, different for different chips fabricated using the same set of lithography masks. Different PUF circuits 100 fabricated using the same set of lithography masks in general map the same input to different outputs.

PUF circuit 100 includes a measurable component 102 and a measurement circuit 104. The function implemented by PUF circuit 100 depends on a large number of separate physical characteristics in measurable component 102 that are combined according to the input to the PUF to determine the output of the PUF. Measurement circuit 104 is designed to measure the combinations of physical characteristics to determine the output. The output may represent a processed version of the actual measurements, where the processing is designed to reduce or correct measurement errors and effects of environmental conditions, as well as to mask actual physical parameters. The individual physical characteristics are difficult to predict or measure by physical inspection of the device, and even if known, would be difficult, if not impossible, to duplicate accurately in a copy of chip 50.

Authentication

One application of PUF circuit 100 of chip 50 is to authenticate the identity of the chip. In this application, a subset of the possible (input, output) pairs for the PUF are first determined by providing different inputs on signal line 106 to PUF circuit 100 and recording the corresponding outputs on signal line 108. The inputs are chosen so that the PUF circuit uses a variety of combinations of the separate physical characteristics. The outputs of the PUF circuit are kept secret, as is the set of inputs that have been used.

At the time the identity of chip 50 is to be authenticated, one of the inputs for which a corresponding output has been recorded and kept secret is provided as an input on signal line 106 to PUF circuit 100. The output on output line 108 of PUF circuit 100 is compared with the stored corresponding output. If they match, the chip is authenticated. Such an input is termed a "challenge" and the output is termed the "response" to the challenge. In general, the challenges and responses are discrete values represented as binary numbers.

Upon every successful authentication of a given chip, a set of challenge-response pairs is potentially revealed to an adversary. The same challenge-response pair is preferably not reused. A database of challenge-response pairs is maintained by the person who wishes to identify the chip. This database need only cover a small subset of all the possible challenge-response pairs. If the database runs out of challenge-response pairs, new challenge-response pair may be generated from the chip using methods described later.

Figure 2:
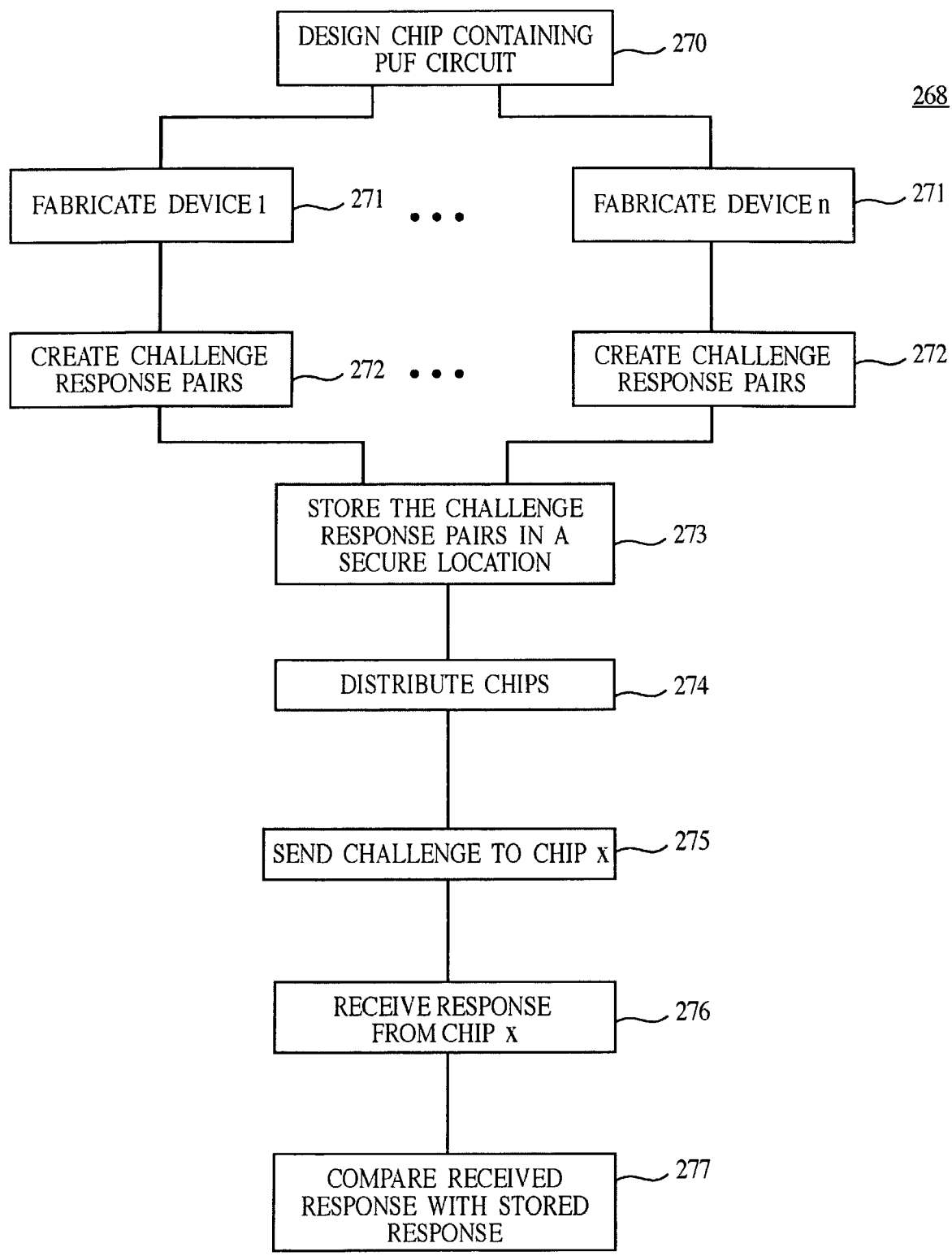
FIG. 2 shows a process for using PUF circuits to authenticate chips.

FIG. 2 shows a process 268 that illustrates a general approach for using PUF circuits to authenticate chips. Process 268 includes the following steps:

Step 270: A manufacturer designs chip 50 that includes PUF circuit 100. A set of lithography masks containing patterns for fabricating the chip is generated based on the chip design.

Step 271: The manufacturer uses the set of lithography masks to fabricate n chips. Each chip contains a PUF circuit that is made from the same patterns on the lithography masks, but due to random variations in the fabrication process, have different measurable physical characteristics.

Step 272: A set of challenge-response pairs is generated for each chip.

Step 273: The challenge-response pairs are stored in a secure location.

Step 274: The chips are distributed to chip owners.

Step 275: When a chip X (one of the n fabricated) needs to be authenticated, a challenge response pair associated with chip X is retrieved from the secure location. The challenge is sent to the chip.

Step 276: A response is received from the chip.

Step 277: The response received from the chip is compared with the response retrieved from the secure location. If the responses match, the chip is authenticated.

In one example, steps 270 and 271 are performed by a manufacturer of the chips, and steps 272 to 277 are performed by an entity (e.g., a bank) who wishes to distribute the chips to its customers and later authenticate the chips to determine whether to grant access to services.

In another example, after the chips are fabricated, the chips are distributed to chip owners. A chip owner may create a set of challenge response pairs, and distribute the set of challenge response pairs to an end user. The end users may use the challenge response pairs received from the chip owner to generate new challenge response pairs that are known only to the end user.

Chip 50 can be embedded into a smartcard to allow authentication of the identity of the smartcard, allowing a card holder to gain access to services provided by a smartcard company. Each smartcard has a serial number, and the smartcard company has a set of challenge response pairs associated with each serial number. When the smartcard is presented to a card reader, the card reader selects one or more challenges based on the smartcard serial number. The challenges are sent to chip 50, which generates one or more responses and sends them back to the card reader. The card reader compares the received responses with the stored responses. If the responses match, the smartcard is authenticated, meaning that the smartcard contains a chip that is the same chip originally used to generate the challenge response pairs.

Chip 50 can also be used in "certified executions." An owner of chip 50 allows end users to gain access to the chip to process data and generate a computation result. The owner distributes a set of challenge-response pairs (CRPs) to an end user to allow him to gain access to the processing powers of a chip. The end user sends challenges to the chip and receives responses from the chip to verify that the computation results are indeed produced by the chip and not by some other counterfeit chip.

In the above smartcard and certified execution applications, an adversary may intercept the challenges and responses transmitted to and received from chip 50 and launch various types of attacks. This can be prevented by using control algorithms that will be described in more detail later.

The output of PUF circuit 100 is based on a combination of physical characteristics that are selected by the input. PUF circuit 100 is designed so that the number of combinations (or the number of possible inputs) is sufficiently large such that it is impractical for an adversary who is in possession of chip 50 to measure and store all of the (input, output) pairs exhaustively. Therefore, it is not practical for an adversary to copy the functionality of chip 50, including the functionality of PUF circuit 100, for example, by storing all the possible (input, output) pairs in the copy. As long as the subset of possible inputs that were initially used to record valid (input, output) pairs has been kept secret from the adversary, and that subset cannot be predicted by the adversary, the adversary cannot practically measure all the (input, output) pairs that would be needed to later mimic the behavior of chip 50.

Each combination of physical characteristics can be seen as one of a large number of "signatures" of the chip that can be used to authenticate the identity of the chip. By using variations in the chip due to fabrication process variations, it is possible to store a large number of signatures on the chip without the need to store any signature information in storage devices, such as registers or memory cells. The signatures are associated with the wiring and components of the PUF chip, which cannot be duplicated accurately, and are not stored so that it can be read out by an adversary.

PUF circuit 100 is designed so that it is difficult for the adversary to create a model of the PUF circuit by physical inspection or measurement of chip 50 and to later mimic the behavior of chip 50 based on such a model. The measurement of the combination of physical characteristics, in general, is a non-linear and non-monotonic function of the measurement of individual physical characteristics due to interaction among wires and devices in the chip. Even if the adversary is given complete mask information of the chip and unrestricted physical access to the chip, it is difficult for the adversary to invert the function implemented by PUF circuit 100 to obtain the parameters of the model.

Chip 50 is "secured" in the sense that even if the adversary has possession of the device for a certain amount of time, the probability that the adversary is able to produce a response to a rightful owner's challenge is low. Once the chip is returned to its rightful owner, the owner knows that only he has the correct responses to the selected subset of challenges stored in the secure location. The probability that someone else can generate the correct responses to falsify the identity of device is very low.

If the adversary uses the same lithography masks to fabricate a counterfeit chip, due to the statistical variation inherent in the manufacturing process, the probability that the counterfeit chip will produce exactly the same responses to the rightful owner's challenges as the original chip is very low. Conceptually, the adversary could fabricate a huge number of chips and make comprehensive measurements on each one in order to create and discover a counterfeit with challenge-response pairs that match the original chip, but such an approach may not be practical.

Related to the difficulty in predicting which inputs will be used to authenticate chip 50, it would be difficult for an adversary to predict which combinations of physical characteristics will determine the needed outputs. Also, PUF circuit 100 preferably forms combinations of the individual physical characteristic in a manner such that knowledge of the individual characteristics cannot be used to form a model of the combinations.

Even if the adversary probed chip 50 to obtained a number of outputs while he has possession of the chip, it would be difficult to obtain the physical characteristics of PUF circuit 100 from those outputs. Once the adversary is not in possession of the chip, it would be difficult to generate additional outputs from the outputs that the adversary obtained earlier.

PUF circuit 100 is also preferably designed such that an attempt to measure the physical characteristics that determine the PUF function cannot be easily performed without destroying the functionality of the PUF circuit itself and consequently destroying the characteristics to be measured.

Delay-based PUF

In one example of a PUF circuit 100, the physical characteristics of measurable component 102 include path delays along paths of conducting wires or traces and semiconductor components forming at least part of the circuitry of PUF circuit 100. When chips are fabricated using the same set of lithography masks, there are "random" variations in the fabrication due, for example, to process temperature and pressure variations during the manufacturing steps. The random variations in the fabrication results in random variations in the PUF circuit 100. One aspect of this random variation is that path delays for corresponding wires and devices across different chips are different. Experiments have shown that delay variations can be 5% or more. Furthermore, for the same operating conditions, these delay variations remain relatively constant for a particular chip.

Other factors that are related to the operating conditions of the chip, such as operating temperature or supply voltage, may also cause variations in the path delays. Such variations are addressed using compensation techniques implemented in PUF circuit 100, as is described further below.

There may also be variations or errors in the measurement of path delays. The measurement circuitry is designed so that it is possible to measure path delays with a sufficiently high accuracy so that the variations in path delay values are mainly attributable to variations in the fabrication process and influenced much less by measurement variations. This ensures that measurement errors and variations do not affect the ability to identify and authenticate individual chips.

Figure 3:
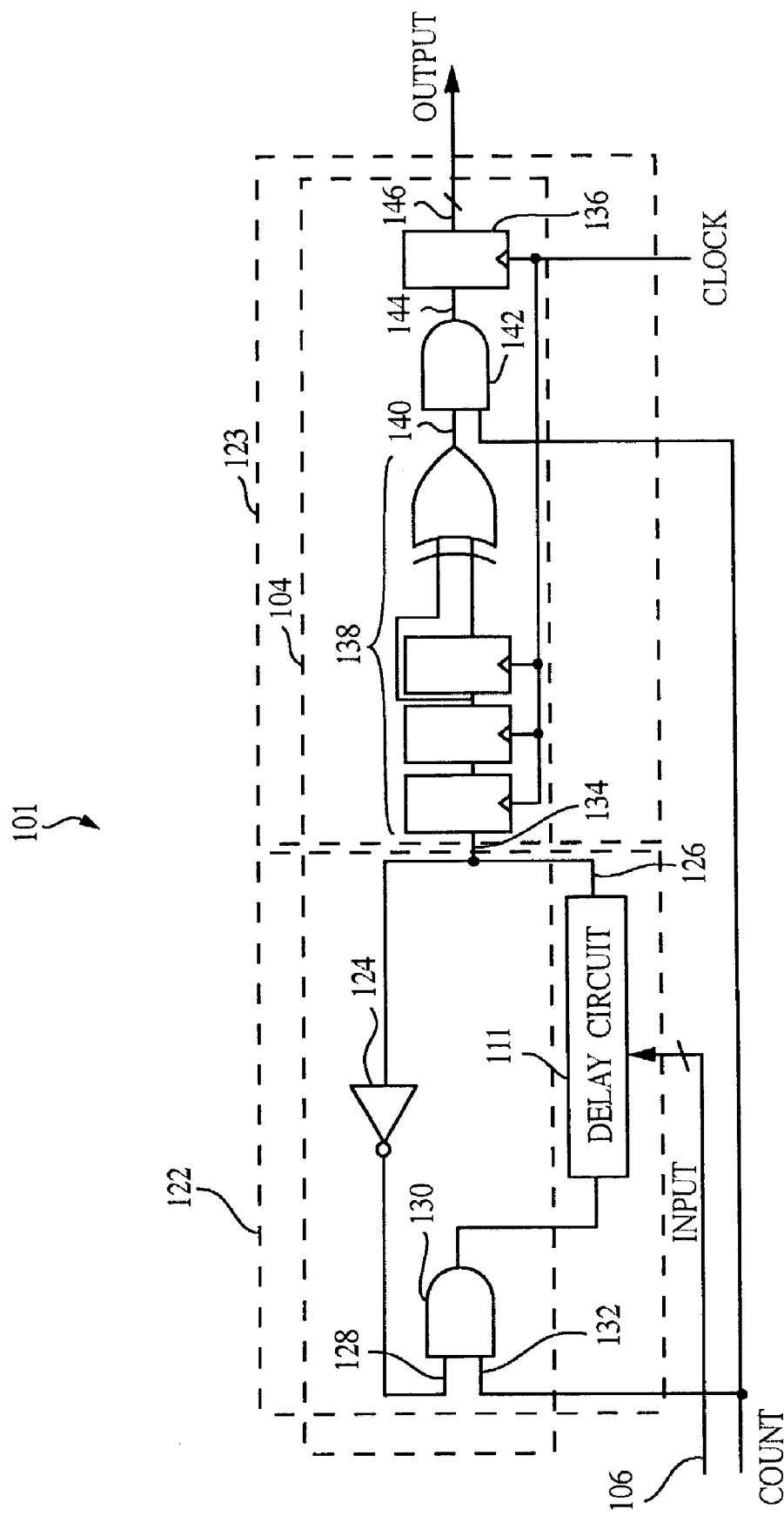
FIG. 3 shows a PUF circuit.

Referring to FIG. 3, an example of the PUF circuit 100 is a PUF circuit 101 that uses a delay circuit 111. An input to delay circuit 111 identifies an overall delay path, which is composed of a number of separate delay paths chained together, each separate delay path made up of conducting wires or traces and semiconductor components. Because of interactions between the elements in the chain, the overall delay is not necessarily a simple function of individual delays of the elements, such as a simple sum of the delays.

The path delays of delay circuit 111 are measured by using delay circuit 111 to form an oscillator block 122 and measuring the oscillating frequency of the oscillator block using a counter block 123. Oscillator block 122 self-oscillates at a frequency that depends on the signal path selected by an input signal on a signal line 106, and counter block 123 counts the number of oscillations within a predetermined period of time.

Oscillator block 122 includes an inverter 124 that inverts the signal at one end 126 of delay circuit 111. The output of inverter 124 is connected to an input 128 of an AND gate 130. Another input 132 of AND gate 130 is connected to receive a COUNT signal. When the COUNT signal is high, the inverter 124, AND gate 130, and the selected signal path in delay circuit 111 form a negative feedback loop and self-oscillates to generate an oscillating signal on a signal line 134. The oscillation frequency varies depending on the path delay of the selected signal path.

Counter block 123 includes a buffer circuit 138 that is connected to signal line 134 and is used to synchronize the oscillating signal with a clock signal. An output 140 of buffer circuit 138 is connected to an input of an AND gate 142. Another input of AND gate 142 is connected to receive the COUNT signal. When the COUNT signal is high, the oscillating signal on line 134 passes through buffer circuit 138 and AND gate 142 to an output 144 of the AND gate. The rising edge of the oscillating signal is counted by counter 136 during the period that the COUNT signal remains high. The count value at the output 146 represents a measurement of the path delay of the selected signal path in delay circuit 111. A higher count value represents a lower delay, and vice versa. When the input signal represents a challenge, the count value (or a processed version of the count value) represents a response of PUF circuit 101 to the challenge.

Referring to FIG. 4, delay circuit 111 includes 128 switches 112. Delay circuit 111 receives an input signal that includes 128 bits ($b_1$ to $b_{128}$), each input bit controlling one of the switches 112. If $b_i=1$, the switch is crossed (see FIG. 5). If $b_i=0$, the switch is uncrossed (see FIG. 6). Initially, a rising edge at a point x on signal line 114 is forwarded to signal lines 116 and 118. The rising edges passes through switches 112, following complementary paths that depend on the input signal, until they arrive at points y and z that connect to inputs of an AND gate 120. There is a characteristic delay between a rising transition at point x to a rising transition at point y or z, and typically another characteristic delay for a falling transition at input x to a falling transition at point y or z.

Figure 7:
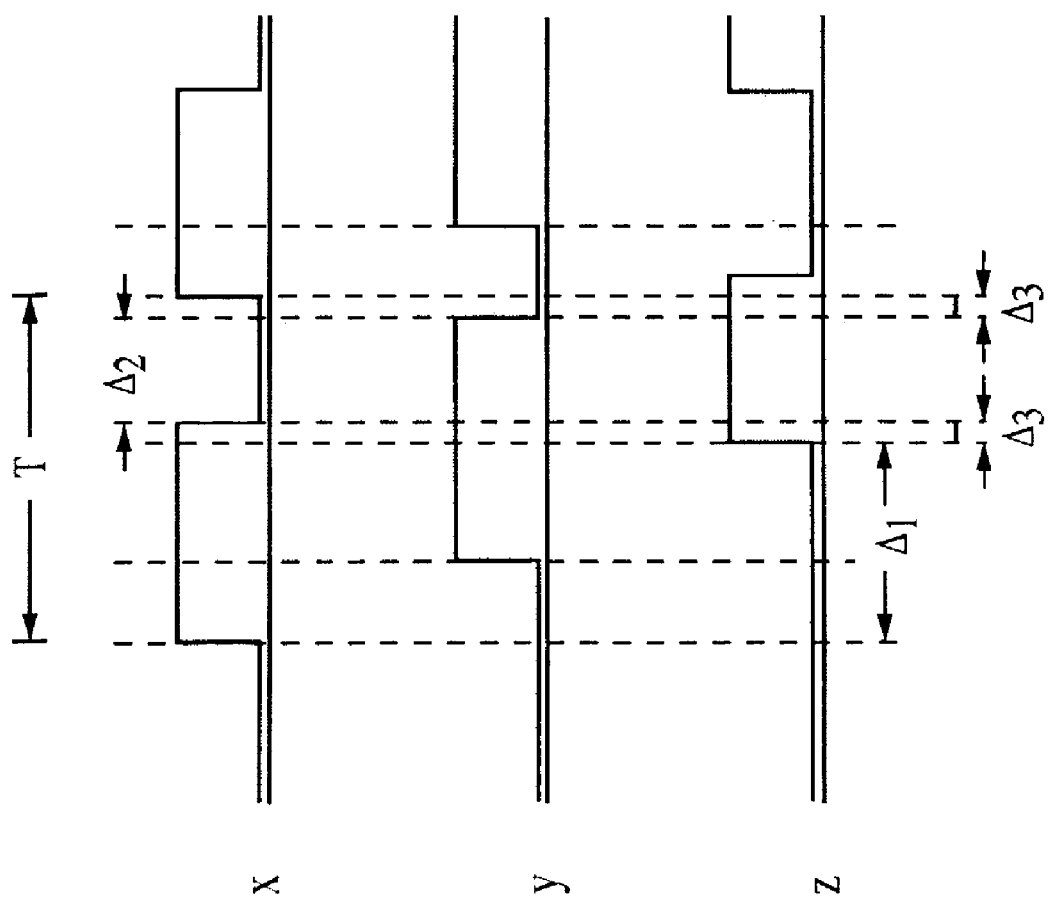
FIG. 7 is a timing diagram.

FIG. 7 is a timing diagram that shows the delay characteristic of delay circuit 111. Delay $\Delta_1$ is the longer of the characteristic delay between a rising transition at point x and a rising transition at point y or z (here, the rising transition at point z occurs later). Delay $\Delta_2$ is the shorter of the characteristic delay between a falling transition at point x to a falling transition at point y or z (here, the falling transition at point y occurs earlier). If the sum of delays of inverter 124 and AND gate 130 is $\Delta_3$, the period T of the oscillating block 122 is $\Delta_1\Delta_2+2\cdot\Delta_3$. In one example, the delays of inverter 124 and AND gate 130 may be different for a rising edge and a falling edge.

In delay circuit 111, the measurable characteristics are the path delays of the signal paths. Different input signals select different signal paths within delay circuit 111, and different path delays are measured by measurement circuit 104. Different delay circuits 111 that are fabricated using the same set of lithography masks will exhibit slightly different path delays when the same input signals are presented. Different delay circuits 111 will output different responses for the same challenge. The number of different delay circuits 111 that can be uniquely identified increases exponentially as the number of switches 112 increases.

Figure 8A:
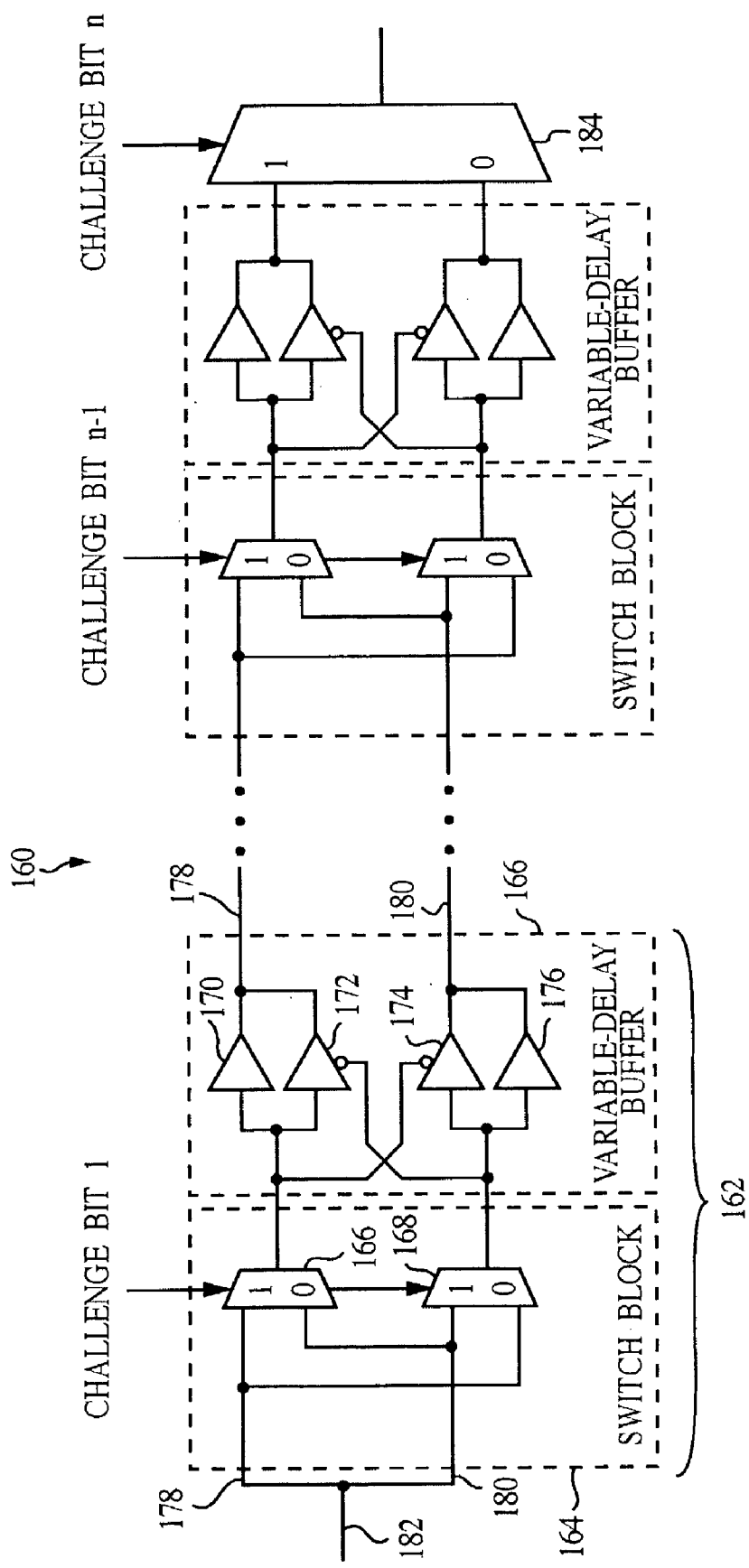
FIGS. 8A and 8B show delay circuits.

Referring to FIG. 8A, delay circuit 160 is an alternative design for delay circuit 111 (FIG. 3). As in delay circuit 111, delay circuit 160 includes n−1 stages 162 followed by a multiplexer 184, where n is the number of bits in the challenge. Each stage 162 includes a switch block 164 and a variable-delay buffer 166. Switch block 164 includes two multiplexers 166 and 168, and four buffers 170, 172, 174, and 176. Each stage 162 has an upper path 178 and a lower path 180. At an input 182 of the delay circuit 160, a rising (or falling) edge is sent into both the upper and lower paths 178 and 180. At each stage 162, depending on the value of the challenge bit for that stage, the path of the rising (or falling) edges may or may not cross, i.e., the edge from the lower path goes to the higher path and vice versa. One of the two edges is then selected by an output multiplexer 184 to be looped back to the input 182 to induce self-oscillation.

There is a possibility that two delay circuits may generate the same response to a particular challenge. Two or more challenges are used each time an attempt is made to identify a chip having PUF circuit 101 so that the probability of two or more delay circuits having identical responses to all the challenges is lowered. The number of challenge-response pairs available can be increased by increasing the number of stages 162 in delay circuit 160. This is because the number of signal paths in delay circuit 160 that can be measured is exponential in the number of stages 162.

The delays of the overall signal paths are not independent because there is much sharing between the signal paths. By using variable-delay buffers 166, it is more difficult for an adversary to exploit such dependency. Variable-delay buffer 166 has two pairs of buffers. The first pair includes buffers 170 and 172; the second pair includes buffers 174 and 176. In each pair of buffers, one buffer is always on, while the other buffer is only activated when the path connecting to the other pair of buffers is low. The dependence between paths is more difficult to exploit because the buffer pairs add a complicated non-monotonic interaction between two edges racing through the circuit (e.g., if the path delay of one circuit element becomes longer, it is possible that the total path delay will become shorter). This prevents the adversary from solving linear equations to obtain the delays of individual delay circuit elements.

Delay circuit 160 in FIG. 8A can be improved by adding an arbiter that decides, part way through the delay paths, which of the signals in upper path 178 or lower path 180 is faster, and set a switch further down the delay paths based on that decision.

Figure 8B:
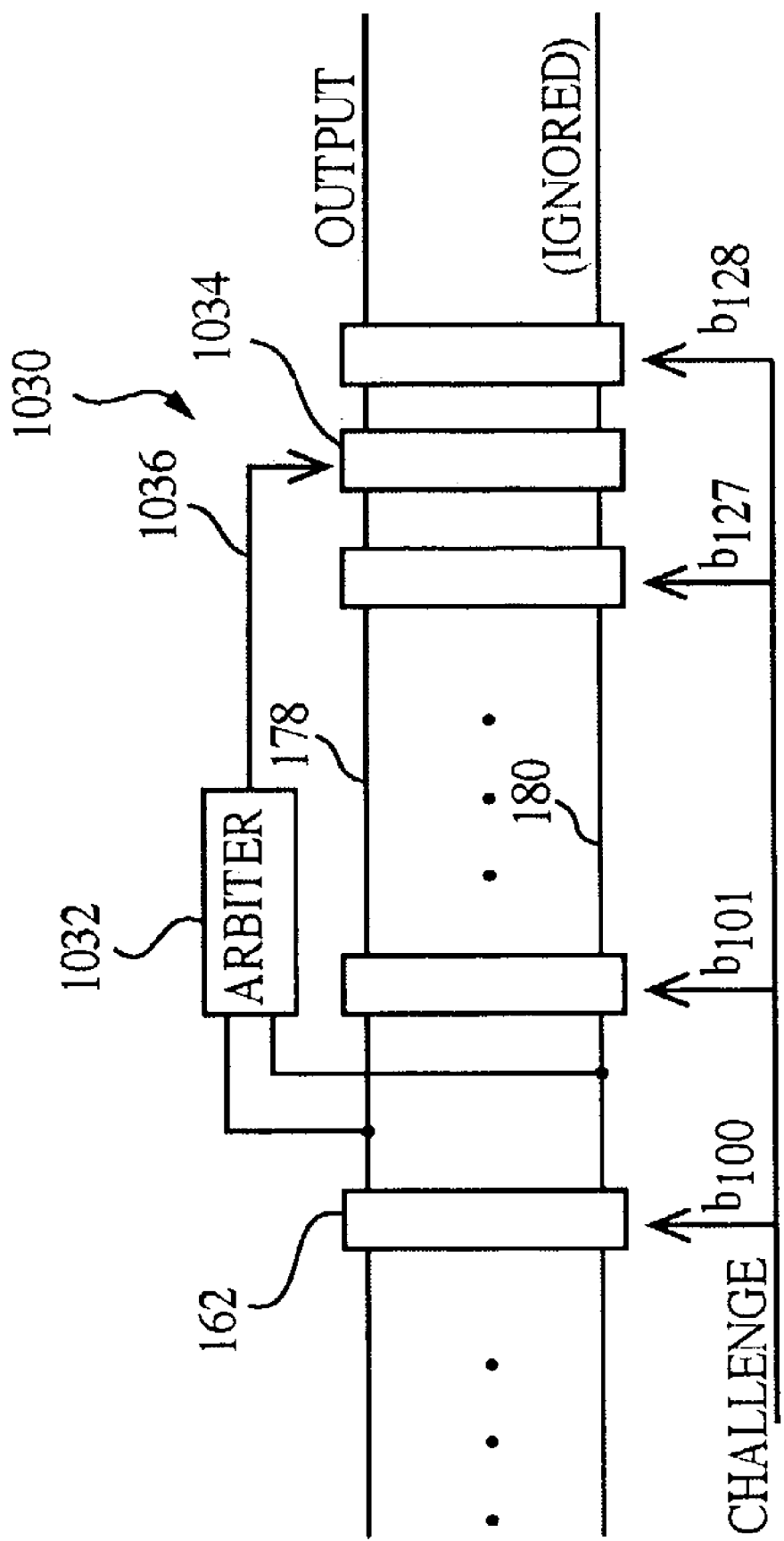

Referring to FIG. 8B, a delay circuit 1030 includes 129 stages 162 that receives a 128-bit challenge. Each stage includes a switch block 164 and a variable delay buffer 166. An upper path 178 and a lower path 180 run through the stages. An arbiter 1032 is connected to the upper and lower paths that connect two successive stages, e.g., the stages that receive the $100^{th}$ and $101^{st}$ challenge bits. Arbiter 1032 determines which of the signals on upper path 178 and lower path 180 (after the stage that receives the $100^{th}$ challenge bit) is faster, and generates an output on signal line 1036 that is sent to another stage (e.g., stage 1034 between the stages that receive the $127^{th}$ and $128^{th}$ challenge bits) down stream. The signal on line 1036 determines whether the switch block 164 in stage 1034 is crossed or uncrossed. This effectively produces a "secret challenge bit" that is unknown to an adversary.

Compensated PUFs

The measurable characteristics in measurable component 102 (such as path delays of the signal paths in delay circuit 160) may vary due to variations in environmental conditions, such as varying ambient temperature and power supply voltages. Optional circuitry is added to chip 50 to compensate for such variations. A PUF circuit with circuitry that compensates environmental variations will be referred to as a compensated PUF circuit.

Figure 9:
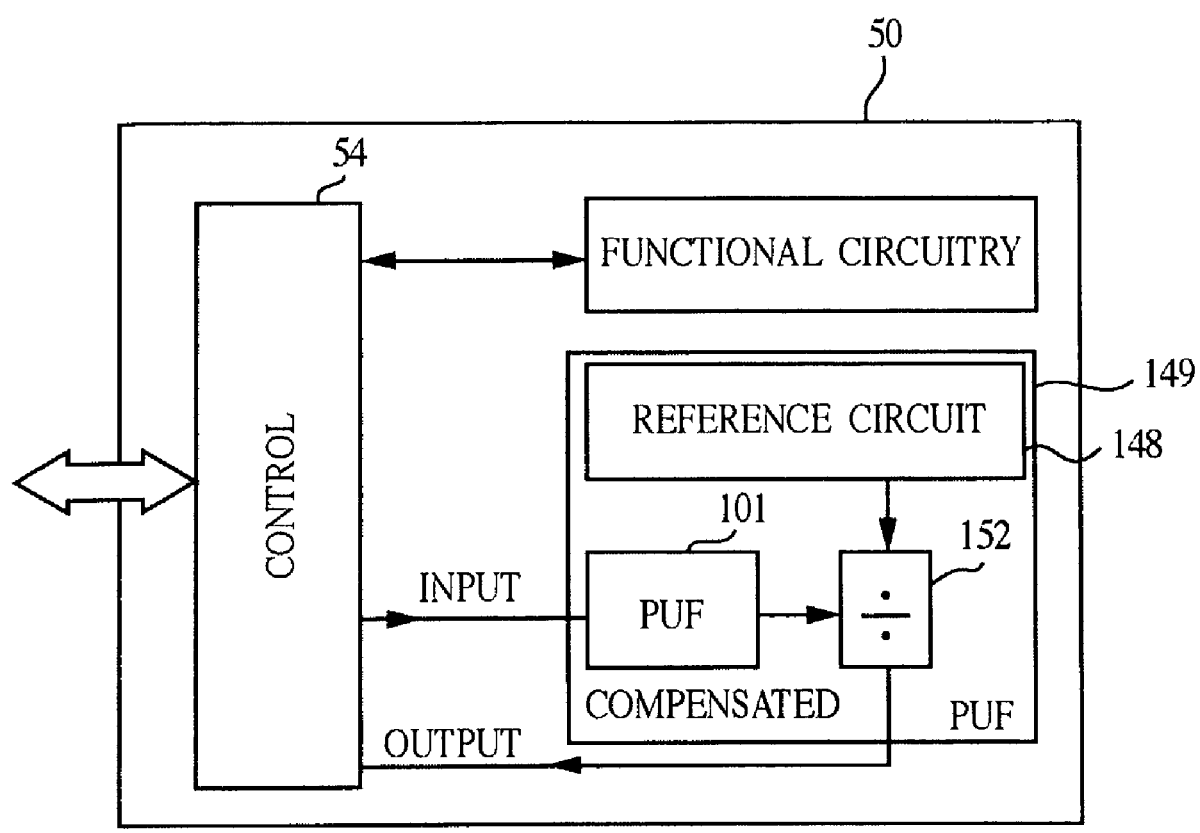
FIG. 9 shows a chip that includes a compensated PUF circuit.

Referring to FIG. 9, chip 50 includes a compensated PUF circuit 149 that takes the ratio of the outputs of a PUF circuit 101 and a reference circuit 148 to generate an output of the compensated PUF circuit 149. In this example, reference circuit 148 is a simple self-oscillating loop that changes oscillation frequency in proportion to the changes in the oscillation frequency of PUF circuit 101. The outputs of PUF circuit 101 and reference circuit 148 are sent to a divider 152. The ratio becomes the response of the compensated PUF circuit 149. Because PUF circuit 101 and reference circuit 148 are influenced by the environmental conditions more or less equally, the ratio generated by the divider 152 will be less affected by the environmental conditions.

During operation, the temperature of circuits in chip 50 increases due to resistive heating. Compensated PUF 149 is designed so that the circuits are heated uniformly during operation to ensure the stability of the ratio of the outputs of PUF circuit 101 and reference circuit 148.

When there are two oscillating loops that oscillate at almost the same frequency, the oscillating signals may interfere with one another so that the two signals lock onto a single oscillating frequency. Therefore, the challenge to PUF circuit 101 is selected so that the oscillation frequencies of PUF circuit 101 and reference circuit 148 are sufficiently different to prevent interference of the oscillating signals.

Figure 10:
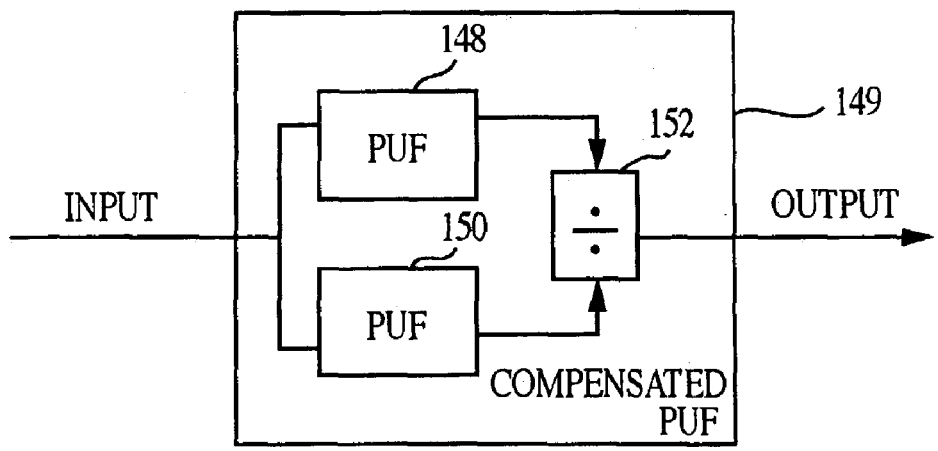
FIGS. 10 and 11 show compensated PUF circuits.

Referring to FIG. 10, another example of a compensated PUF circuit 149 includes two PUF circuits, 148 and 150, that receive the same input signal. The ratio of the outputs of PUF circuits 148 and 150 are used to generate an output of the compensated PUF circuit 149.

Figure 11:
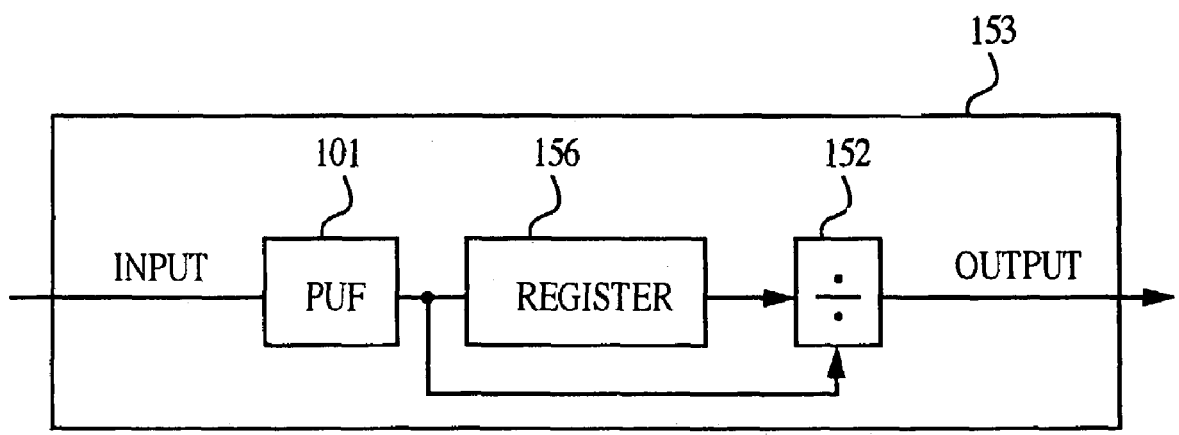

Referring to FIG. 11, yet another example of a compensated PUF 153 includes a PUF circuit 101, a register 156, and a divider 152. A first input value is sent to PUF circuit 101 to generate a first output value that is stored in register 156. A second input value is sent to PUF circuit 101 to generate a second output value. Both the first and second output values are sent to divider 152 to calculate a ratio of the two output values. The ratio becomes the output of compensated PUF 153.

When the changes in environmental conditions are large (e.g., variations of greater than 30 degrees in ambient temperature), using ratios of outputs may not be sufficient to suppress the influence of the environmental changes. Sets of CRPs are generated for different temperature ranges. For example, a set of CRPs are used when the temperature is between 20° C. to 50° C., another set of CRPs are used when the temperature is between 45° C. and 75° C., and so forth. The PUF circuit can be seen as implementing 2 or 3 different PUFs, only one of which is expressed at a time depending on the temperature.

Circuit aging can also change delays, but its effects are smaller than the temperature effects.

Changes in power supplies may also affect the outputs of PUF circuits. However, experiments have shown that as long as power supply voltages do not vary too much (the exact number depends on the particular PUF circuit used), taking ratios of outputs from different oscillating loops is sufficient to compensate for the effects from power supply variations.

Error Correction

Measurement of physical phenomena can contain errors. In PUF circuit 101 (FIG. 3), where self-oscillation loops are used to measure the path delay of the delay circuit 111, the path delay is quantized by measuring the integer number of oscillations during a fixed amount of time. Such quantization is one way of dealing with measurement errors; i.e., minor variations (errors) in the measurement will result in the same quantized amount. However, if the quantity to be measured falls between two quantization levels, small variations in the measurements may lead to different quantization values.

Figure 12:
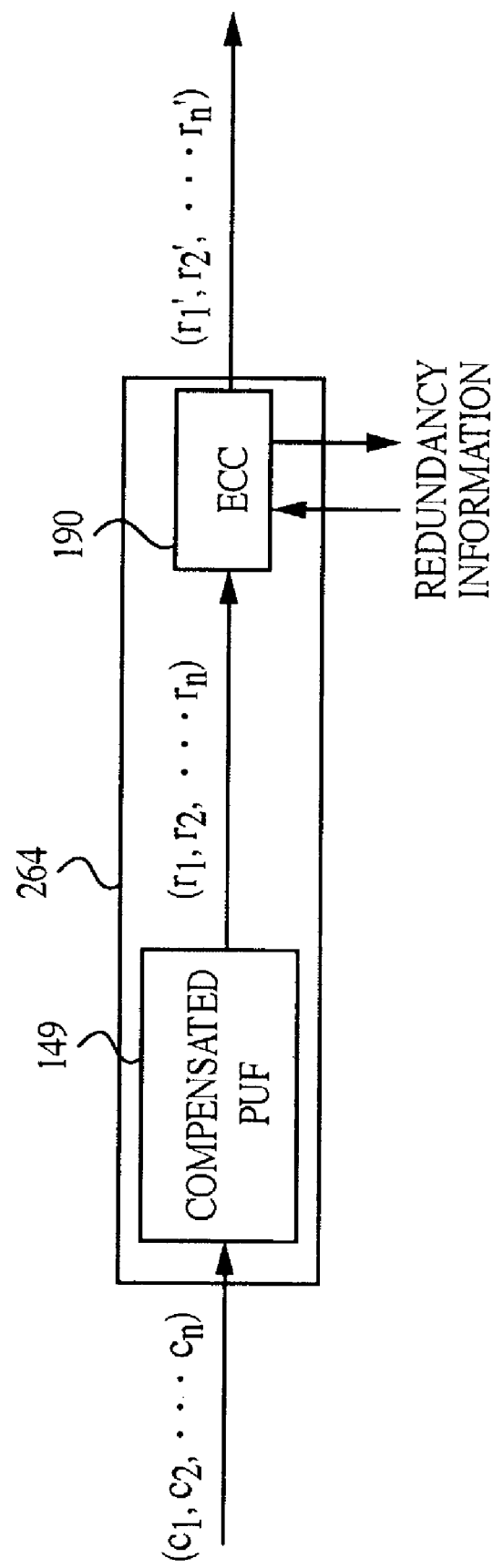
FIG. 12 shows an improved PUF circuit with error correction.

Referring to FIG. 12, an improved PUF circuit 264 includes an error checking and correction (ECC) module 190 that implements a more elaborate version of quantization to process the oscillation count number generated by counter block 123 to ensure that the same response is generated when the same challenge is received by PUF 100. ECC module 190 may be implemented as a stand alone circuit or by a microprocessor running an ECC algorithm.

A number of challenges $(c_1, c_2, \ldots, c_n)$ are passed through a compensated PUF circuit, such as PUF circuit 149 or 152, to obtain a number of responses $(r_1, r_2, \ldots, r_n)$. The responses $(r_1\text{-}r_n)$ are sent to ECC module 190 for correcting slight variations in the measurement of the physical characteristics. ECC module 190 generates n corrected responses $(r_1', r_2', \ldots, r_n')$ on a data bus 266.

When a set of challenge-response pairs is created, redundancy information is produced to allow the ECC module 190 to correct slight variations in the measurement. Such variations may be, for example, the result of quantization error and measurement noise. On subsequent uses of the challenge-response pairs, the redundancy information is provided to the improved PUF circuit 264 along with the challenges. It is important that the redundancy information not give away all the bits of the response.

The following describes a method of error correction by adjusting the boundaries of the quantization levels so that the quantity to be measured is near the mid-value of a quantization level. This prevents generation of different quantization values due to small variations in the measurements.

In one implementation of the ECC module 190, the error checking and correction is performed on one or more compensated measurements so that a single bit b of information is extracted from each compensated measurement. The extraction is performed by quantizing the measured value with a step size of $\delta$, and taking the quantized value modulo 2.

Let d be the compensated measurement that is computed when the redundancy information is created (e.g., when a new challenge-response pair is created), and m the compensated measurement that is computed when the redundancy information is used (e.g., when the challenge-response pair is used). If define b as $$b = \left\lfloor \frac{m-\epsilon}{\delta} \right\rfloor \bmod 2,$$

where $\epsilon = \delta - \lfloor \delta \rfloor - \frac{1}{2}$, then d is in the middle of a quantization interval, and the likelihood of m being quantized the same way as d are increased. The parameter $\epsilon$ is sent outside of the PUF chip as part of the redundancy information, and may reveal the low order bits of d to a potential adversary.

One can assume that the bits of $\epsilon$ do not give an adversary information about the bit b that is extracted from d when $\delta$ is less than the standard deviation of d across different chips fabricated based on a common design. Factors that need to be considered for choosing $\delta$ will be discussed later.

Errors in the compensated measurements can be corrected by using a product of a modified Hamming code and a parity check. To compute the modified Hamming code of a $2^k-1$ bit message represented by a column vector over the order two finite field, the message is multiplied by a k row matrix whose $i^{th}$ column is the binary representation of i. For example, the redundancy information for 1011001 is computed by:

$$\begin{pmatrix} 0 & 0 & 0 & 1 & 1 & 1 & 1 \\ 0 & 1 & 1 & 0 & 0 & 1 & 1 \\ 1 & 0 & 1 & 0 & 1 & 0 & 1 \end{pmatrix} \begin{pmatrix} 1 \\ 0 \\ 1 \\ 1 \\ 0 \\ 0 \\ 1 \end{pmatrix} = \begin{pmatrix} 0 \\ 0 \\ 1 \end{pmatrix}$$

The redundancy information for 1011001 is therefore 001.

The modified Hamming code can correct a single error on non-redundancy bits. To correct an error, compute the redundancy information for the erroneous message, and exclusive-or it with the redundancy information for the correct message. The result is the binary encoding of the offset of the erroneous bit in the message, unless it is zero, in which case there is no error.

For example, $$\begin{pmatrix} 0 & 0 & 0 & 1 & 1 & 1 & 1 \\ 0 & 1 & 1 & 0 & 0 & 1 & 1 \\ 1 & 0 & 1 & 0 & 1 & 0 & 1 \end{pmatrix} \begin{pmatrix} 1 \\ 0 \\ 0 \\ 1 \\ 0 \\ 0 \\ 1 \end{pmatrix} = \begin{pmatrix} 0 \\ 1 \\ 0 \end{pmatrix}$$

and $010 \oplus 001 = 011$, representing that the third bit has been changed, which is indeed the case. The modified Hamming code is capable of detecting one error in the message.

By adding a parity bit, it is possible to detect but not correct a second error. The second error can be detected because when two bits are erroneous, the parity bit will be correct, but the modified Hamming code will indicate an error.

The modified Hamming code can be applied to messages whose length cannot be expressed as $2^k - 1$ by padding the message with zeroes.

The modified Hamming code can be improved by creating a product code, which is produced by first arranging w·h bits into a w-column, h-row array. The product code is based on a modified Hamming code, with a parity bit added to each row, and a parity bit added to each column.

When there is one error per row, the modified Hamming codes can correct all of the errors. When a row contains two errors, the Hamming code cannot correct the errors, but the parity bit on that row will indicate that the row contains two errors. If only one row contains two errors, the parity bits on the columns can be used to determine which bits of the faulty row are incorrect. The product code can correct errors when no more than one row contains two errors, and no row contains more than two errors.

The product code can be improved as follows. The row parity bits are redundant most of the time because it is possible to directly calculate them from a corrected row of bits. The only case where the row parity bits cannot be totally calculated, but the errors can still be corrected, is when one row contains two errors, and the other rows contain at most one error. In that case, if the row-parities are calculated from the row data, exactly one of the parities will be wrong. That means that instead of storing the parities, it is possible to use a modified Hamming code on the row-parities, and only store the redundancy information on what the row-parities should be. In this way, a few extra bits can be saved.

The following describes how to choose parameters w and h to create the product code. In one example, the output hash ($h_2$) is presented with at least B identification bits that the adversary does not have. A possible value of B that avoids brute force attacks is about 80. The protocols used by controlled PUF circuits (described below) are adapted so that a number of different challenges are tested until the PUF circuit gives the right response to one of them. Different challenges are tested to avoid errors due to slowly changing environmental parameters. The parameters w and h are chosen so as to reduce $B_{exp}$, the expected number of measurements to perform on the PUF circuit.

To compute the number of identification bits, it is assumed that the adversary has an error rate p, so the adversary's maximum channel capacity is $$C = 1 + p \cdot \log_2(p) + (1-p) \cdot \log_2(1-p)$$

The adversary has $B_a = C \cdot w \cdot h + R$ bits of information, where $$R = w + h \cdot \lfloor \log_2(w) + 1 \rfloor + \lfloor \log_2(h) + 1 \rfloor$$

is the number of redundancy bits. The number of identification bits that is extracted from the PUF circuit is the difference between the number of bits in the block, and the number of bits the adversary has: $w \cdot h \cdot B_a$. Many blocks of w by h bits are sent before B bits of identification information are available. The parameter $B_{tot}$ will be used to represent the number of bits that are needed to obtain B information bits.

Computing the probability of correctly correcting all the bits that are needed to gather B information bits, knowing the error rate q for the PUF measurements, is an application of Bernoulli distributions. The probability of correcting a given row and the probability of detecting two errors in a given row are computed. By using these probabilities, it is possible to compute the probability of detecting two errors in more than one row and the probability of having more than two errors in any row. These provides a lower bound on the probability of correcting a whole block. The probability $P_{succ}$ of getting all the blocks right can be deducted from the number of blocks that are read. The probability $P_{succ}$ can be used to deduct the expected number of physical measurements to perform.

Figure 37:
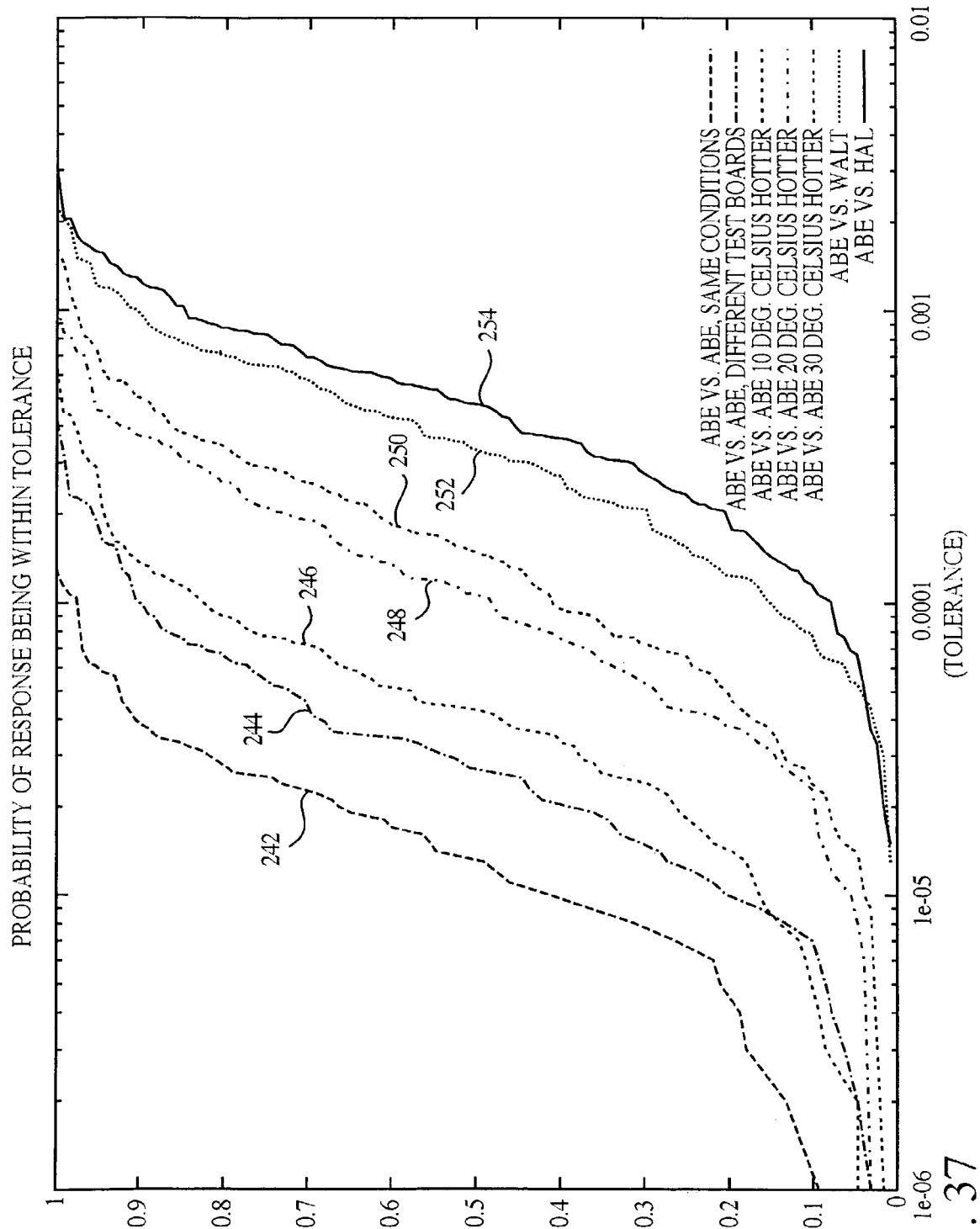
FIGS. 37-45 are graphs showing experimental data.

The data in FIG. 37 can be used to find values of p and q, given δ. The value of δ/2 corresponds to a vertical line on the graph. For values above about 60%, p and q can be read directly off that line of the graph. For p one should take the value of the highest plot that corresponds to two different field programmable gate arrays (FPGAs). For q one should take the value of the lowest plot that corresponds to the same FPGAs, in environmental conditions in which we want to be able to recognize it. Table 1 shows examples of various parameters, along with the optimum error correction solution for those parameters using the error correction methods described above.

TABLE 1

| Case | δ/2 (ppm) | p | q | h | w | $P_{succ}$ | $B_{tot}$ | $B_{exp}$ |
|---|---|---|---|---|---|---|---|---|
| 1 | ≈250 | 55% | 70% | 10 | 3 | $4.7 \cdot 10^{-29}$% | 870 | $1.9 \cdot 10^{33}$ |
| 2 | ≈500 | 68% | 90% | 30 | 3 | 20% | 540 | 2681 |
| 3 | ≈1500 | 95% | 99% | 31 | 30 | 58% | 930 | 1617 |

In case 1 shown in Table 1, the value of p is an approximation because the value is too low to be read directly off the graph. In case 3, the value of p is too high for the assumption that the low order bits of the measurement reveal nothing about the bit that is extracted to be true.

A good error correction solution is computed by a C program that calculates the expected number of physical measurements as a function of w and h. The program considers that a whole number of w by h blocks are used. Table 1 shows that it is easier to find a good tradeoff when there are few measurement errors, so b should be chosen accordingly. Cases 2 and 3 show that as long as the measurement errors are limited, adequate solutions can be found for a wide range of values of δ. If δ is too large, both p and q are so close to one that it is difficult to perform error correction.

Assuming a 100 MHz clock, and 2×10000 cycles per measurement, on the order of 3 CPUF evaluations can be carried out per second.

One way of improving error correction is to extract two or three bits from each compensated measurement by reducing modulo four or eight. Each bit from a measurement corresponds to its own value of δ, and therefore, to its own values of p and q. It is therefore desirable to correct the three levels of bits independently of each other. Each level of bits will have its own settings for w and h, and a global optimization of block sizes may be performed. By extracting more information in this way, it may be possible to use fewer measurements while achieving the same amount of error correction.

When using multiple bits per measurement, the errors may be correlated. In particular, if a high order bit is found to be wrong, it is possible that the lower order bits may be random. Therefore, one can consider them as erasures, and try to take the erasure information into account to correct more errors on the low order bits.

Controlled PUFs

In an alternative version of chip 50, one or more control modules are added to limit access to the PUF circuit (e.g., 100). The PUF circuit and control modules are physically linked in a way that is difficult to separate, and the PUF circuit can only be accessed through control algorithms implemented by the control modules. The term "controlled PUF (CPUF) circuit" will be used to refer to a combination of the PUF circuit and the one or more control modules.

A CPUF chip can be designed so that the control modules implementing the control algorithms are protected by the physical system on which the PUF circuit is based. An attempt to circumvent the algorithms will likely lead to the alteration of the PUF circuit.

One type of control algorithm can be used to restrict the inputs (or challenges) that are presented to the PUF circuit, to limit the information about outputs (or responses) that is provided outside of the controlled PUF circuit, and/or to implement functionality that is to be authenticated by the PUF.

As shown below, in one example, by using control, a weak PUF circuit can be improved into a stronger PUF circuit that is more difficult for the adversary to tamper with. In another example, control can be used to establish a secret that is shared between the CPUF chip and a user trying to use the functionalities of the CPUF chip.

Improved PUFs

An adversary may try to build a model of a PUF circuit by measuring the outputs of the PUF circuit to a number of adaptively-chosen inputs. The inputs are chosen so that the input-output pairs can be used to establish a set of equations that can be solved to obtain parameters for building a model of the PUF circuit. The model can then be used to simulate and clone the PUF circuit. This can be prevented by adding control around the PUF circuit so that it is difficult for the adversary to choose a particular input that can lead to equations that are easy to solve.

Figure 13A:
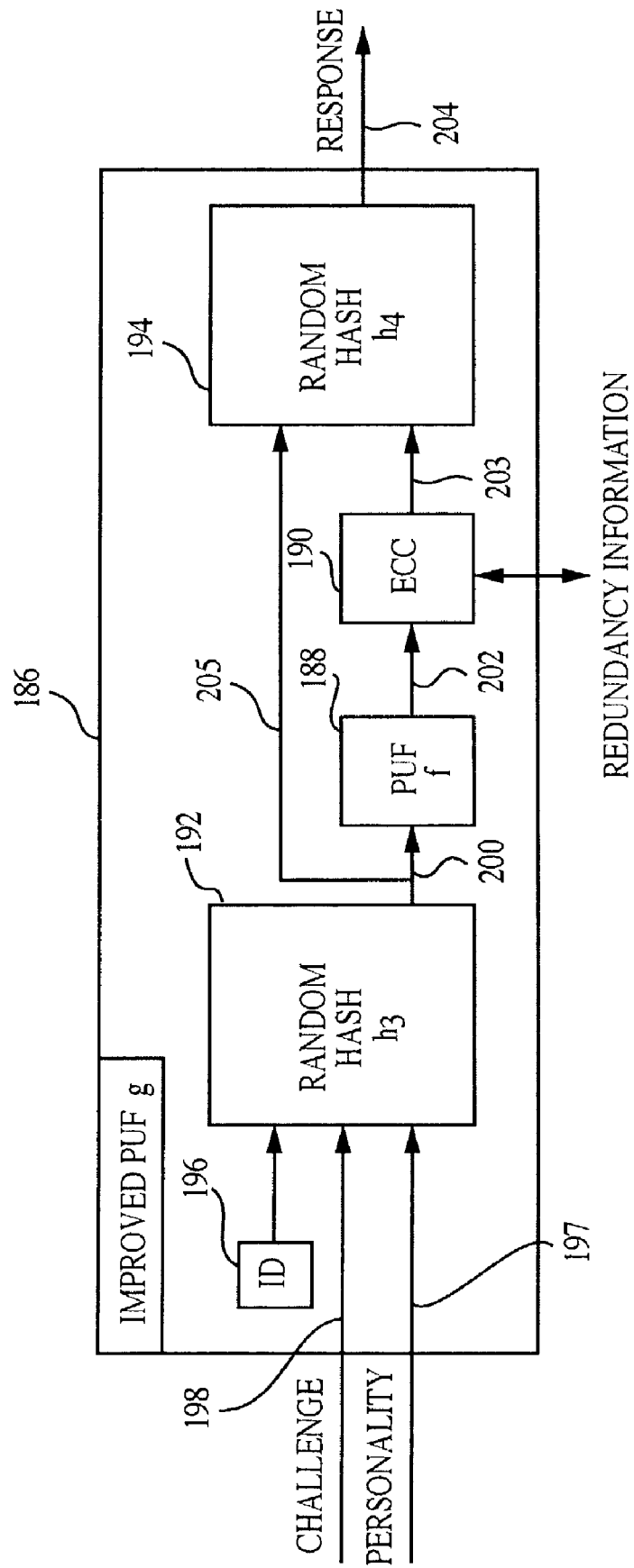
FIG. 13A shows a controlled PUF (CPUF) circuit.

Referring to FIG. 13A, a functional block diagram of an improved PUF g circuit 186 includes a PUF $f$ circuit 188, an ECC module 190, a random hash module 192, and a random hash module 194. Modules 190, 192, and 194 can be implemented by stand-alone circuits or by a microprocessor running software code. A challenge of improved PUF g circuit 186 is sent to hash module 192 through a signal line 198. At the same time, redundancy information is sent to ECC module 190 to correct minor errors in the outputs of PUF $f$ circuit 188. Random hash module 192 implements a one-way random hash function $h_3$, which, when applied to the challenge, generates a hash value that becomes an input that is sent to PUF $f$ circuit 188 through a signal line 200. The hash value is also sent to random hash module 194 through line 205.

The random hash modules 192 and 194 may be implemented by hardware circuitry or software running on a microprocessor (not shown).

PUF $f$ circuit 188 includes one or more self-oscillating loop circuits (such as the one shown in FIG. 3) that have oscillation frequencies dependent on the input to the PUF $f$ circuit 188. PUF $f$ circuit 188 outputs a particular count value on a signal line 202 when a particular input is received on signal line 198. The count value passes through ECC module 190, which, using the redundancy information, removes small variations in the count value due to statistical variations and inaccuracies in the measurements. ECC module 190 generates an output, which is sent to random hash module 194 through line 203. The output of ECC module 190 is passed through random hash module 194 that implements a one-way random hash function $h_4$. The output of random hash module 194 is produced on signal line 204 and represents the response of CPUF g circuit 186.

Small differences in the signal on line 203 will result in large differences in the output of the random hash module 194 on line 204. By using random hash module 194, it is difficult to obtain information on the underlying physical characteristics of PUF circuit 188 from the response on line 204.

By using ECC module 190, the same output is produced on line 203 when a particular input is sent to PUF $f$ circuit 188 on line 200. This allows the same response to be produced on line 204 when the same challenge is provided on line 198 despite small variations in the measurement of the physical characteristics of PUF circuit 188. The ECC module 190 may be implemented by hardware circuitry or by software running on a microprocessor (not shown).

In improved PUF g circuit 186, if x represents the challenge, then the output of PUF $f$ circuit 188 on signal line 202 can be represented as $f(h_3(x))$. Because $h_3(x)$ is a one-way random hash function, it is difficult for the adversary to determine x given $h_3(x)$. Thus, even if the adversary finds a set of inputs for the PUF $f$ circuit 188 that can be used to establish a model of PUF $f$ circuit 188, the improved PUF g 186 is not compromised because the adversary is unable to present those inputs to the PUF $f$ 188, i.e., the adversary has no way of presenting the correct challenge x to generate the required input $h_3(x)$.

For the CPUF g circuit 186 to be robust to physical attacks, the modules that control access to PUF $f$ circuit 188 are intertwined with circuit 188 so that it is difficult for an adversary to bypass the control modules through physical probing. In particular, the adversary is prevented from reading the response of PUF $f$ circuit 188 directly before it goes through the output random hash module $h_2$ 194, and from bypassing the input random module $h_1$ 192 by sending a challenge to the PUF circuit directly.

In the case where path delays of signal paths are the measurable physical characteristics of PUF $f$ module 188, the metal wiring and devices forming the signal paths can be constructed on top of (or surrounding) random hash modules 192 and 194 and the signal lines 200 and 202 within an integrated circuit so that an adversary cannot physically access random hash modules 192 and 194 or signals lines 200 and 202 without altering the path delays of the signal paths, thereby altering the function $f$.

Figure 13B:
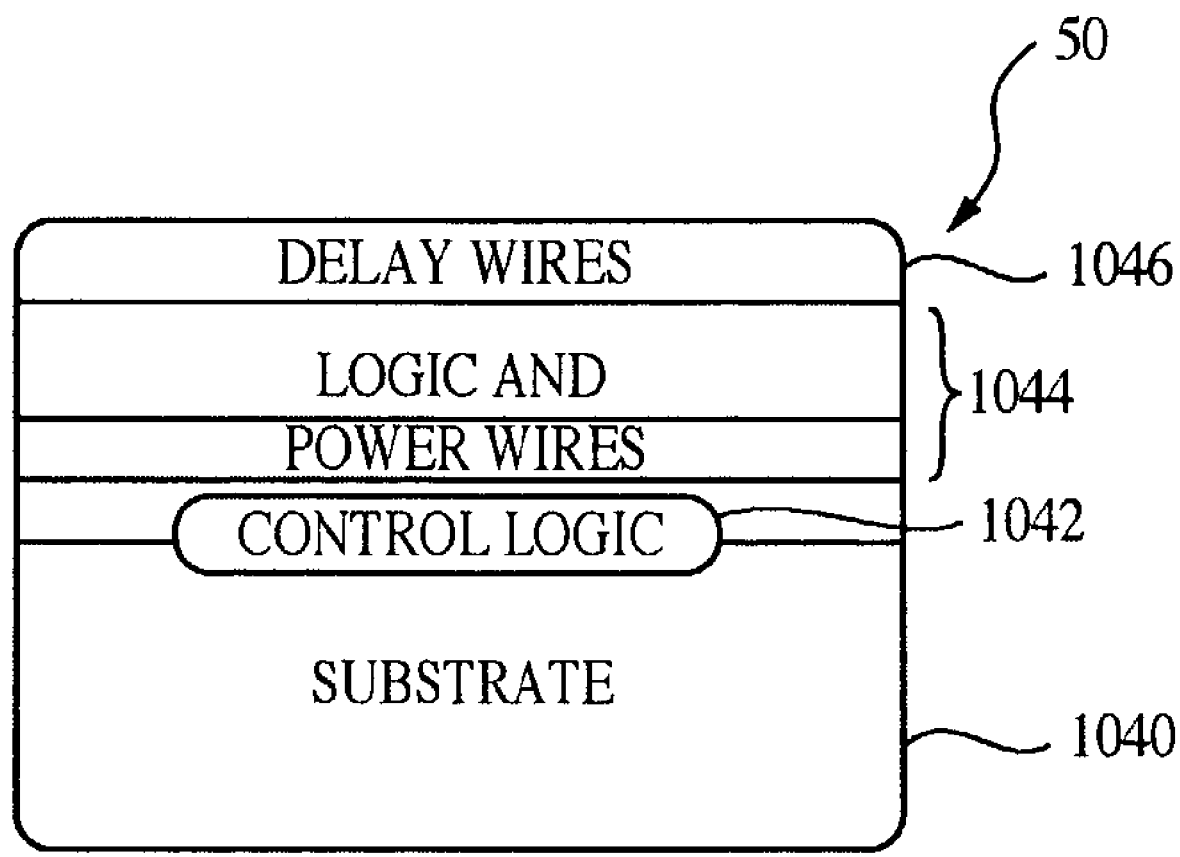
FIGS. 13B and 14 show CPUF chips.

FIG. 13B shows an example of a chip 50 that includes a substrate 1040, a control logic layer 1042, logic and power wires layers 1044, and delay wires layer 1046. Control logic 1042 includes random hash modules 192 and 194. Control logic may also include a microprocessor (e.g., 51 in FIG. 14) that is used to provide other control functions. Logic and power wires layers 1044 contain power wires and other logic circuits that need to be protected. Delay wires layer 1046 includes the metal wiring and devices forming the signal paths of a PUF module.

The response of improved PUF g circuit 186 generated on signal line 204 can be written as $g(x)=h_4$ (ECC($f(h_3(x))$), $h_3(x)$). By using the random hash module 194, the output of PUF g circuit 186 will exhibit more randomness. Similar outputs generated by PUF $f$ circuit 188 and ECC module 190 will be hashed to very different hash values (which becomes the output of CPUF g circuit 186). This prevents an adversary from guessing the response to one challenge by using the responses to similar challenges. Post-composing the output of PUF $f$ circuit 188 with a random hash function $h_4$ and passing the output of module 192 to module 194 through line 205 make the system provably resistant to non-physical attacks, as long as enough information is extracted from the PUF circuit before running the outputs through the output random hash function. In the case of a delay circuit, a number of path delays are measured until a few hundreds of bits of information have been extracted from the system. The measurements are then passed through the random hash function $h_2$.

In one implementation of measuring multiple path delays, random hash function $h_3$ can be chosen so that it provides a very wide output (i.e., a large number of output bits). This output is split into many different challenges that are sent to PUF circuit 188 one at a time. The responses are concatenated and error corrected by ECC module 190 into a single response that is sent to random hash module $h_4$ 194.

Multiple Personalities

Some users may feel uncomfortable using chips that have unique identifiers because they feel that they can be tracked. For example, in certified executions, an owner of a PUF chip who allows the PUF chip to provide computation services to one entity may not wish to be known that the same chip is providing computation services to another entity. To alleviate concerns about privacy, improved PUF g circuit 186 is designed to receive a personality number on line 197 that can be selected by the owner of the circuit. A challenge is hashed with the personality number to produce a hash value, and the hash value is used as an input to the rest of the improved PUF g circuit 186. This can be expressed as Input=$h_3$(Challenge, Personality).

Different personality numbers correspond to different sets of challenge-response pairs. By using different personality numbers, the owner effectively has many different PUF circuits.

In certified executions, the owner may select a first personality number when improved PUF g circuit 186 is providing computation service to a first application, and select a second personality number when the improved PUF g circuit 186 is providing computation service to a second application. The first and second applications will not know that they interacted with the same improved PUF g circuit 186.

Unique ID

To ensure that any two PUFs are different, the actual challenge can be combined with an unique identifier, which is separate from the PUF circuit and is unique to the chip, to generate a hash value that is passed through the rest of the PUF. In improved PUF g chip 186, the identifier is generated by an identifier module 196, which can be a hard-wired circuit that generates a unique binary number. The unique identifier that is used need not be secret and can be, for example, the chip's serial number. Since no two serial numbers are the same, no two PUFs will be identical. Even if two CPUFs share the same underlying PUF $f$, there is no way for an adversary to know this since he cannot probe PUF $f$ circuit 188 directly.

Feedback

To add more complexity to the adversary's problem, the CPUF g circuit 186 may be used multiple times to produce one response. The corrected response from one round may be fed back into the PUF circuit. After a few rounds have been completed, all their outputs may be merged together along with the challenge, the personality, and the identifier generated by identifier module 196 and passed through a random hash function to produce the overall response.

CPUF Chip

Figure 14:
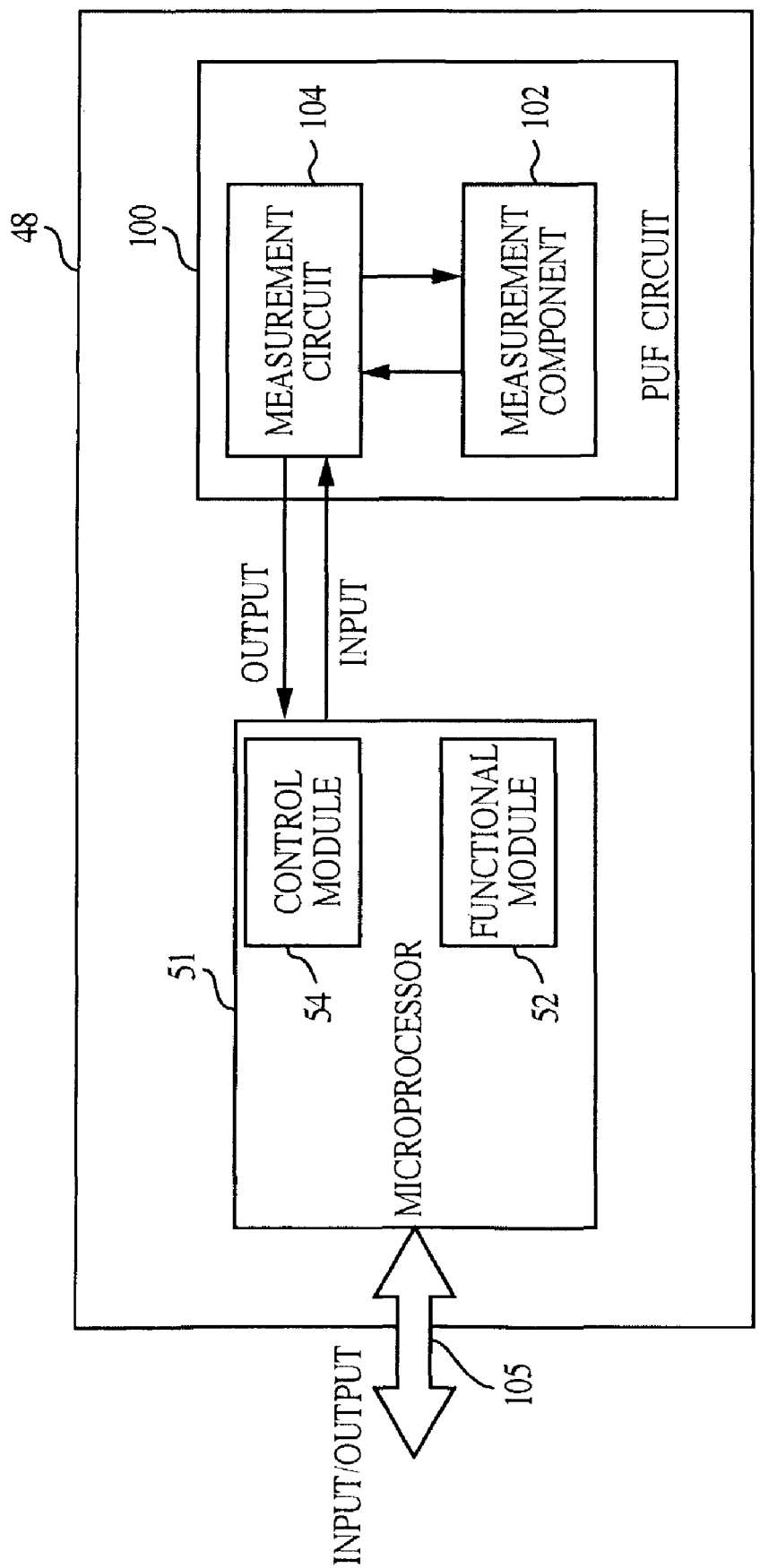

Referring to FIG. 14, a semiconductor chip 48 is an implementation of a CPUF chip. Chip 48 includes a PUF circuit 100 and a microprocessor 51. PUF circuit 100 includes a measurable component 102 and a measurement circuit 104. Microprocessor 51 implements control algorithms such that the PUF circuit 100 can only be accessed by using software code that follows certain secure protocols. The software code may include code that causes microprocessor 51 to implement a functional module 52 to perform computations to generate a computation result. The software code may include code that causes microprocessor 51 to implement a control module 54 for adding control (e.g., applying random hash functions or adding encryption) to the computation results or the output of PUF circuit 100. The secure protocols requires microprocessor 54 be intertwined with the physical characteristics of measurable component 102 in such a way that any tampering with microprocessor 54 will change the output of PUF circuit 100.

The secure protocols require use of random hash functions and encryption in a way such that the software code and the computation results are intertwined with the measurements of the physical characteristics of measurable component 102.

The controls and functions carried out by control module 54 and functional module 52 are not fixed, but depend on the software code running microprocessor 51.

The control algorithms prevent an adversary from directly obtaining the measurements generated from PUF circuit 100. This makes it difficult for the adversary to establish a model of PUF circuit 100 in order to simulate and clone the PUF circuit. The control algorithms also prevent an adversary from directly obtaining the computation results generated by microprocessor 51. This makes it possible to verify the authenticity of the computation results. In addition, the control algorithms allow a user to generate (through an insecure channel) challenge-response pairs that are unique to the PUF circuit 100 and are private to the user.

The term "CPUF chip" will be used to refer to a chip that contains a PUF circuit that can only be accessed through control (either through a microprocessor implementing a control algorithm or through a dedicated control circuit). The term "CPUF device" will be used to refer to a device that includes a CPUF chip.

The control algorithms allow a response to be sent out of CPUF chip 48 only if a "prechallenge" is given as input to the CPUF chip. The prechallenge is used to generate a challenge that is used in a process for generating new challenge-response pairs. Once a new challenge-response pair has been generated, the prechallenge can be discarded.

The control algorithms are designed so that when a challenge is given as input to CPUF chip 48, the CPUF chip can generate a secret key that is used internally, but will neither output the secret key nor output the response to the challenge. The secret key can be used to encrypt a message generated by CPUF chip 48, or to generate a message authentication code (MAC) for the message. This allows a set of challenge-response pairs (CRPs) to be generated through a secure channel and later used in an insecure channel. By generating a secret key that is not accessible to the adversary, so called "man-in-the-middle" attacks can be prevented.

Man-in-the-middle Attack

The following is a short description of man-in-the-middle attacks. Using PUF circuit 100 allows authentication of chip 50. However, when a person or machine interacts with the chip through an insecure communication channel, it may be possible for an adversary to carry out a man-in-the-middle attack by intercepting the inputs and outputs of chip 50. For example, assume that a phone card includes a PUF chip that stores information indicating the remaining amount of money. After the person using the phone card finishes a telephone call, the card reader instructs the phone card to deduct a certain amount from the remaining time or money. An adversary can use a fake card resembling a real phone card to read the challenge from the card reader, send the challenge to a real phone card to generate a response, then send the correct response to the card reader through the fake card. The card reader will act as if it were interacting to the real phone card when in fact it is interacting with a fake card. The fake card can be designed to act as if it were following the card reader's instruction to perform the deduction when in fact the fake card never deducts the amount.

Having a PUF circuit 100 on the smartcard allows the card reader to prove that the person receiving the challenge and generating the response has possession of the authentic smartcard, but does not necessarily guarantee that the smartcard actually carried out a particular operation requested by the card reader.

Another example of a man-in-the-middle attack exists in a situation where a user wants to use the PUF chip to perform certified executions. The user sends the PUF chip a program to execute. The program executes on the PUF chip. An adversary can replace the user's program by a program of his own choosing, and get his program to execute on the PUF chip. The adversary's program can produce messages that look like messages that the user is expecting, but which are in fact forgeries.

Control Algorithms

Figure 15:
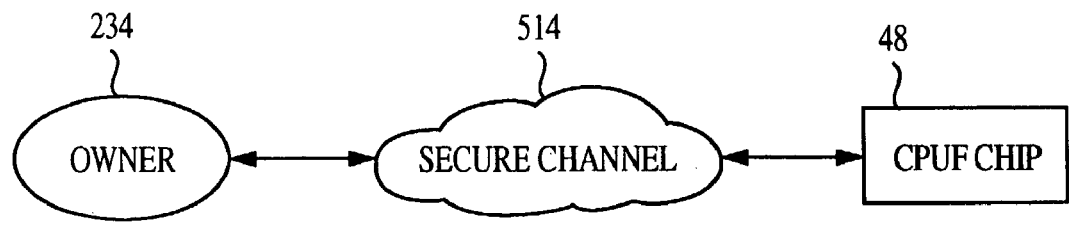
FIGS. 15-30 are diagrams illustrating control algorithms and relationships between entities that are relevant to the control algorithm.
Figure 16:
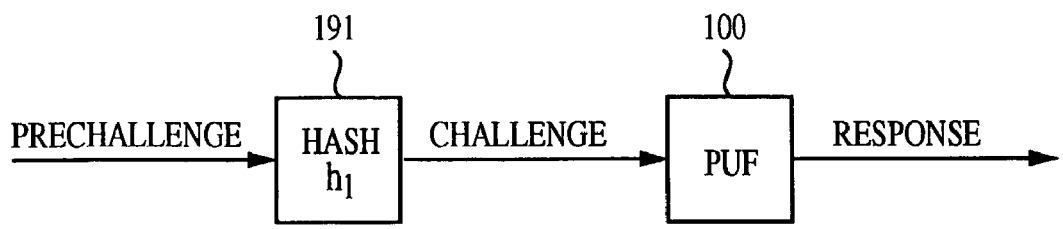

The following describes a process used to generate challenge-response pairs (CRPs), and a process for using a CRP to generate a secret key for authenticating a message. Referring to FIG. 15, an owner 234 communicates with a CPUF chip 48 through a secure communication channel 514 to generate a CRP. Referring to FIG. 16, to generate the CRP, a prechallenge is sent to a one-way random hash module $h_1$ 191 to generate a challenge, which is sent to PUF circuit 100 to generate a response. The random hash module $h_1$ 191 is a part of control module 54, and is implemented by microprocessor 51 using a subroutine that is stored in a memory (not shown) accessible to the microprocessor. The response is sent out of chip 48 to owner 234.

Hereafter, to simplify the description, the procedure for error correction coding is omitted.

Figure 17:
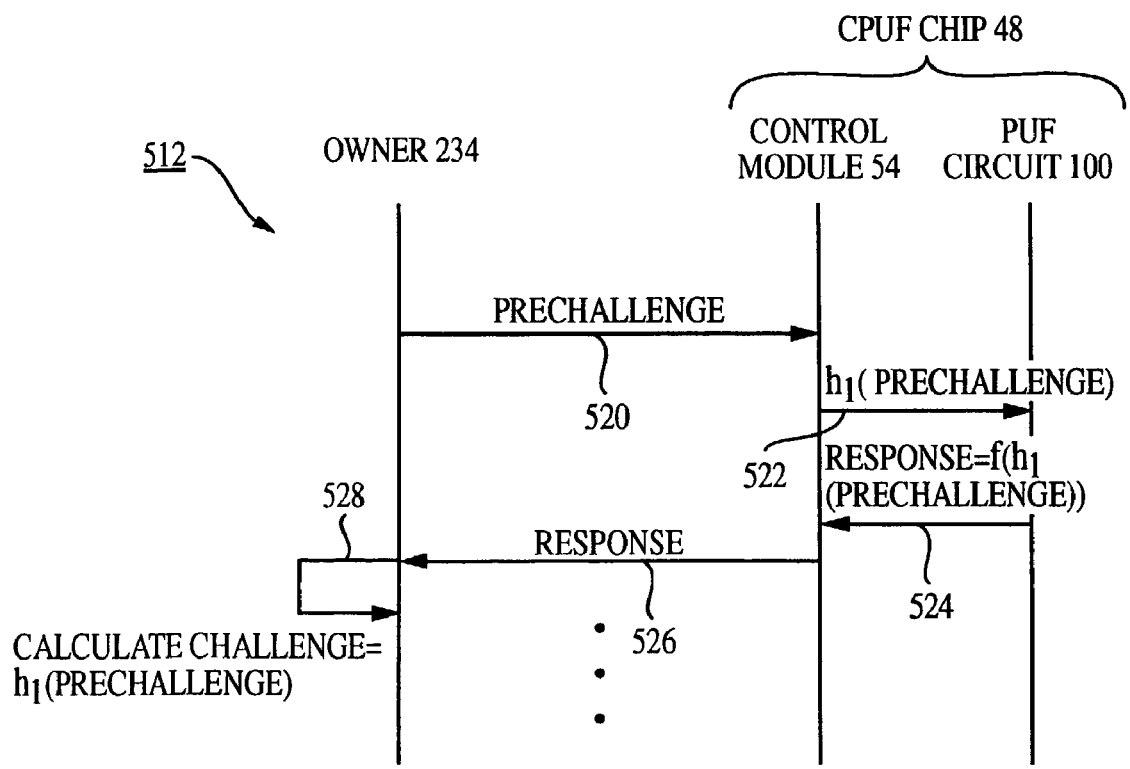

FIG. 17 shows a timeline diagram of a process 512 for generating a CRP. Process 512 includes the following steps:

Step 520: Owner 234 randomly selects a prechallenge and sends it to control module 54.

Step 522: Control module 54 computes a challenge using the formula challenge=$h_1$(prechallenge), and sends the challenge to the PUF circuit.

Step 524: PUF circuit 100 generates a response based on the formula response=$f$(challenge)=$f(h_1$(prechallenge)), and sends the response to control module 54.

Step 526: Control module 54 outputs the response to owner 234.

Step 528: Owner 234 calculates the challenge using the formula challenge=$h_1$(prechallenge).

Steps 520 to 528 are repeated several times using randomly selected prechallenges until a set of CRPs are created. The CRPs are stored in a secure location, and the prechallenges are discarded.

Figure 18:
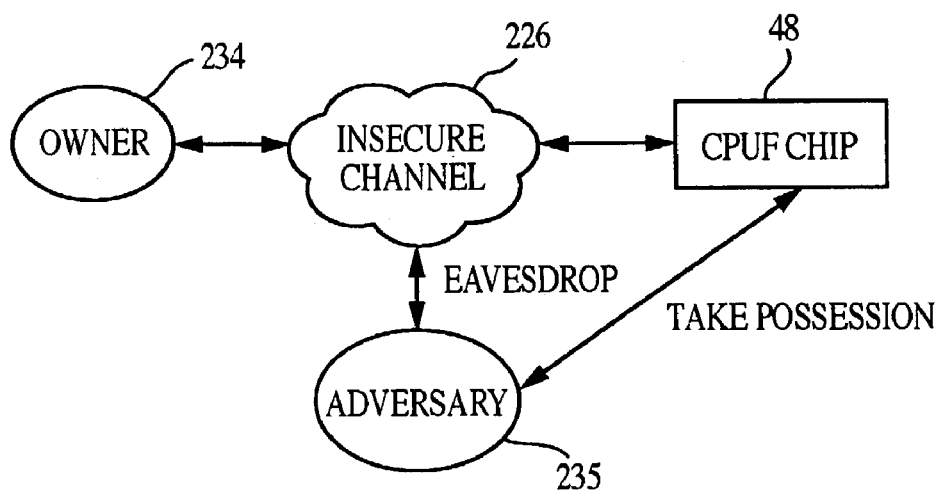

Referring to FIG. 18, after a set of CRPs have been created, owner 234 (or a user who obtained the set of CRPs from owner 234) can use the CRPs to authenticate CPUF chip 48 through an insecure communication channel 226. An adversary 235 may eavesdrop on the communication between owner 234 and CPUF chip 48. The adversary 235 may also be in possession of CPUF chip 48.

Figure 19:
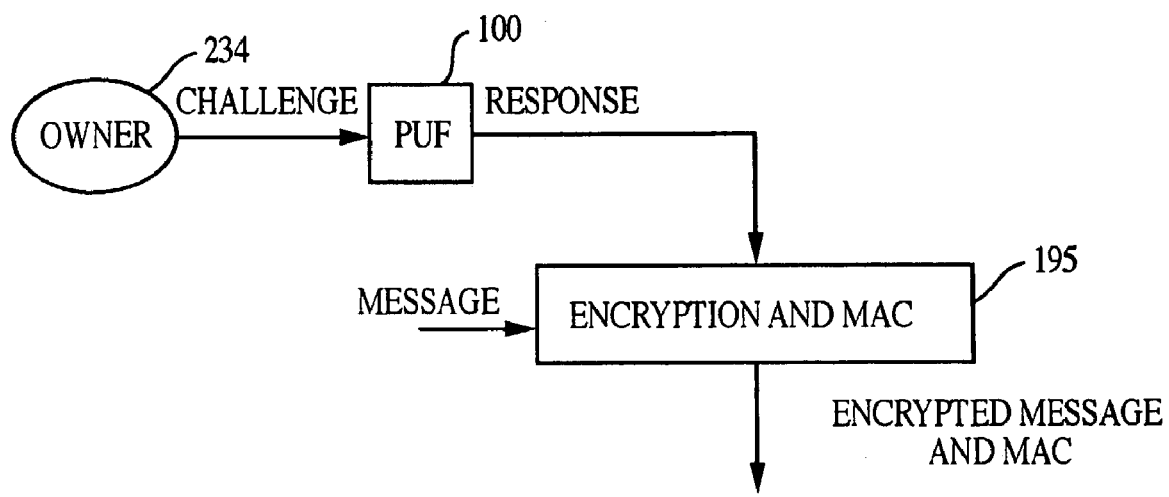

Referring to FIG. 19, to authenticate CPUF chip 48, owner 234 sends a challenge to PUF circuit 100 (of the CPUF chip), which generates a response that is used by an encryption and MAC module 195 to encrypt a message (e.g., generated by functional module 52) and to generate a message authentication code (MAC) for the encrypted message. The encryption and MAC module 195 are part of control module 54.

A MAC of a message can be generated by using a hash function to condense the message and a secret key that is shared between the message sender and the message receiver. The MAC is typically sent to the receiver along with the message. The receiver computes the MAC on the received message using the same secret key and hash function that was used by the sender, and compares the computed result with the received MAC. If the two values match, the message has been correctly received, and the receiver is assured that the sender is a member of a community who has knowledge of the secret key. An example of an algorithm for computing the MAC is Keyed-Hash Message Authentication Code (HMAC) algorithm, as described in Federal Information Processing Standards Publication 198, issued by National Institute of Standards and Technology on Mar. 6, 2002.

When owner 234 receives the encrypted message and the MAC, he can decrypt the encrypted message using the response to obtain the message. The owner can verify the integrity of the encrypted message by generating a MAC for the encrypted message using the response, and comparing the MAC that he generated with the MAC that he received. If the MACs match, there is a high probability that the message is actually generated by CPUF chip 48 and not by a counterfeit chip.

Figure 20:
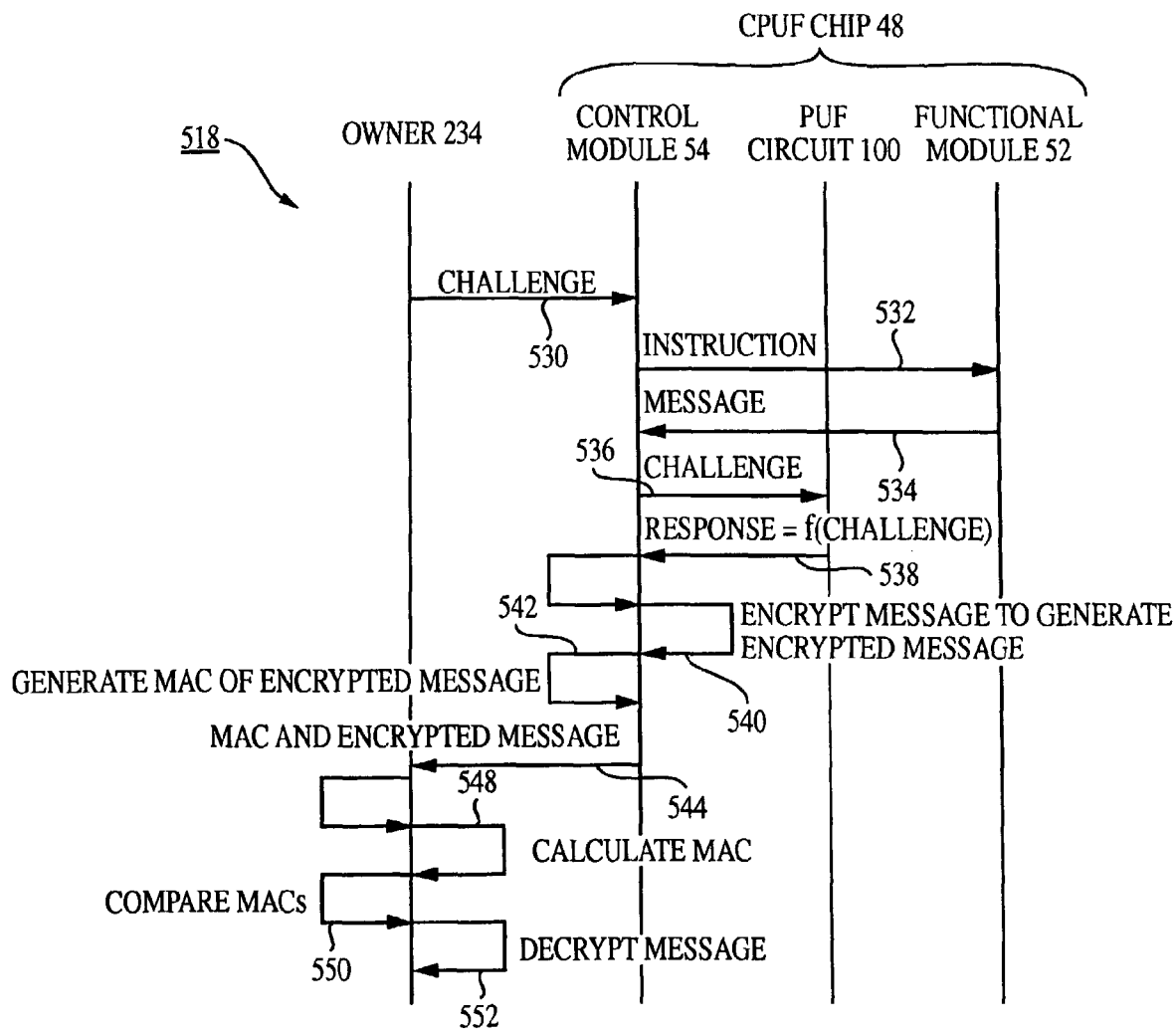

FIG. 20 shows a timeline diagram of a process 518 for authenticating a CPUF chip 48. Process 518 includes the following steps:

Step 530: Owner 234 retrieves a pre-stored challenge-response pair from the database, and sends a program containing the challenge to control module 54.

Step 532: Control module 54 sends an instruction to functional module 52. The instruction may be a simple command that requests functional circuit to respond with a default message. The instruction may also include a program segment with data that causes functional circuit to process the data and generate a message representing the process result.

Step 534: Function circuit 52 sends the message to control module 54.

Step 536: Control module 54 sends the challenge to PUF circuit 100.

Step 538: PUF circuit 100 generates a response based on the formula response=f(challenge), and sends the response to control module 54.

Step 540: Control module 54 encrypts the message using the response.

Step 542: Control module 54 generates a MAC of the encrypted message using the response.

Step 544: Control module 54 sends the encrypted message and the MAC to owner 234.

Step 548: Owner 234 calculates the MAC of the encrypted message using the response.

Step 550: Owner 234 compares the computed MAC and the received MAC to determine authenticity of the encrypted message.

Step 552: Owner decrypts the encrypted message using the response to generate the message.

In one scenario, when a user is trying to authenticate CPUF chip 48 through the insecure channel 226, the CPUF chip may be in possession of adversary 235 who wishes to compromise the message generated by the CPUF chip. The adversary may attempt to substitute a fake message for the authentic message. In order to do so, the adversary has to obtain the response to generate the correct MAC. However, the adversary has no knowledge of the response. Although the adversary can intercept the challenge, he cannot obtain the response since the response is sent outside of the chip only if a prechallenge is given as input to the chip, and the adversary cannot invert the hash function to obtain the prechallenge from the challenge. Since the adversary cannot obtain the response, he cannot launch a man-in-the-middle attack and compromise the message from CPUF chip 48.

To make chip 48 robust to physical attacks, control module 54 is intertwined with PUF circuit 100 so that an adversary cannot bypass control module 54 through physical probing. This can be achieved by constructing the measurable component on one or more layers surrounding control module 54 so that an adversary cannot access control module 54 without altering the measurable physical characteristics, thereby changing the function implemented by PUF circuit 100.

Management of CRPs

In process 512 of FIG. 17, owner 234 is assumed to be communicating with CPUF chip 48 through a secure channel 514. The following describes a process that allows owner 234, who has possession of an old CRP known only to the owner, to generate a new CRP through the insecure channel 226.

Figure 21:
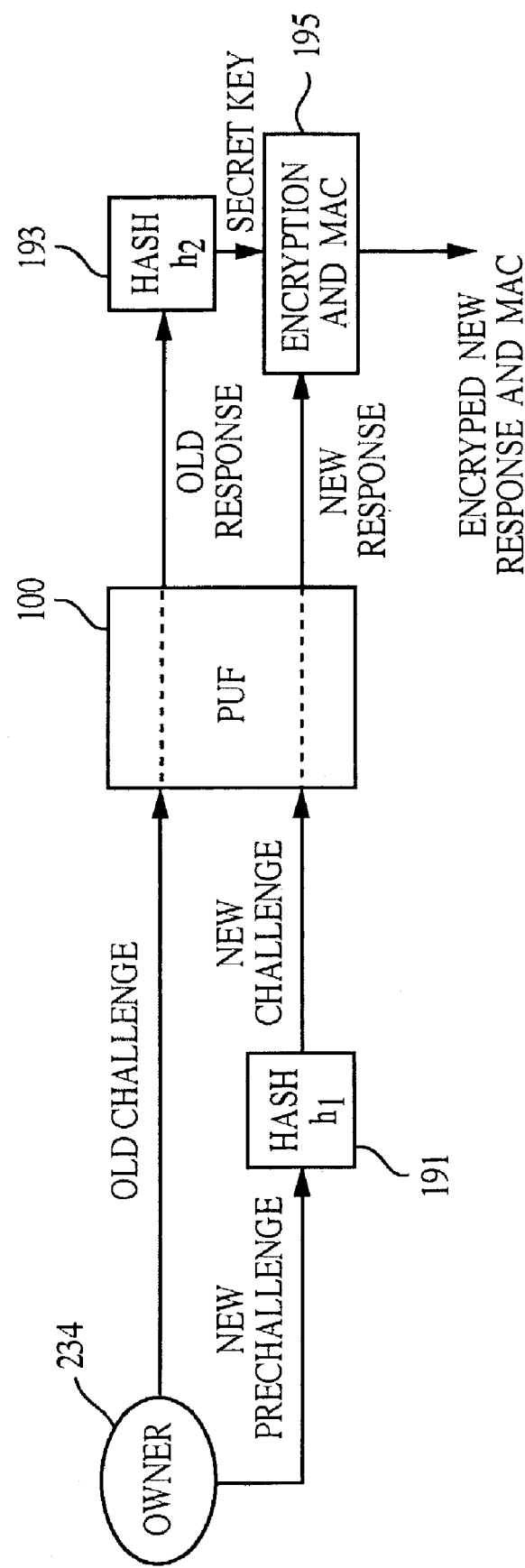

Referring to FIG. 21, owner 234 sends an old challenge and a new prechallenge to CPUF chip 48. The prechallenge is a randomly selected number. The new prechallenge passes through hash module 191 to generate a new challenge, which is passed through PUF circuit 100 to generate a new response. The old challenge is passed through PUF circuit 100 to generate an old response, which is passed through a hash module $h_2$ 193 to generate a secret key. The secret key is used by encryption and MAC module 195 to encrypt the message and generate a MAC for the encrypted message. The encrypted message and the MAC is sent out of the chip and forwarded to owner 234. Owner 234 can calculate the MAC because he has the old response and can calculate the secret key. The owner can then check the authenticity of the encrypted message using the MAC and decrypt the encrypted message to obtain the new response.

Because the adversary does not have knowledge of the secret key, he cannot decrypt the encrypted message to obtain the new response. If the adversary substitutes the new response with a fake response, or uses a fake secret key, the owner will know because the MAC will be incorrect.

Figure 22:
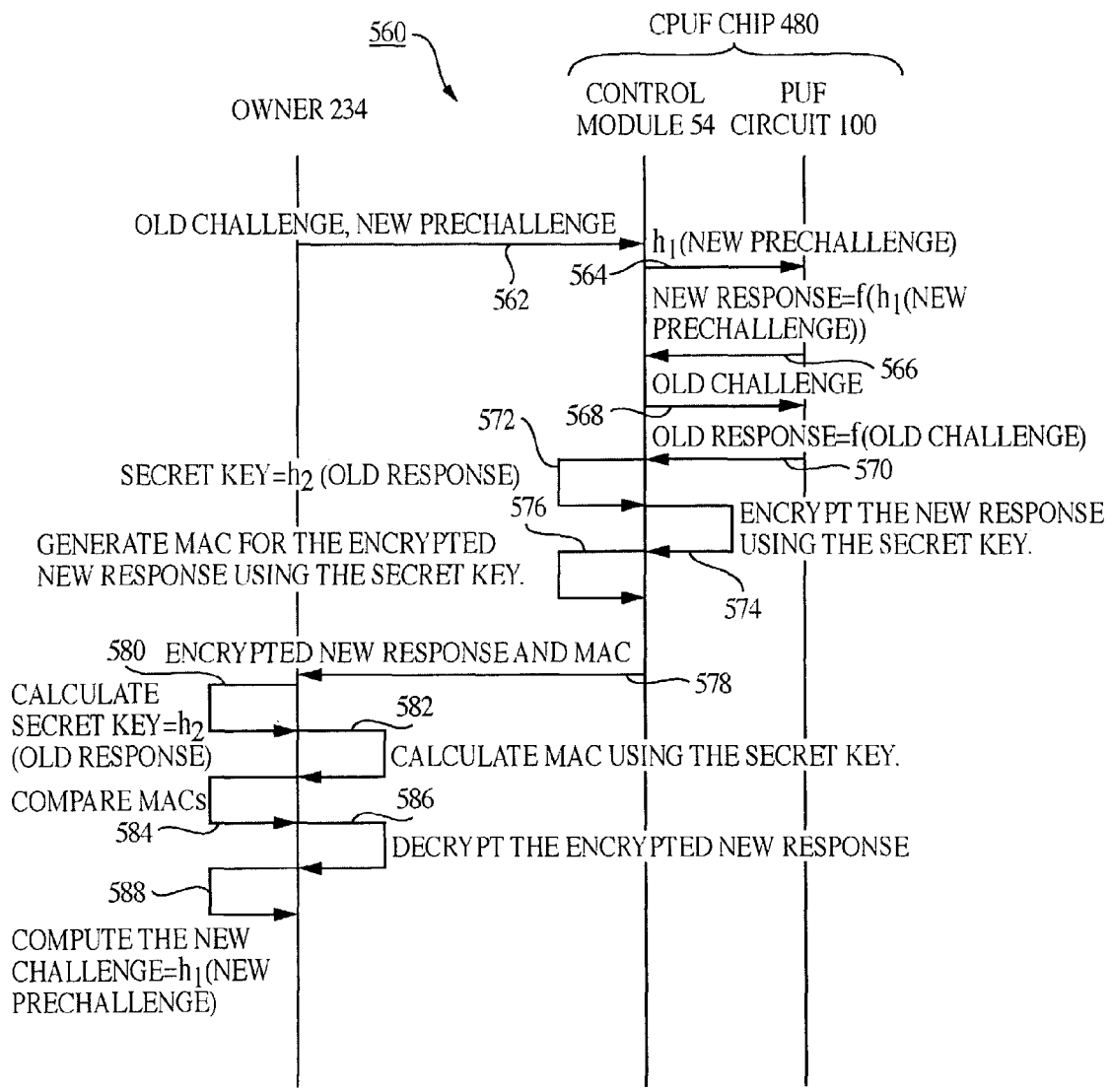

FIG. 22 shows a timeline diagram of a process 560 that allows owner 234 to generate a new CRP from an old CRP that is known only to the owner. Owner 234 communicates with the CPUF chip through an insecure channel. Process 560 includes the following steps:

Step 562: Owner 234 randomly selects a new prechallenge, and sends the new prechallenge and the old challenge in the old CRP to control module 54.

Steps 564-566: A new response is generated from the new prechallenge, similar to steps 522-524 in FIG. 17.

Step 568: Control module 54 sends the old challenge to PUF circuit 100.

Step 570: PUF circuit 100 generates an old response and sends it to control module 54.

Steps 572-578: Similar to steps 539-544, control module 54 generates a secret key from the old response, encrypts the new response using the secret key, generates a MAC for the encrypted new response, and sends the encrypted new response and the MAC to owner 234.

Steps 580-586: Similar to steps 546-552, owner 234 calculates the secret key, calculates the MAC, and compares the computed MAC with the MAC sent from control module 54. If they match, the encrypted new response is authentic. Owner 234 decrypts the new response to obtain the new response.

Step 588: Owner 234 calculates the new challenge using the formula new challenge=$h_1$(new prechallenge).

Figure 23:
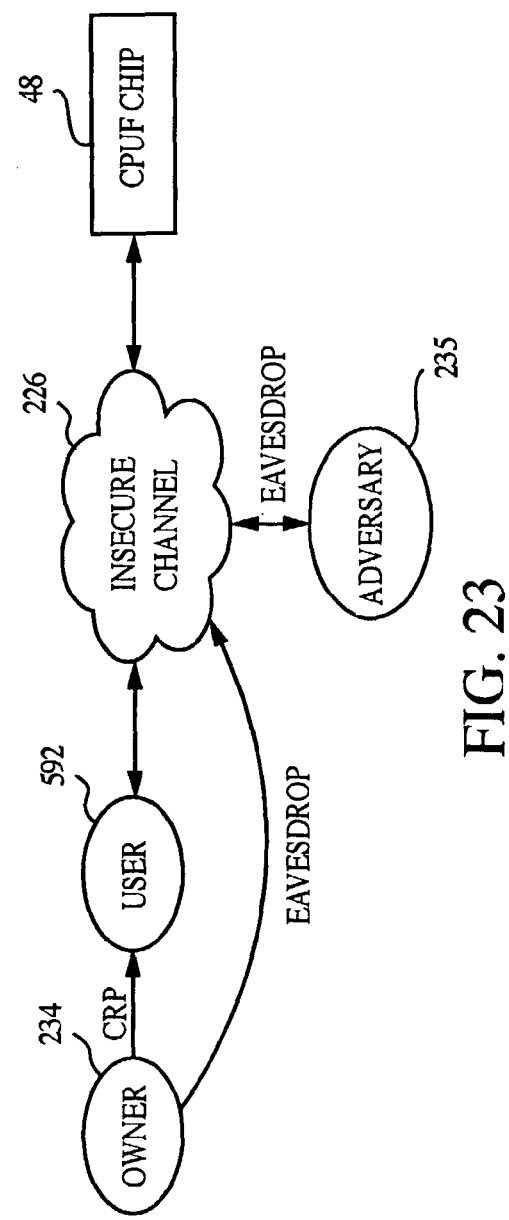

In process 560 of FIG. 22, it is assumed that the owner 234 generating a new CRP already has an old CRP that nobody else knows. Referring to FIG. 23, if a user 592 obtains an old CRP from owner 234, and the user wishes to generate a new CRP using the old CRP, then process 560 cannot prevent owner 234 from eavesdropping and obtaining the new response. This is because owner 234 can calculate the secret key from the old response. The following describes a process that allows user 592 to generate a new CRP in a way that prevents owner 234 from learning about the new response. This is achieved by encrypting the new response with the user's public key using a public key encryption algorithm.

Figure 24:
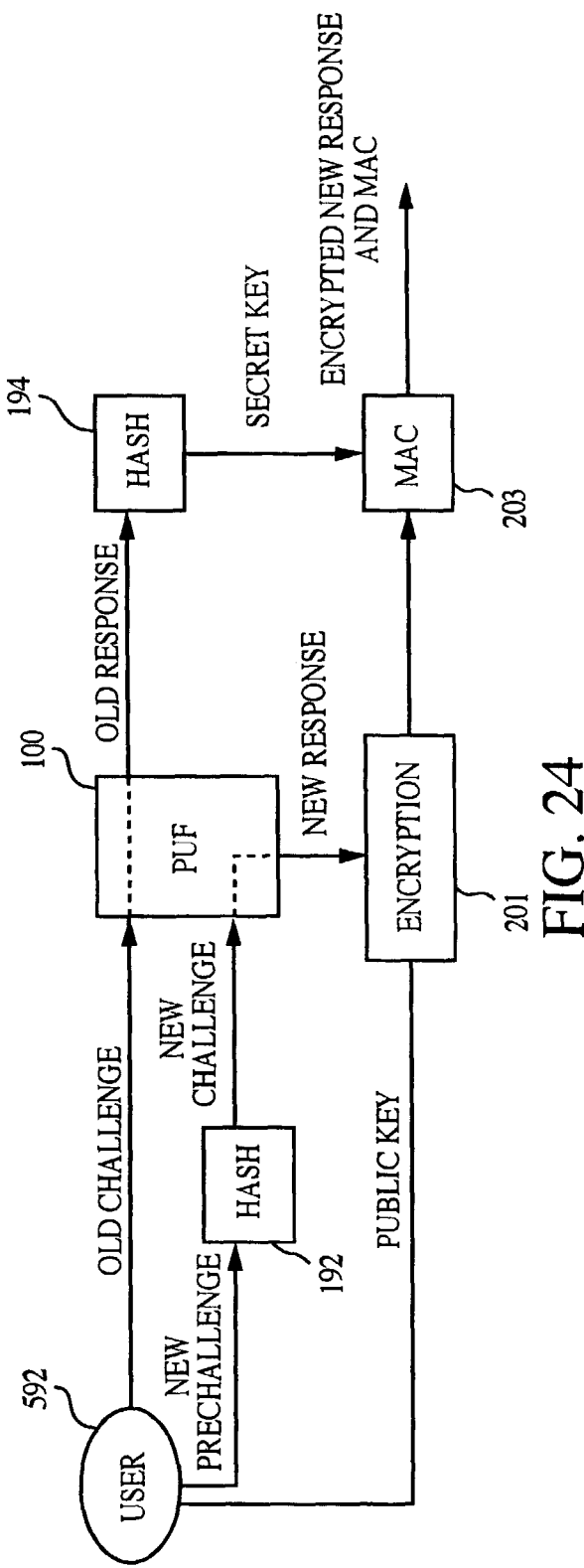

Referring to FIG. 24, user 592 sends an old challenge, a new prechallenge, and his public key to CPUF chip 48. The old challenge is sent to PUF circuit 100 to generate an old response, which is sent to hash module 194 to generate a secret key. The new prechallenge is passed through hash module 192 to generate a new challenge, which is passed through PUF circuit 100 to generate a new response. The new response is encrypted by an encryption module 201 using the user's public key to generate an encrypted new response. A MAC module 203 uses the secret key as a MAC key to generate a MAC for the encrypted new response. The encrypted new response and the MAC are sent out of chip 48 and forwarded to user 592. User 592 can calculate the MAC from the secret key since he has the old response. By checking the MAC, user 592 can verify the integrity of the encrypted new response. User 592 can use his private key to decrypt the encrypted new response to obtain the new response.

An adversary cannot obtain the new response or insert a fake response because he does not know the secret key. Owner cannot obtain the new response because he cannot decrypt the message encrypted with the user's public key.

To implement process 590, a software program containing the old challenge, the new prechallenge, and the user's public key is sent to control module 54 through I/O port 105. The program causes control module 54 to generate a new response, encrypt the new response, generate an MAC for the new response, and output the encrypted new response and the MAC according to process 590.

Figure 25:
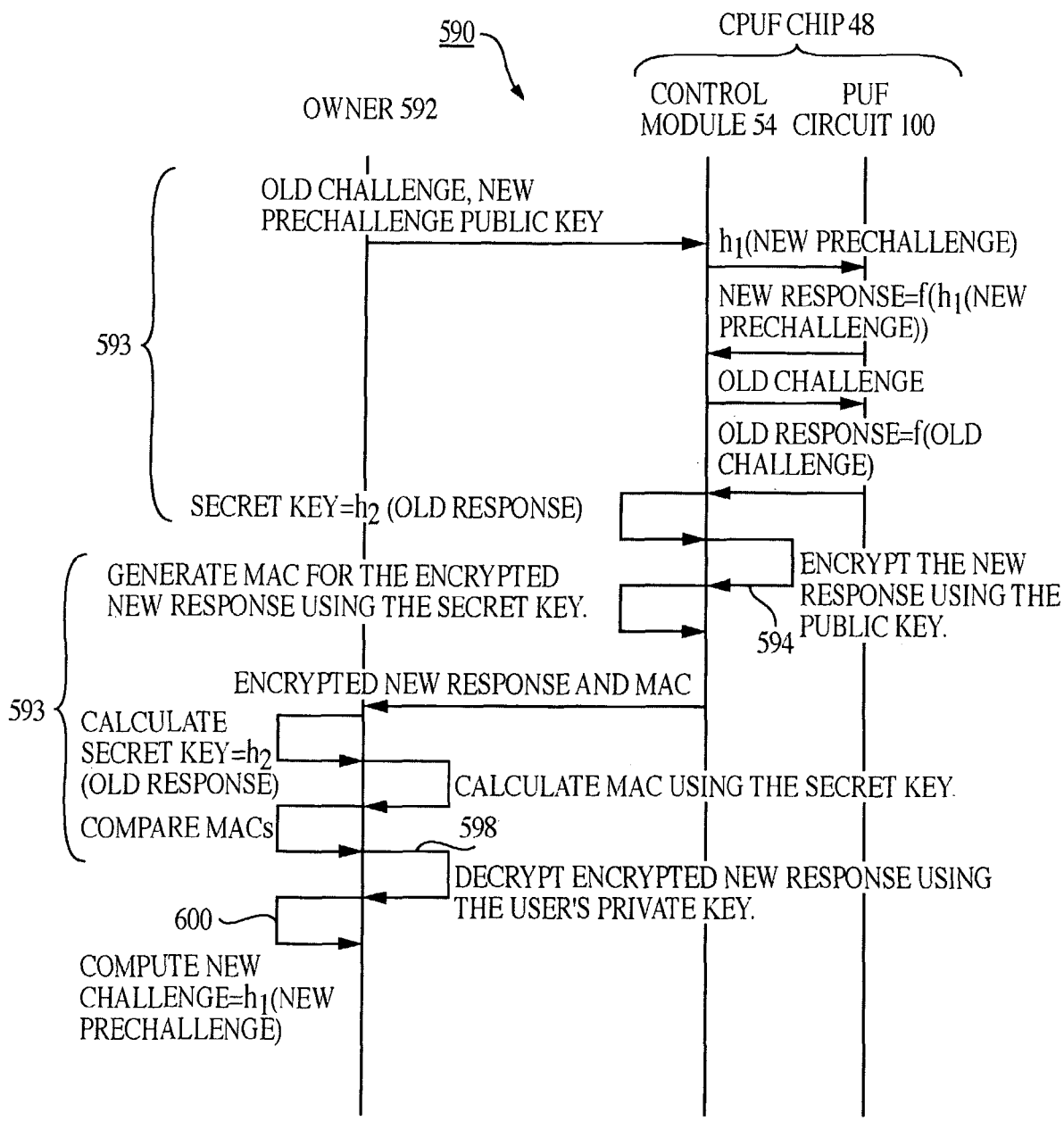

FIG. 25 shows a timeline diagram of a process 590 that allows user 592 to generate a new CRP from an old CRP obtained from owner 234. User 592 communicates with CPUF chip 48 through an insecure channel. Process 590 includes the following steps:

Step 593: Similar to steps 562-572 of FIG. 22.
Step 594: Control module 54 encrypts the new response using the user's public key.
Step 596: Similar to steps 576-584.
Step 598: Decrypt the encrypted new message using the user's private key to obtain the new response.
Step 600: Similar to step 588.

Implementation of the Control Algorithms

The following describes an implementation of a control algorithm that is used to create secret keys that are shared between a CPUF chip and an entity that wishes to authenticate the chip or use the chip in an authenticated way. Below are a number of basic procedures that can be executed by control module 54 to implement the control algorithm.

Output(arg1, . . . ): This procedure is used to send results (arg1, . . . ) out of the CPUF chip. Any result that is sent out of the CPUF chip over an insecure link is potentially visible to the adversary.

EncryptAndMAC(message, key): This procedure is used to encrypt a message (message) using a key (key) as the encryption key, and generate a MAC of the encrypted message using the key.

PublicEncrypt(message, public_key): This procedure is used to encrypt a message using a public key (public_key) according to a public key encryption algorithm.

MAC(message, key): This procedure generates a MAC of a message using a key (key).

The control algorithm is designed so that the PUF can only be accessed by programs. For example, the programs access the PUF by using two primitive procedures whose outputs depend on the program containing these primitives. The primitive procedures are defined as:

GetResponse(PreChallenge)=$f(h_1(h_1(Program), PreChallenge))$;
GetSecret(Challenge)=$h_2(h_1(Program), f(Challenge))$;

where $f$ is a PUF, $h_1$ and $h_2$ are publicly available one-way random hash functions (or pseudo-random hash functions), and Program is the program that is being run in an authentic way (i.e., it is the results from execution of Program that need to be authenticated). Program will contain the values for Challenge or PreChallenge. Program will contain calls to the primitive functions GetResponse and/or GetSecret, so evaluating GetResponse or GetSecret requires computing the hash of Program. The programs will have a phrase "begin program" and a phrase "end program." When evaluating $h_i$(Program), the program codes that are between "begin program" and "end program" are passed through the hash function $h_i$ to generate the hash value. Assuming that $h_i$ is a collision-resistant hash function, then if Program is altered in any way, the values for GetResponse and GetSecret will change as well.

Figure 26:
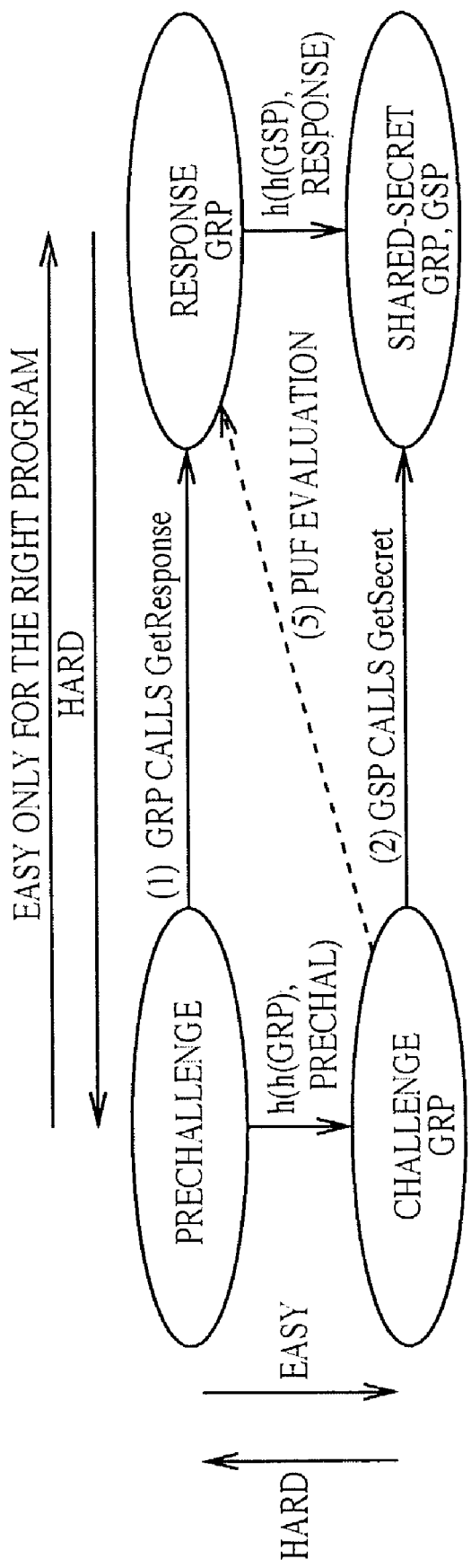

FIG. 26 is a diagram that summarizes the possible ways of going between pre-challenges, challenges, responses and shared secrets. GRP and GSP are programs that call GetResponse and GetSecret, respectively. In the diagram, moving down is easily achieved by calculating hash values. Moving up is hard because it would involve reversing those hash functions, which are one-way functions. Going from left to right is easy for the program whose hash value is used in the GetResponse or GetSecret primitives, and hard for all other programs. Going from right to left is hard if we assume that the PUF cannot invert a one-way hash function.

Control Programs

Below are examples of programs that are used to generate secret keys and to manage challenge-response pairs. In using these programs, the CPUF need not preserve state between program executions.

The program Obtain Secret Program is an example of a program that is used to obtain a secret that can be shared between the user and the CPUF chip.

```
/* Obtain Secret Program */
begin program
    Secret = GetSecret (Challenge)
    /* Program uses Secret as a shared *
     * secret with the user           */
end program
```

Here, Challenge is a challenge from a challenge-response pair known by the user who is sending the program.

To evaluate GetSecret(Challenge), it is necessary to evaluate $h_1(h_1(Program), f(Challenge))$. In evaluating $h_1$(Program), everything contained between "begin program" and "end program," including the actual value of Challenge, is run through the hash function $h_1$. The same program code with a different value for Challenge would have a different program hash, resulting in a different secret.

The user can determine Secret because he has the challenge-response pair and knows the response to Challenge. The user can calculate $h_1(h_1(Program), response)$ to determine Secret. To the contrary, an adversary will not be able to determine what the secret is. The adversary can see what Challenge is by looking at the program sent to the CPUF. But because the CPUF chip is designed in a way that the adversary cannot access PUF without modifying the measurable physical characteristics of the PUF, the adversary cannot probe the PUF to find out what the response is.

By using control programs that use secret keys, the control algorithms described herein can be easily applied to existing applications where public key encryption system are used. In a public key encryption system, an individual who wishes to communicate securely with another individual can use that individual's public key to encrypt messages that will only be readable by that individual. The public key is originally obtained from some trusted party who already knows the public key, and with whom an authenticated channel exists. With CPUFs, an individual who wishes to communicate securely with a device uses the challenge of a challenge-response pair to generate a symmetric key which he shares with the device, and that he can use to communicate. The challenge-response pair is initially obtained from a trusted party with whom an authenticated and private channel exists Using Control Programs to Obtain New CRPs In the following description, an owner or user of CPUF chip 48 sends a program to control module 54 of the CPUF chip through an input/output (I/O) port 105 of chip 48 (see FIG. 14).

Figure 27:
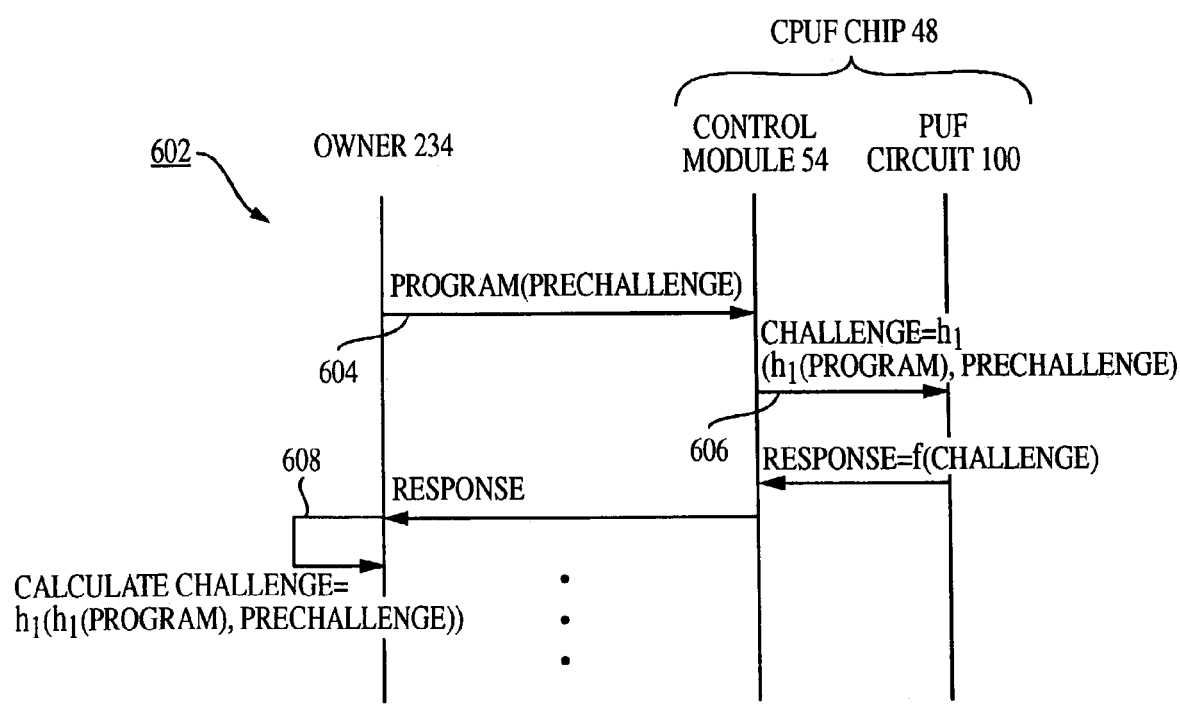

Referring to FIG. 27, an owner 234 who has a secure link to a CPUF chip can use a program, Bootstrapping Program, to obtain a new CRP according to a process 602.

```
/* Bootstrapping Program */
begin program
    Response = GetResponse (PreChallenge);
    Output (Response);
end program
```

Process 602 is similar to process 512 (FIG. 17). The description below focuses on the steps in process 602 that are different from those in process 512. In step 604, owner 234 randomly selects a prechallenge (PreChallenge), and sends a program (Bootstrapping Program), which contains the prechallenge, to control module 54. In steps 606 and 608, the challenge for the new CRP is calculated using the formula "challenge=$h_1(h_1$(Bootstrapping Program), PreChallenge)." The response for the new CRP is Response, and the challenge for the new CRP is "$h_1(h_1$(Bootstrapping Program), PreChallenge)."

Figure 28:
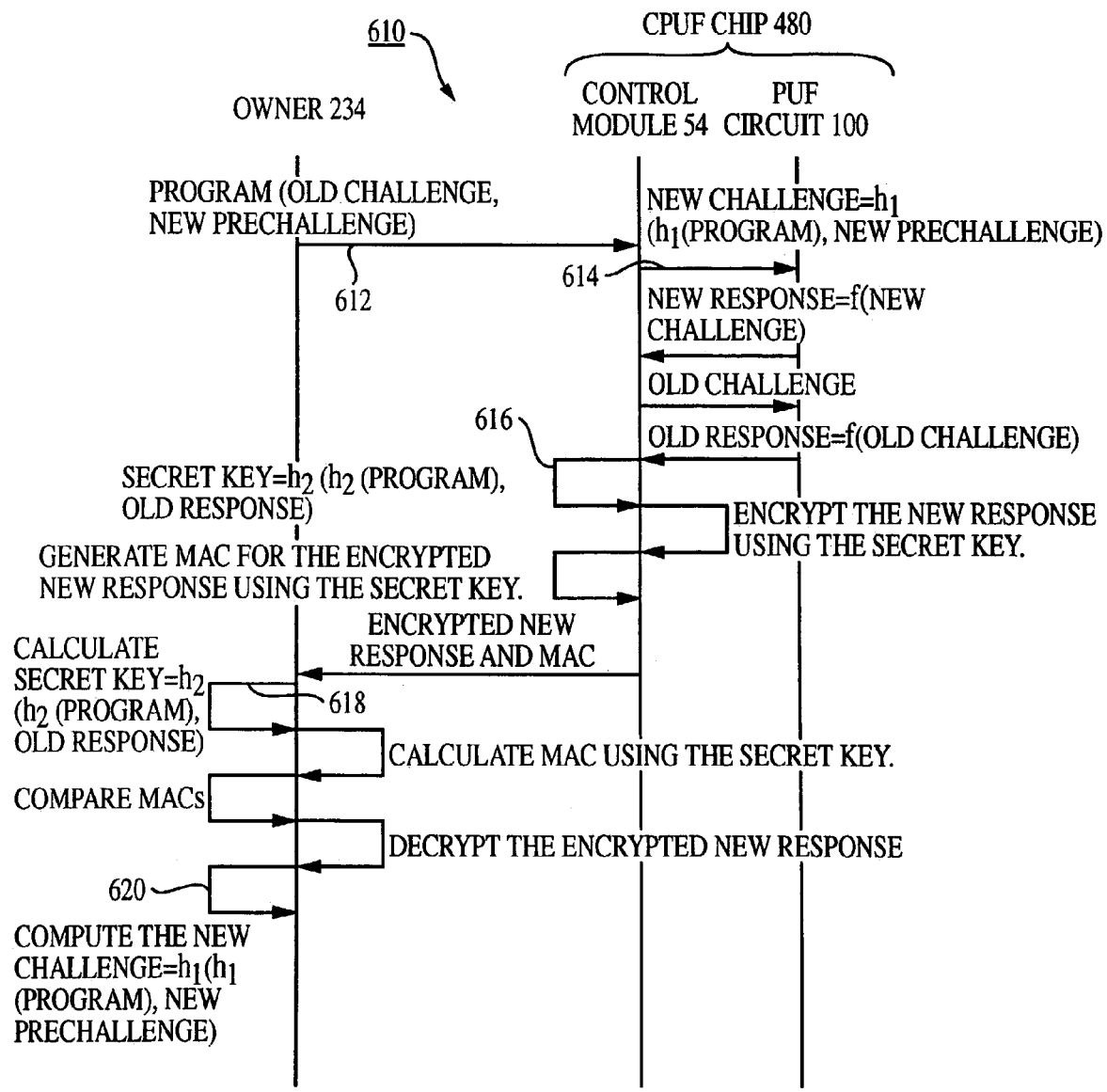

Referring to FIG. 28, an owner 234 who has an insecure link to a CPUF chip and has a CRP that is not known to anyone else and never used before, can use a program, Renewal Program, to obtain a new CRP according to a process 610.

```
/* Renewal Program */
begin program
    NewResponse = GetResponse (PreChallenge);
    Output (EncryptAndMAC (NewResponse,
        GetSecret (OldChallenge)));
end program
```

Process 610 is similar to process 560 (FIG. 22). The description below focuses on the steps in process 610 that are different from those in process 560. In step 612, owner 234 selects an arbitrary value for a prechallenge, PreChallenge, and sets the value of OldChallenge to the challenge from the old CRP. Owner 234 sends a program (Renewal Program) that contains the new prechallenge and the old challenge to control module 54. In steps 614 and 620, a new challenge is calculated using the formula "challenge=$h_1(h_1$(Renewal Program), PreChallenge)."

In steps 616 and 618, a secret key is calculated using the formula "secret key=$h_2(h_2$(Renewal Program), old response)=$h_2(h_2$(Renewal Program), $f$(OldChallenge))." The response of the new CRP is NewResponse, and the challenge of the new CRP is "$h_1(h_1$(Renewal Program), PreChallenge)."

In process 610, an adversary may attempt to intercept the program, replace it with his own program, and substitute OldChallenge with a challenge that he knows the response to. The adversary may attempt to run the program through the CPUF chip to generate a new response, then pass the new response to the user. However, by doing so, the adversary will obtain a response different from the one he is trying to hijack. This is because OldChallenge is part of the program, and GetResponse combines the pre-challenge with a random hash of the program that is being run to generate the response.

In the following description, a "certifier" is a person who has its own private list of CRPs for the CPUF and is trusted by the user. The manufacturer of the chip can act as a certifier to other users. After the user has established its own private list of CRPs, it may act as a certifier to another user, if the second user trusts the first user. For example, if the user trusts the owner of the chip, the owner of the chip can act as a certifier. A certifier can use the Renewal Program to create a new CRP and send the new CRP to a user through a secure channel. A CRP that is certified by a certified is referred to as a "certified CRP." The user then uses a Private Renewal Program, shown below, to produce a CRP that the certifier does not know. A CRP that is private to the user and not known to anyone else is referred to as a "private CRP."

Figure 29:
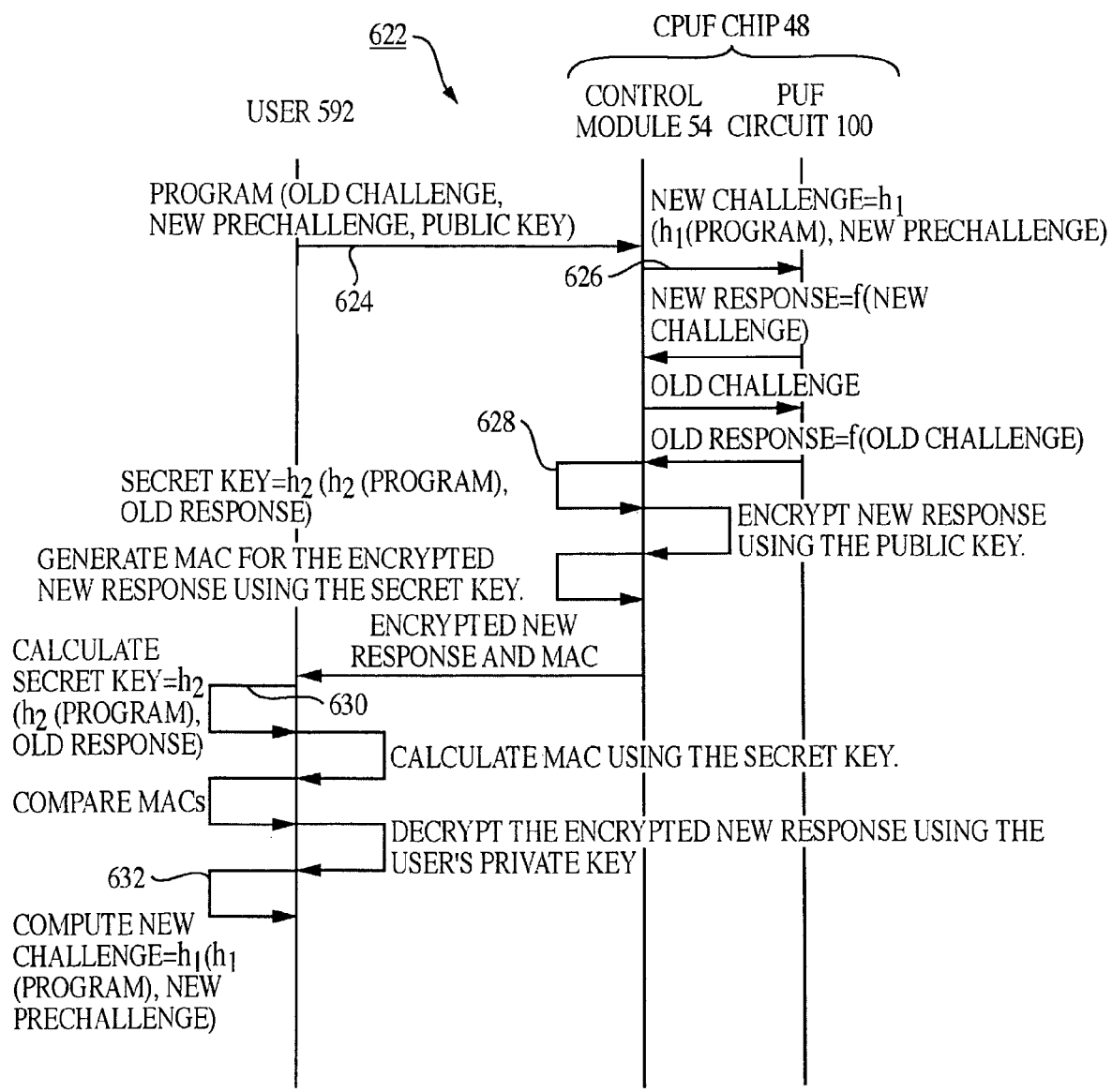

Referring to FIG. 29, an user 592 who obtained a certified CRP can generate a private CRP according to a process 622 by sending a program, Private Renewal Program, shown below, to CPUF chip 48. Here, it is assumed that the link between user 592 CPUF chip 48 is insecure, and that the certified CRP was never used before.

```
/* Private Renewal Program */
begin program
    NewResponse = GetResponse (PreChallenge);
    Message =PublicEncrypt (NewResponse, PublicKey);
    Output (Message, MAC (Message,
        GetSecret (OldChallenge)));
end program
```

Process 622 is similar to process 590 (FIG. 25). The description below focuses on the steps in process 610 that are different from those in process 560. In step 624, user 592 sends a program (Private Renewal Program) that contains the new prechallenge, the old challenge, and the user's public key (PublicKey) to CPUF chip 48. In Private Renewal Program, PreChallenge is an arbitrary number randomly selected by user 592, OldChallenge is the challenge in the certified CRP, and PublicKey is the user's public key.

In steps 626 and 632, a new challenge is calculated using the formula "challenge=$h_1(h_1$(Private Renewal Program), PreChallenge)." In steps 628 and 630, a secret key is calculated using the formula "secret key=$h_2(h_2$(Private Renewal Program), old response)=$h_2(h_2$(Private Renewal Program), $f$(OldChallenge))." The response of the new CRP is NewResponse, and the challenge of the new CRP is "$h_1(h_1$(Private Renewal Program), PreChallenge)."

It is unlikely that anyone other than the user can read NewResponse because it is encrypted with the user's public key. If an adversary tries to replace PublicKey by his own public key, he will get a different response because PublicKey is part of the program, and therefore indirectly changes the output of GetResponse. The MAC can only be forged by the person that the user is sharing the old CRP with (probably a certifier that just introduced the CRP to the user). Assuming that person is reliable, then the user can be certain that the MAC was produced by the CPUF chip, and therefore, NewResponse is indeed a response generated by CPUF chip.

Implementing Multiple Personalities to Preserve Anonymity

In the CPUF g circuit 186 of FIG. 9, a user can select different personalities for the CPUF g circuit 186 by using different numbers for the PersonalitySelect signal on line 197. The following describes a control algorithm for implementing selection of personalities. An owner of CPUF chip 48 (FIG. 14) who is trying to hide his identity is referred to as an "anonymous owner" of the CPUF chip. It is assumed that all sources of information concerning the identity of the CPUF chip's anonymous owner have been eliminated by other protocol layers. The control algorithm is designed to prevent CPUF chip 48 from leaking the anonymous owner's identity. It is assumed that there are enough people using anonymized introduction that traffic analysis (correlating the arrival of a message at a node with the departure of a message a little while later simply from timing considerations) is unusable.

The control algorithm is designed so that programs that are sent to CPUF chip 48 cannot freely set PersonalitySelect. Otherwise, those programs can put CPUF chip 48 into a known personality and defeat the purpose of having a personality selector. To implement selection of personality, the following primitive procedures are implemented by CPUF chip 48:

ChangePersonality(Seed): This procedure changes the personality to h(PersonalitySelect, Seed), where h is a random hash function.

RunProg(Program): This procedure runs the program that is given as an argument without changing PersonalitySelect. When a program is loaded into the CPUF chip from the outside world and run without going through RunProg, PersonalitySelect is set to zero, the default personality.

Decrypt(message, key): This procedure is used to decrypt the message, message, that was encrypted with an encryption key, key.

Hash WithProg(x): This procedure is used to compute h(h(program), x).

Hash( . . . ): This function is a random hash function.

Blind(message, factor): This procedure is used to apply the blinding factor, factor, to a message, message. The blinding factor will be described below.

Choosing the Current Personality

When the anonymous owner of CPUF chip 48 wants to show a personality other than the CPUF chip's default personality, he intercepts all programs being sent to the CPUF chip and encapsulates them in a piece of code of his own:

```
/* Select Personality Program */
ESeed =
    /* the personality seed encrypted with Secret */
EProgram =
    /* the encapsulated program encrypted with Secret */
begin program
    Secret = GetSecret (Challenge);
    Seed = Decrypt (Eseed, Secret);
    Program = Decrypt (EProgram, Secret);
    ChangePersonality (Seed);
    RunProg (Program);
end program
```

In Select Personality Program, the line that appears before "begin program" is a piece of data that accompanies the program but that does not participate in the hash of the program. If EProgram were included in the hash, then it would not be possible to encrypt it because the encryption key would depend on the encrypted program. Seed is derived from Eseed, which is an arbitrarily selected seed value encrypted with Secret. Challenge is the challenge of one of the anonymous owner's CRPs.

By encapsulating the program in this way, the anonymous owner is able to change the personality that the CPUF is exhibiting when it runs the user's program. There is no primitive procedure to allow the user's program to determine the personality that it is using. The seed that is used with ChangePersonality is encrypted so the user has no way of knowing which personality he is using. The user's program is encrypted, so even by monitoring the owner's communication, the user cannot determine if the program that is being sent to the CPUF is his own program.

An advantage of preserving anonymity of the owner is that multiple mutually mistrusting parties can securely use the same computing device.

Anonymous Introduction

The following describes a process for "anonymous introduction." In anonymous introduction, an owner of a CPUF chip gives a user a CRP certified by a certifier so that the user can use the CRP to perform certified executions on the CPUF chip. The owner does not want to reveal to the user which CPUF the CRP corresponds to. After anonymous introduction, the user obtains a certified CRP and can use the CRP to generate other CRPs and perform certified executions on the CPUF chip. However, the user will not be able to determine which CPUF he is using, and whether he is communicating with the same CPUF as other users or certifiers.

Figure 30:
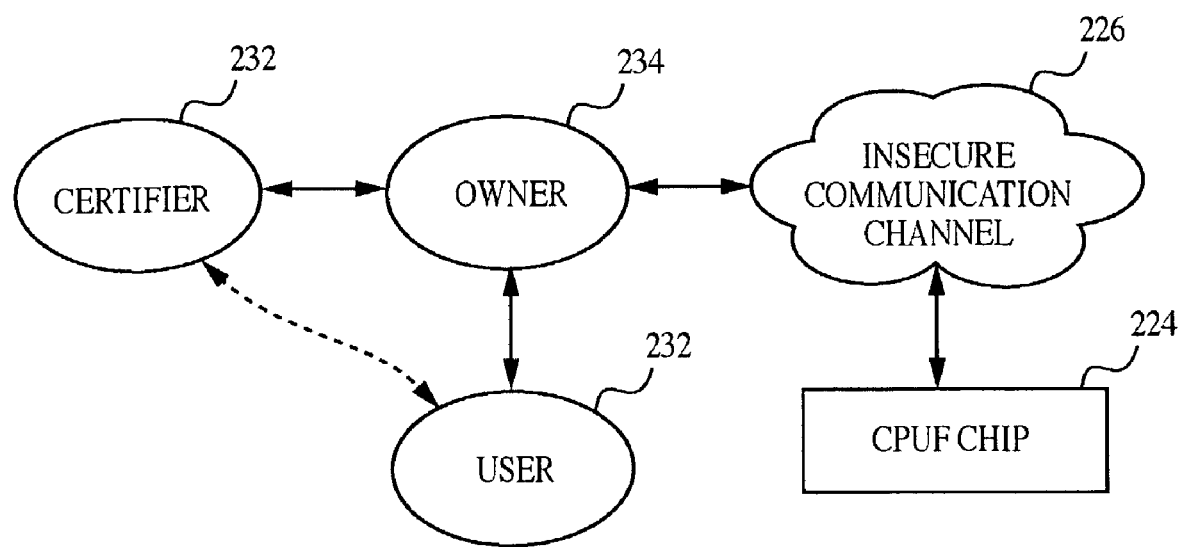

FIG. 30 illustrates a model for anonymous introduction. A user 222 does not have CRPs for a CPUF chip 224 and would like to establish his own private list of CRPs. A certifier 232 and an owner 234 communicate with each other, owner 234 and user 222 communicate with each other, and owner 234 communicates with CPUF chip 224. The communication channels between certifier 232, owner 234, and user 222 are secure (private and authentic). The communication channel 226 between owner 234 and CPUF chip 224 is insecure. Certifier 232 and user 222 can potentially collude to determine if their CRPs are for the same CPUF chip.

An example of a protocol for anonymous introduction uses a procedure called "blinding," which can be explained using the following example: Alice wants Bob to sign a message for her, but she does not want Bob to know what he has signed. To do this, Alice hides the message by applying a "blinding factor." Bob receives the blinded message, signs it, and returns the signed blinded message to Alice. Alice can then remove the blinding factor without damaging Bob's signature. The resulting message is signed by Bob, but if Bob signs many messages, he cannot tell which unblinded message he signed on which occasion.

The protocol for anonymous introduction includes the following steps:

Step 300: The owner of the CPUF chip collects a challenge from the certifier and the user's public key. The owner sends the program shown in FIG. 31 to the CPUF chip.

Step 302: The owner decrypts the output from the CPUF chip, checks the MAC, and passes Mesg5 on to the certifier, along with a copy of the program (only the part that participates in the MAC) encrypted with the certifier's public key.

Step 304: The certifier decrypts the program, checks that it is the official anonymous introduction program, then hashes it to calculate CertSecret. He can then verify that Mesg4 is authentic with the MAC. He signs Mesg4 and sends the result to the owner.

Step 306: The owner unblinds the message and ends up with a signed version of Mesg3. He can check the signature and the MAC in Mesg3 to make sure that the certifier is not communicating his identity to the user. He sends the unblinded message to the user. This message is in fact a version of Mesg3 signed by the certifier.

Step 308: The user checks the signature and decrypts Mesg2 with his secret key to get a CRP.

In the above protocol, UserPubKey and CertChallenge are encrypted so that it is difficult to correlate the message that the user sends to the CPUF chip with the certifier's challenge or with the user's public key. Seed is encrypted to prevent the certifier or the user from knowing how to voluntarily get into the personality that the user is being shown. PreChallengeSeed is encrypted to prevent the certifier from finding out the newly created challenge when he inspects the program in step 304. The encryption between Mesg5 and Mesg6 prevents correlation of the message from the CPUF to the owner and the message from the owner to the certifier.

More than one layer of encapsulation may be used. An entity who has gained access to a personality of a CPUF through anonymous introduction can introduce other parties to this PUF. In particular, he can send the signed CRP that he received back to the certifier and get the certifier to act as a certifier for his personality when he anonymously introduces the CPUF to other parties.

CPUF chips and control algorithms can be used in, for example, smartcard applications and certified executions.

Smartcard Applications

Figure 32:
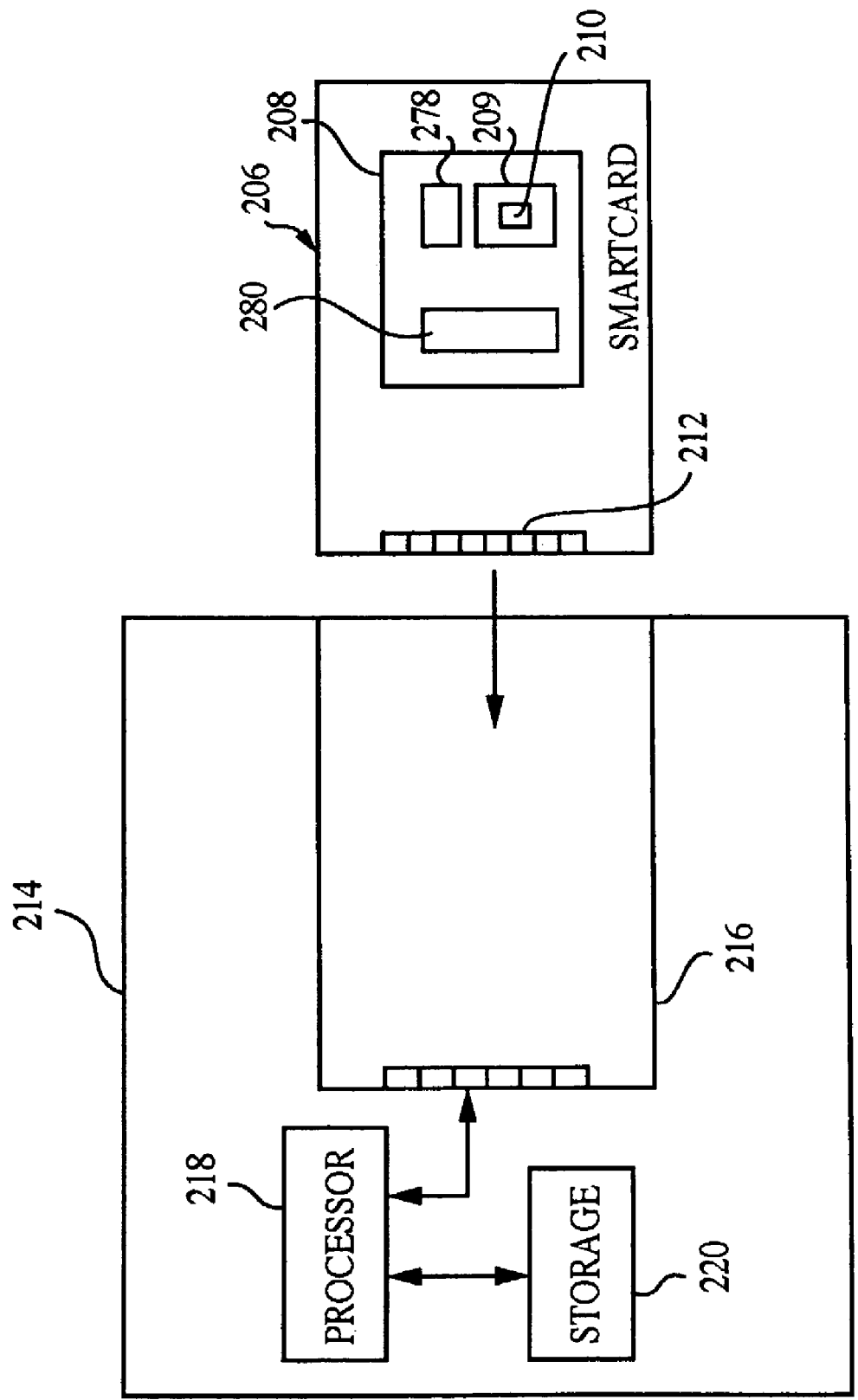
FIG. 32 shows a smartcard and a card reader.

Referring to FIG. 32, a smartcard 206 includes an integrated circuit chip 208 that has a PUF circuit 209, a functional circuit 278, and a control circuit 280. PUF circuit 209 has a delay circuit 210 having a large number of signal paths that are selectable by challenges. As an example, a challenge may be a 64-bit number. Smartcard 206 includes an input/output (I/O) port 212 used to receive programs. A card reader 214 is used to authenticate the smartcard. Card reader 214 includes a port 216 for receiving smartcard 206, a processor 218, and a storage 220 for storing challenge-response pairs. Processor 218 selects a challenge, sends a program that includes the challenge to smartcard 206, and receives a message from the smartcard. The message contains a computation result generated by functional circuit 278 and a response to the challenge. Processor 218 processes the message to generate the response, compares the response received from the smartcard with the response stored in storage 220 associated with the challenge. When the responses match, smartcard 206 is authenticated.

Figure 33:
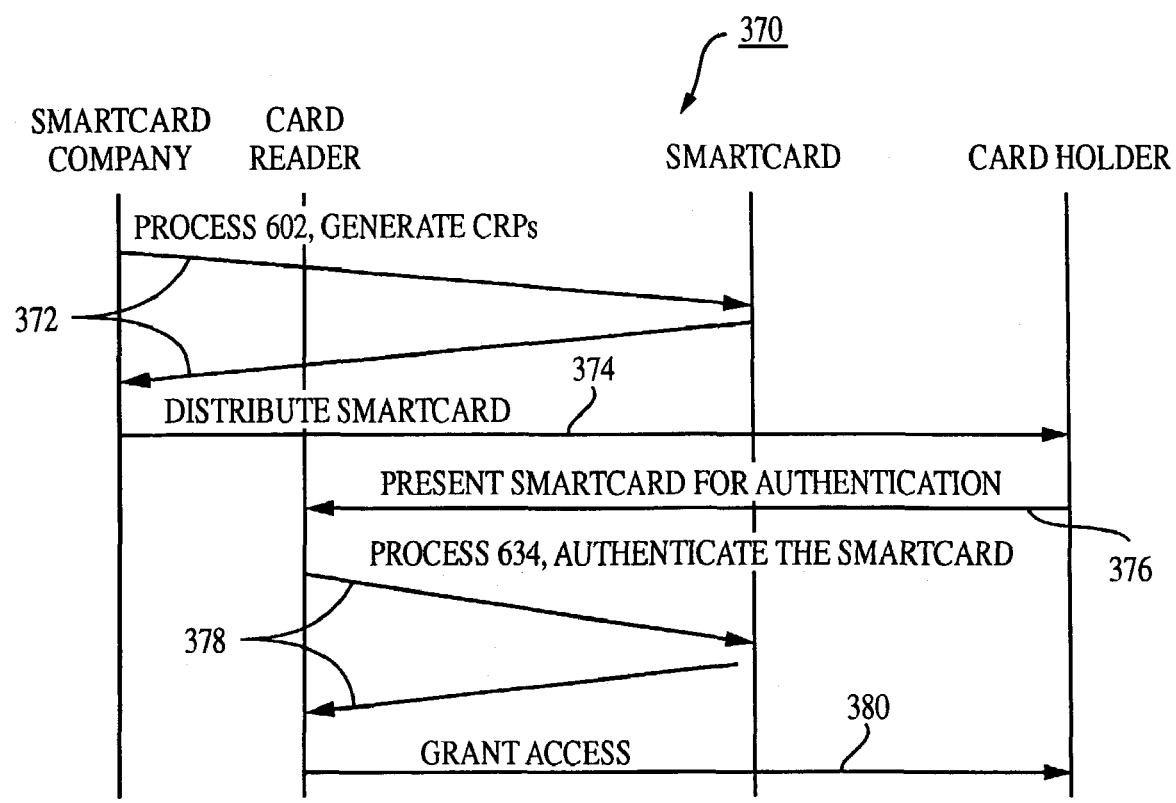
FIGS. 33-35 are diagrams.

FIG. 33 illustrates a process 370 for authenticating a smartcard that has a CPUF chip. A smartcard company makes a large number of smartcards having PUF chips that are fabricated using the same lithography masks. Each smartcard has a unique serial number. Process 370 includes the following steps:

Step 372: The smartcard company selects a smartcard and creates a set of CRPs for that smartcard using process 602 (FIG. 27). The CRPs is stored in a secured database.

Step 374: The smartcard company distributes the smartcard to a card holder and links the smartcard serial number with an account of the card holder.

Step 376: When the card holder wishes to access his account and use the services provided by the smartcard company, the card holder presents the smartcard to a card reader for authentication.

Step 378: The card reader retrieves a pre-stored CRP from the secured database, and authenticates the smartcard according to a process 634, described below.

Figure 34:
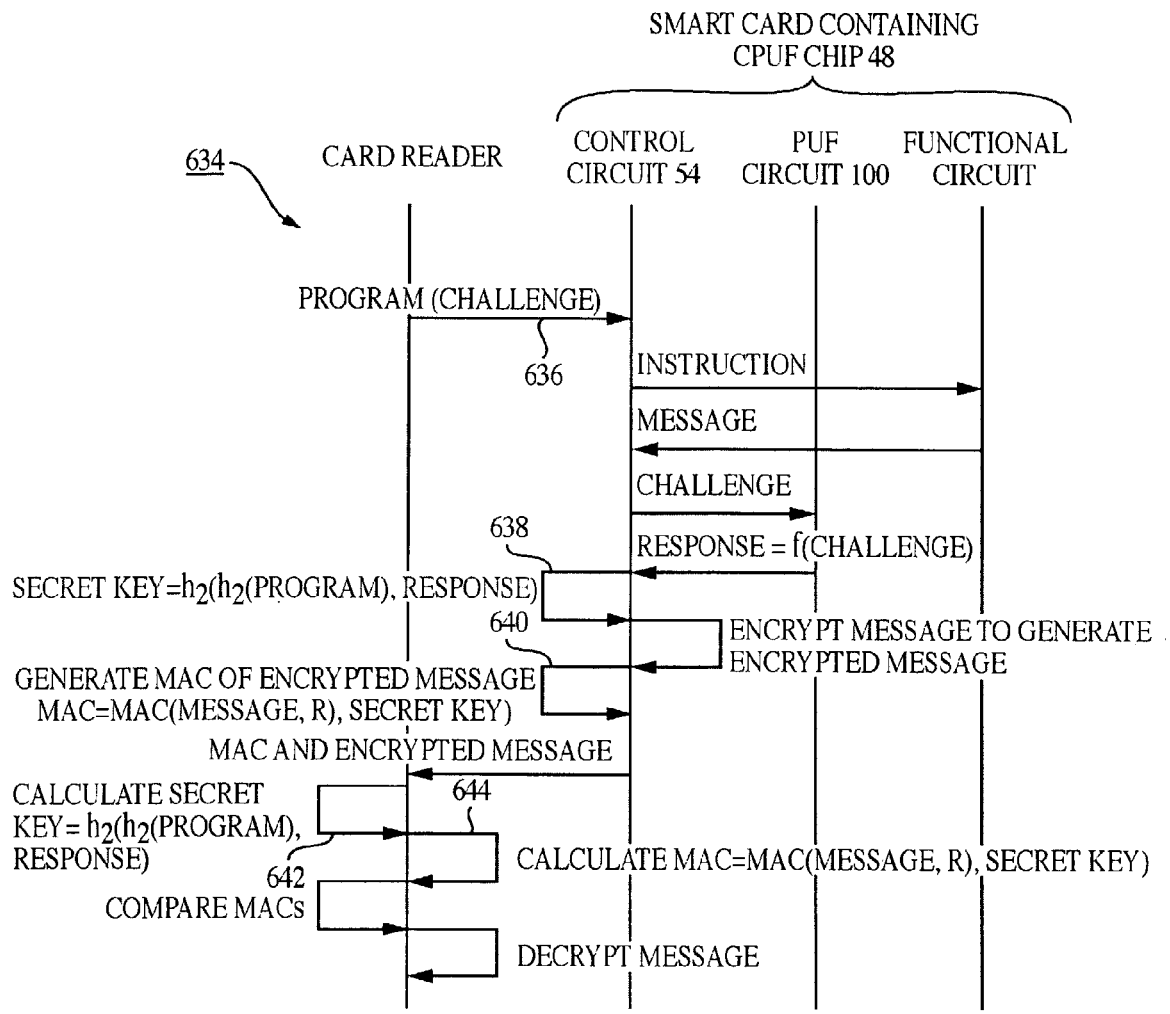

Referring to FIG. 34, process 634 allows a card reader to authenticate a smartcard containing CPUF chip 48. Process 634 is similar to process 518 (FIG. 20). The following description focuses on the steps in process 634 that are different from those in process 518.

In step 636, the card reader sends a program, Smartcard Program, shown below, to the smartcard.

```
/* Smartcard Program */
begin program
    Secret = GetSecret (Challenge);
    /* The program contains an instruction to cause
       the smartcard to generate Message to send to
       the bank */
    Output (Message, MAC((Message, R), Secret));
end program
```

In Smartcard Program, R is a single use number and Challenge is the card reader's challenge. In steps 638 and 642, the secret key is calculated using the formula "secret key=$h_2(h_2$ (program), response)." In steps 640 and 644, a MAC is calculated using the formula "MAC((message, R), secret key)." The single use number R is useful in the case where the smartcard has state that is preserved between executions. In that case, it is important to ensure the freshness of the message. If the privacy of the smartcard's message is a requirement, a different program can be used in which the message is encrypted with the same key that is used to generate the MAC.

Before the smartcard company gives the smartcard to the card holder, the smartcard company creates a set of new CRPs. Each time that smartcard 206 is authenticated, a subset of the new CRPs is used. When the set of CRPs are used up, the smartcard company creates a new set of CRPs using the programs Renewal Program and Private Renewal Program.

When a smartcard without a PUF is used, it is possible for an adversary who is in possession of a smartcard to produce a clone by extracting key information (a digital key hidden somewhere in the smartcard) through various kinds of attacks. If someone loses track of his/her card for a period of time, his/her card can potentially be cloned. Being in physical possession of the smartcard is therefore not synonymous to being safe. With a PUF on the smartcard that can be authenticated and identified, there is no longer any need for a digital key that can be extracted by an adversary. The smartcard hardware itself is the secret key. This key cannot be duplicated. Thus, a person can lose control of the PUF-smartcard, retrieve it, and continue using it. In this way, it is possible to lend the PUF-smartcard to someone else without causing a permanent breach of security.

PUFs are suitable for use in credit cards for checking that the person is in possession of the original card (i.e., the person cannot borrow a credit card from a friend, extract key information, return the credit card, then fake a counterfeit).

To prevent the adversary from carrying out a "denial of service" attack, the smartcard may be required to identify itself using a digital challenge-response protocol before the card reader challenges the smartcard with one of the limited number of CRPs that it has.

Certified Executions

In certified executions, CPUF chips are used in applications that require proof of execution on a specific processor.

For example, most computer users only use a fraction of their computer's processing power. It is possible to tap that unused computing power to carry out large computations in a distributed manner. This style of computation is unreliable, however, as the person requesting the computation has no way of knowing that it was executed without any tampering. If CPUF chips are used, it would be possible for a certificate to be produced that proves that a specific computation was carried out on a specific chip. The person requesting the computation can then rely on the trustworthiness of the chip manufacturer who can vouch that it produced the chip, instead of relying on the owner of the chip.

Certified execution can be performed in two ways. The computation can be performed directly on the secure chip or performed on a faster insecure chip that is being monitored in a highly interactive way by supervisory code on the secure chip.

CPUF chips can be used to facilitate software licensing and enhance intellectual property protection. For example, software code can be designed to run on certain processors that can be authenticated. Pirated code will fail to run. One method is to encrypt the software code using the CPUF's challenge-response pairs on an instruction per instruction basis. The instructions would be decrypted inside of the CPUF chip, and could only be decrypted by the intended chip.

Figure 35:
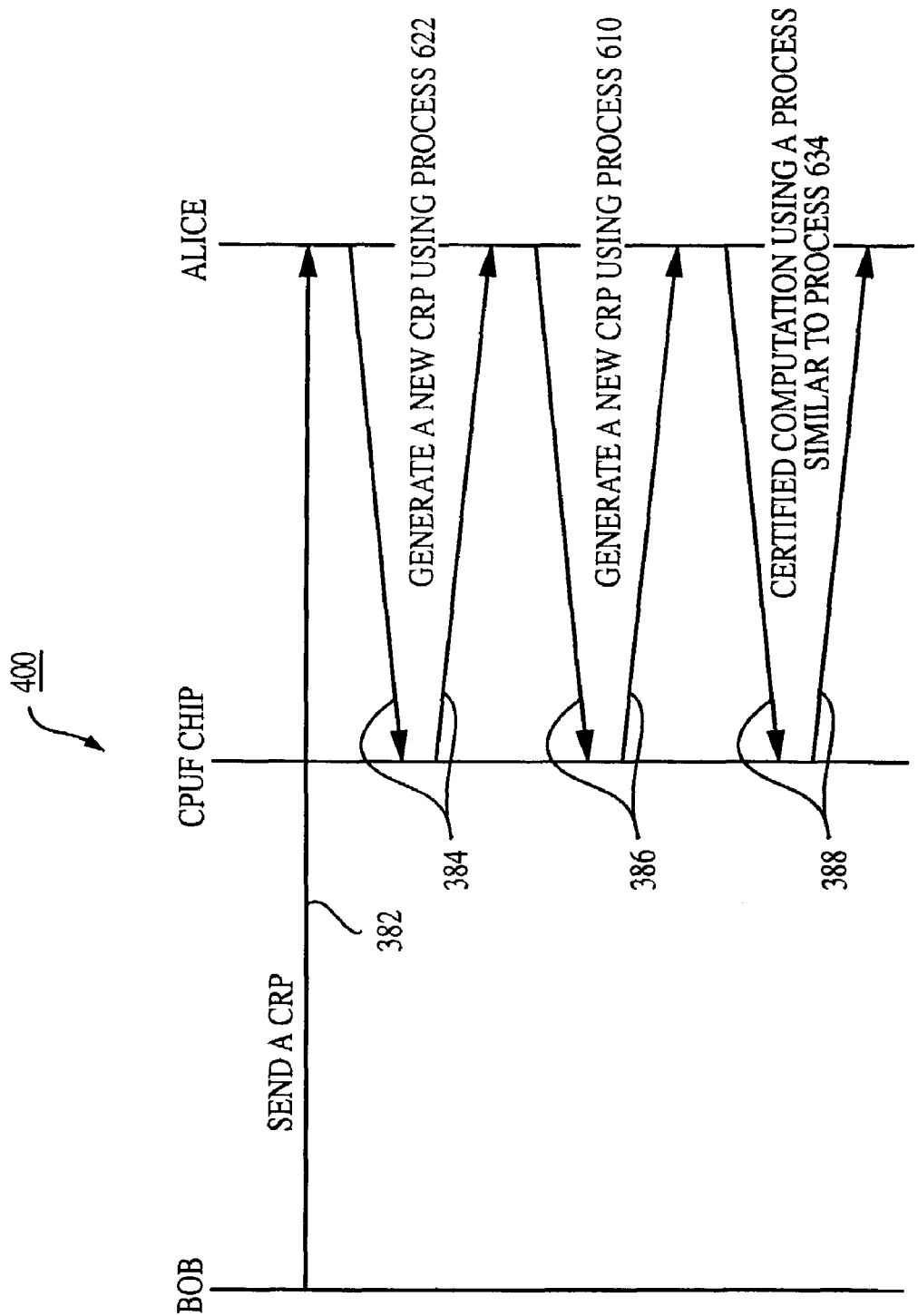

As an illustration, Alice wants to run a computationally expensive program over the weekend on Bob's computer, which has a CPUF chip. Bob has a CRP that has never been used before. Alice wants to be sure that the result has not been tampered with by Bob or anyone else. Alice does not have any CRP. The following describes a process 400 that allows Alice to obtain a private CRP and use the private CRP to perform certified executions on the CPUF chip. Referring to FIG. 35, process 400 includes the following steps.

Step 382: Bob sends a CRP to Alice.
Step 384: Alice generates a new CRP that is private to her using process 622 (FIG. 29) based on the CRP she obtained from Bob.
Step 386: If Alice wishes to generate more CRPs, she can do so using process 610 (FIG. 28) based on the CRPs she established in step 384.
Step 388: Alice sends a program, Certified Execution Program, shown below, to the CPUF chip to performs certified executions using a process similar to process 634.

```
/* Certified Execution Program */
begin program
    Secret = GetSecret (Challenge);
    Subroutine for instructing the functional
        circuit in the CPUF chip to perform
        certified executions to generate a
        result, which is put into Result.
    Output(Result, MAC(Result, Secret));
end program
```

In Certified Execution Program, Challenge is a challenge that Alice has generated in step 386 or 388.

Process 400 does not use a single use random number. It is assumed that in certified execution, pure computation which cannot become stale is involved; i.e., the computation will produce the same result regardless of when the same computation is performed.

When performing the certified execution, Alice entrusts Bob's CPUF chip to perform the computations correctly. This is easier to ensure if all the resources used to perform the computation (memory, CPU, etc.) are on the CPUF chip and are included in the CPUF characterization. It is possible to design the CPUF chip so that it can securely utilize off-chip resources. It is also possible to design a CPUF chip to use the capabilities of other networked CPUF chips and devices using certified executions. The CPUF can have CRPs for each of the computers it is using, and perform computations using protocols described above.

Experiment Data

Experiments have been conducted using Xilinx XC2S200 field programmable gate arrays (FPGAs) to determine the feasibility of building PUFs that can be uniquely identified. FPGAs are fabricated in large volume, and the fabrication process is tuned to produce ICs that are as identical as possible in order to maximize yield and performance. The experiments indicate that even a highly-optimized fabrication process designed for predictability has enough variability to enable reliable identification.

Figure 36:
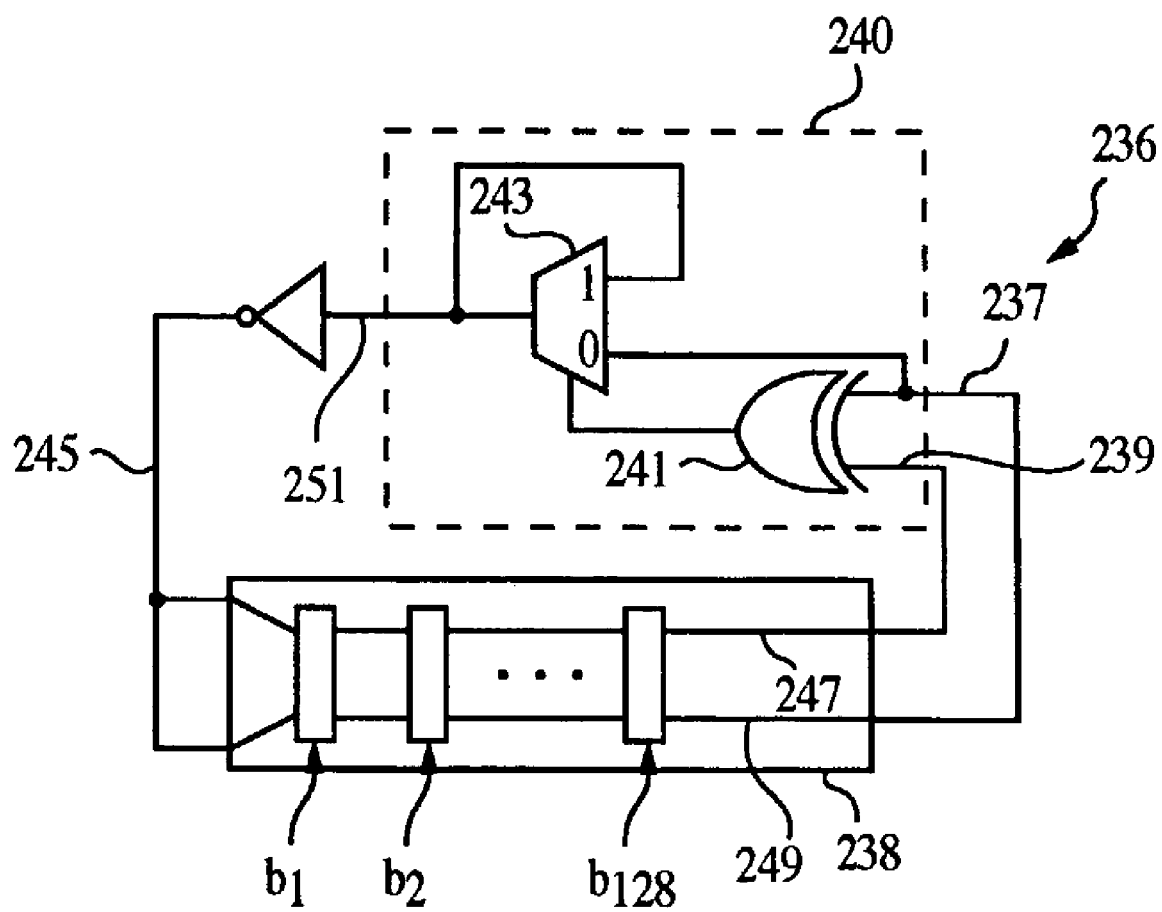
FIG. 36 shows a self-oscillating loop.

Referring to FIG. 36, a self oscillating loop 236 includes a delay circuit 238 and a switching circuit 240 (enclosed in dashed lines) that is implemented by a lookup table in the FPGA. The behavior of the lookup table can be modeled by an XOR gate 241 and a multiplexer 242. A signal on line 245 is duplicated into two signals that enter delay circuit 238 and switch between an upper path 247 and a lower path 249. The signals on path 247 and 249 enter switching circuit 240 through signal lines 239 and 237, respectively. An output 251 of switching circuit 240 switches when the slower transition, either a rising edge or a falling edge, reaches its inputs through lines 237 and 239. Circuit 240 is similar to a flip-flop that changes state when both outputs from the delay circuit are at the same level.

A number of profiles were generated for different FPGAs in different conditions. A profile represents measurements of 128 challenge response pairs. All profiles were established using the same challenges. By comparing the differences in the responses in two profiles, a distribution of differences was obtained. If most of the differences are near zero, then the profiles are close. If the differences are far from zero, then the profiles are distant. The experiment results show that the distribution of differences was typically Gaussian. Therefore, the difference between two profiles can be characterized by a standard deviation.

Referring to FIG. 37, each line represents the differences between a first profile and a second profile. The horizontal axis represents tolerance, and the vertical axis indicates the probability that for a given challenge, the difference in response will be lower than the difference in response that is indicated on the horizontal axis. The first profile remained the same for different lines, and was obtained by measuring the responses generated by an FPGA chip called "Abe" that ran on a first test board at room temperature. For line 242, the second profile was obtained by measuring the responses generated by Abe on the first test board at room temperature for a second time. The standard deviation $\sigma$ of the differences between the two profiles is about $1\times10^{-5}$. Since the measurements were made on the same chip on the same board under the same temperature, the results represent power supply variations of the test board over time.

For line 244, the second profile was obtained by measuring the responses generated by the Abe chip on a second test board at room temperature. In this case, $\sigma \approx 2.5\times10^{-5}$. Because the measurements were performed in different test boards, the result reflects power supply variations across different test boards. For lines 246, 248, and 250, the second profile was obtained by measuring the responses from the Abe chip on the first test board at 10, 20, and 30 degrees Celsius above room temperature, respectively. In this case, $\sigma \approx 5 \times 10^{-5}$ to $1.5 \times 10^{-4}$). For lines 252 and 254, the second profiles were obtained by measuring the responses from FPGA chips called "Hal" and "Walt", respectively, on the first test board. In these cases, $\sigma \approx 4 \times 10^{-4}$. These experiments show that the difference between the profiles of two different chips on the same test board is larger than the difference between the profiles of the same chip on the same test board measured at different times, or the same chip on different test boards, or the same chip on the same test board measured at different temperatures (varying as much as 30 degrees Celsius). This demonstrates that it is possible to distinguish between different FPGAs based on measuring the delay characteristics of the chips. The data shows that each challenge is capable of providing 0.7 bits of information about the identity of the FPGA when 30-degree Celsius variations are allowed, and 1.5 bits if 10-degree Celsius variations are allowed.

To distinguish between 1 billion different components, a sufficient number of bits are required to identify $10^{18} = 2^{60}$ components. A total of 40 to 90 challenges are required to obtain those 60 bits of information, depending on the temperature variations that are allowed. The numbers that are given here are dependent on the PUF circuit that is considered. By properly designing the layout of the circuit, it may be possible to build PUFs for which more bits can be extracted from each challenge.

Other experiments were conducted using FPGAs to implement PUF circuits 101 of FIG. 3. In the experiments, the delays across two or more FPGAs are compared. Each FPGA has exactly the same logic circuit, and the PUF circuit was implemented in the FPGAs in the exact same locations. The FPGAs can be viewed as integrated circuit chips made from the same lithography masks.

In one experiment, each FPGA was equipped with 8 self-oscillating loops, such as the circuit 101 in FIG. 3. Each loop includes 32 buffers (a logic gate that copies its input to its output with a short delay) and an inverter. The frequencies of the loops were determined by measuring the number of oscillations that occurred during a certain period of time (typically $2^{20}$ cycles of an external 50 MHz oscillator). The period of the loops was on the order of 60 ns.

In the following description of the experiment results, the standard deviations are given in parts per million (ppm). A deviation of n ppm around a frequency $f_0$ corresponds to a deviation of $$\frac{n \cdot f_0}{10^6}.$$

Figure 38:
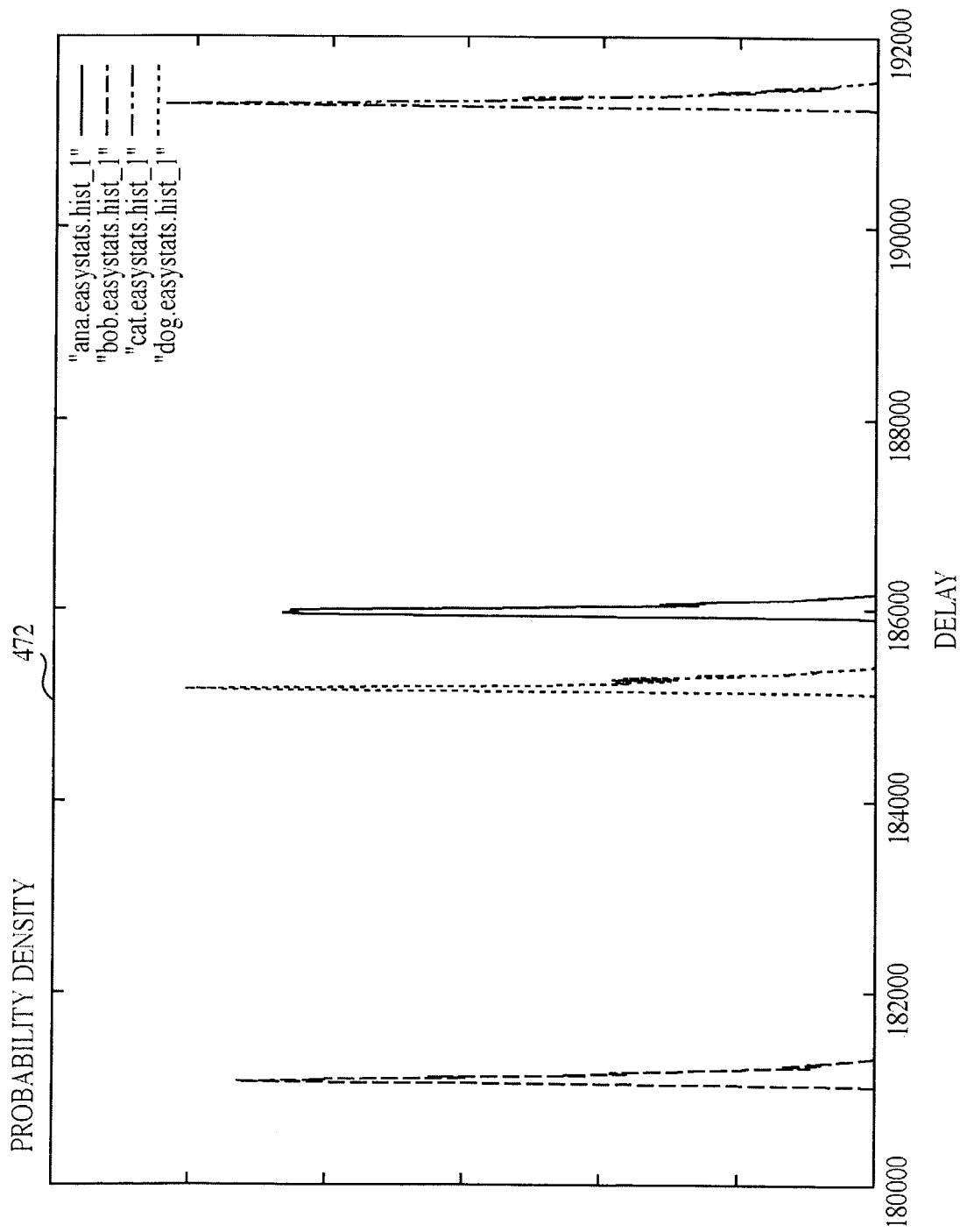

Referring to FIG. 38, a graph 472 shows histograms of measurements of four PUF circuits on different FPGAs. The horizontal axis represents delay, using an arbitrary unit. The vertical axis represents probability density. The histograms show the relationship between measurement error and inter-FPGA variation for the four different FPGAs. Each peak represents a different FPGA. The width of a peak represents measurement error. The measurements were made without compensation.

Figure 39:
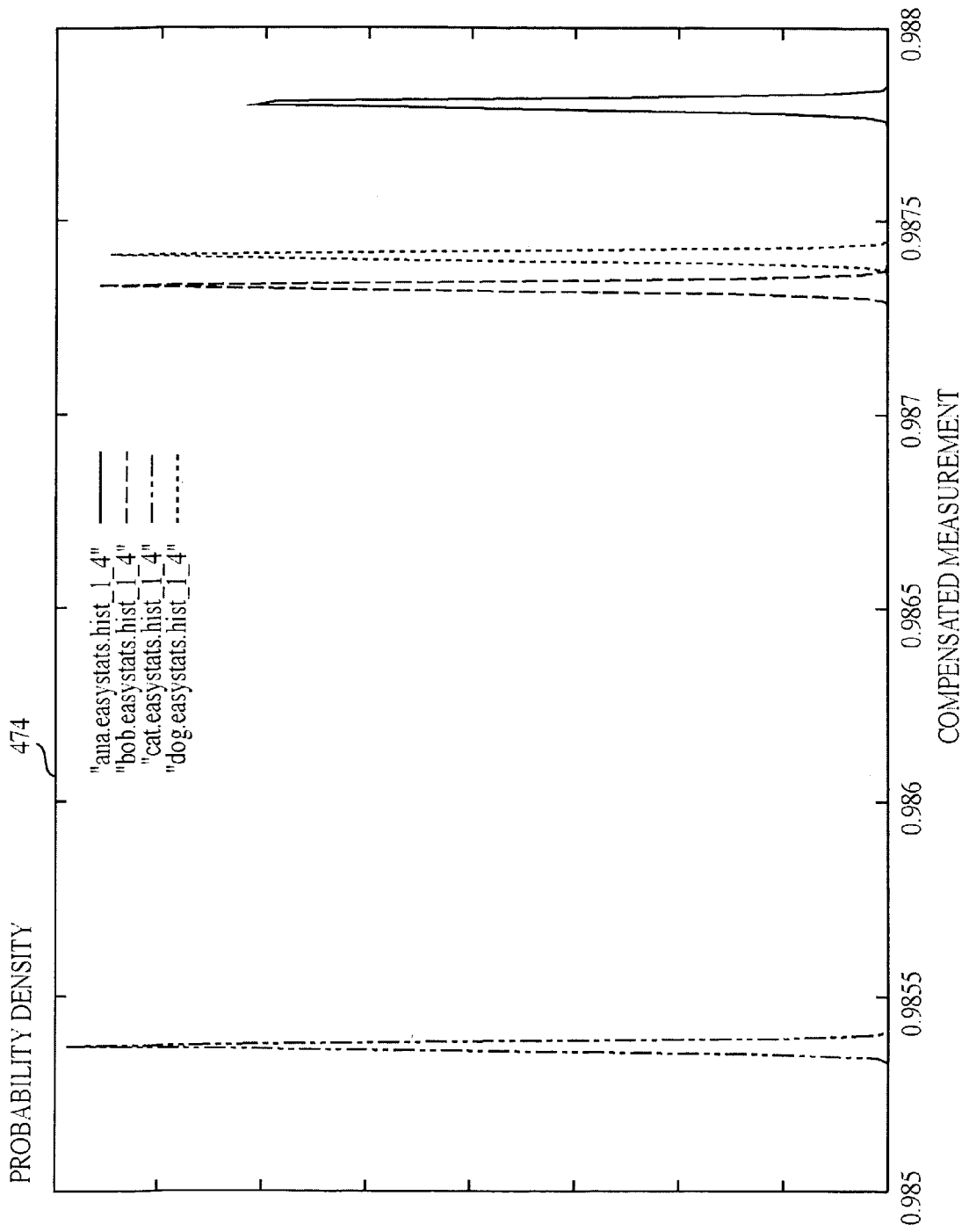

Referring to FIG. 39, a graph 474 shows histograms of measurements of four compensated PUFs on different FPGAs. The horizontal axis represents compensated measurement, each data point representing a ratio of two measurements. The vertical axis represents probability density. The histograms show the relationship between measurement error and inter-FPGA variation for the four different FPGAs.

The standard deviation in inter-FPGA delays with compensated measurements ranges from 5000 ppm to 30000 ppm, depending on the pair of loops that was used for the measurement. The four peaks in histograms 472 and 474 shows that the inter-FPGA variation is larger than the measurement errors. This shows that is it possible to differentiate between different FPGAs despite some measurement errors.

Figure 40:
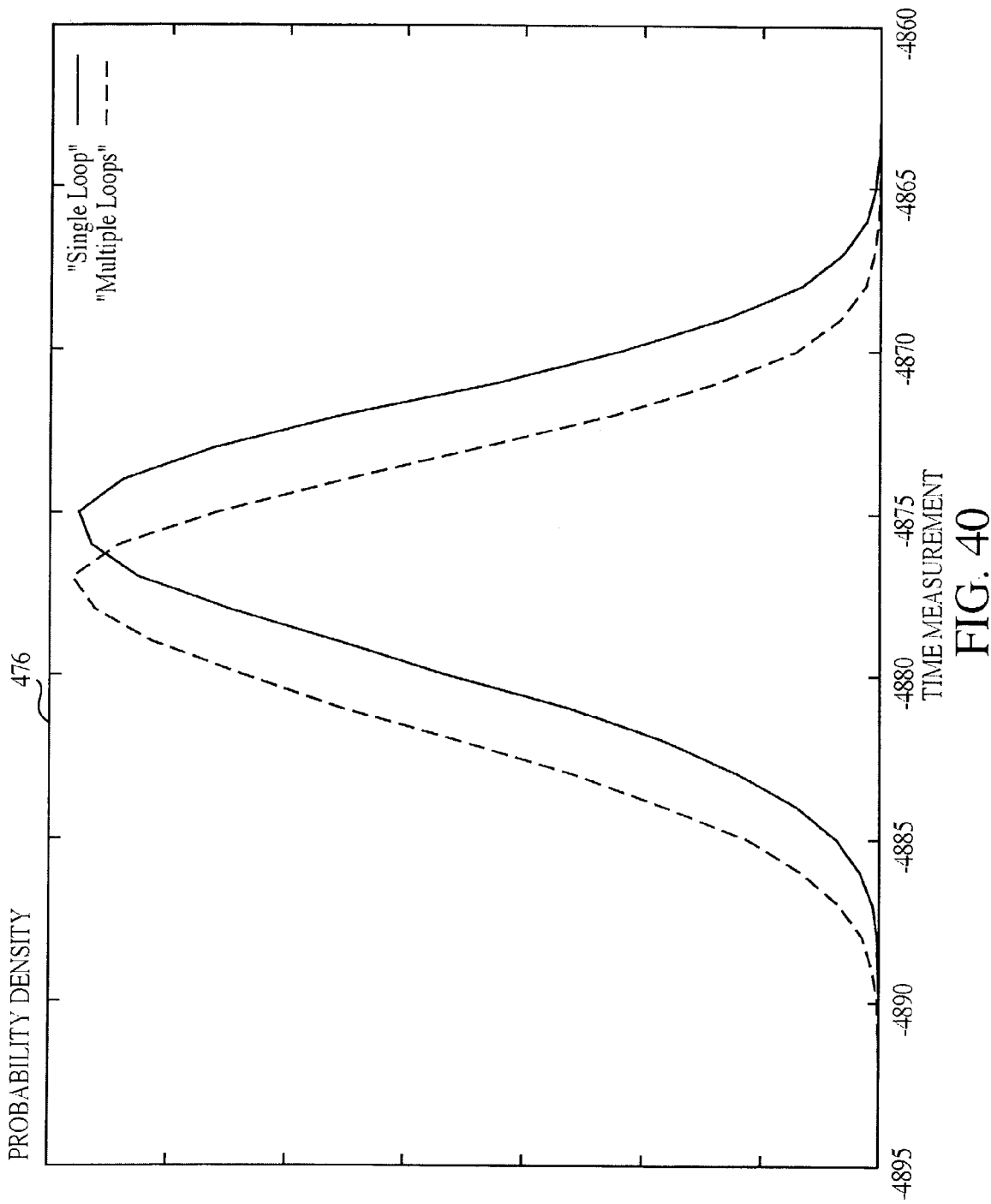

Referring to FIG. 40, a graph 476 shows two histograms representing measurements of an oscillating loop with the other loops on the FPGA turned on or off. The horizontal axis represents time measurement, using an arbitrary unit. The vertical axis represents probability density. The influence of the other loops (as indicated by the distance between the two peaks, which is about 10 ppm) is smaller than the measurement error (as indicated by the width of the peak). Thus, interference from one loop to another should not hinder identification of a chip, as long as the two loops are not oscillating at nearby frequencies.

Figure 41:
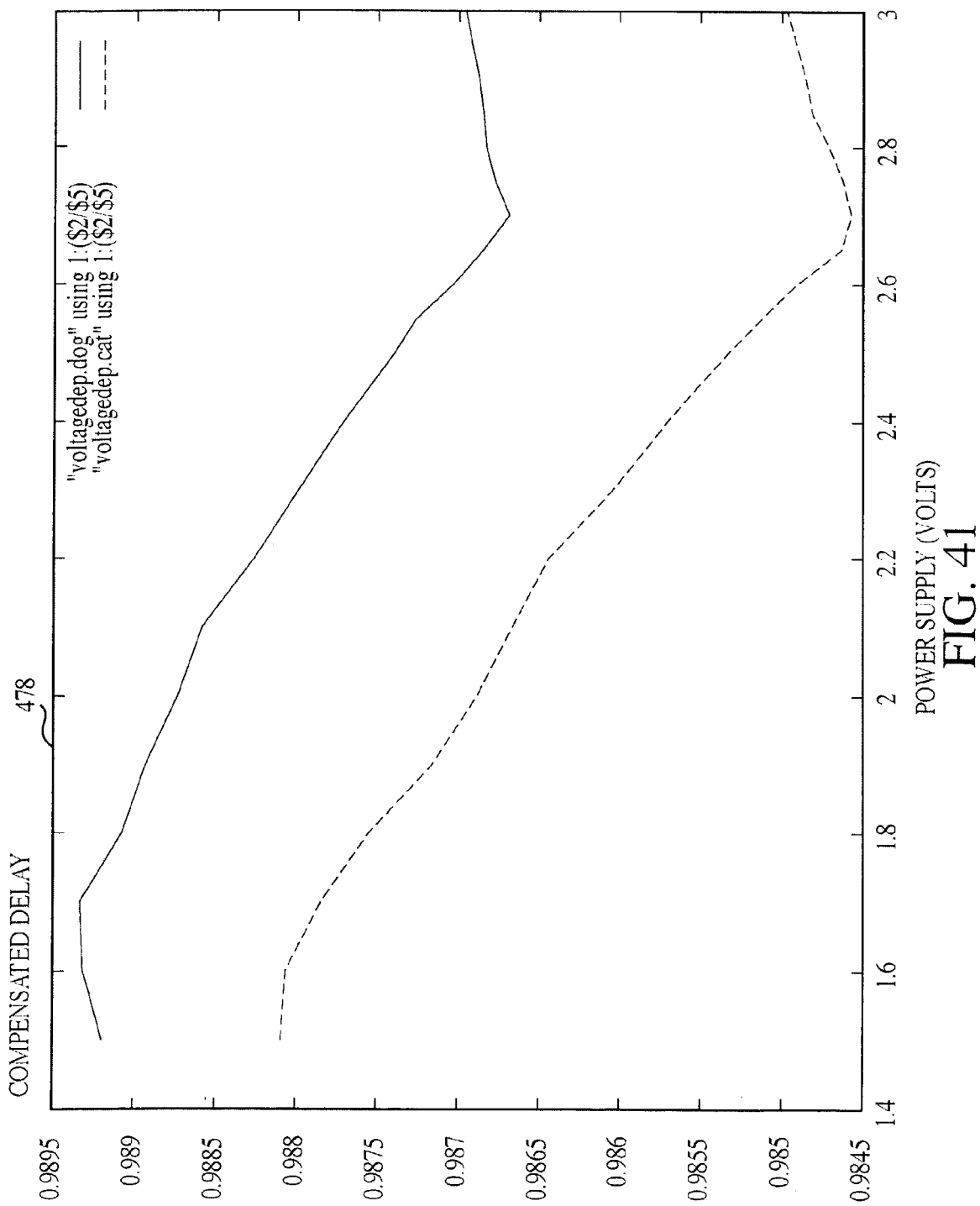

Referring to FIG. 41, a graph 478 shows two histograms, each representing measurements of the oscillating frequency for different power supply voltages. The horizontal axis represents power supply in volts. The vertical axis represents compensated delay. Around the FPGA's 2.5V operating point, the variation of the compensated measurement with voltage is about 3000 ppm/V. In practice, external power supply variations can be kept to within 1%, which corresponds to $1\% \times 2.5V \times 3000$ ppm/V=75 ppm. Therefore, commonly available voltage regulators will suffice to keep the supply voltage within tolerable bounds. In this experiment, the compensated measurement has an extremum around 2.7V. By running the FPGAs at 2.7V instead of the rated 2.5V, the robustness of the measurements can be further improved.

Figure 42:
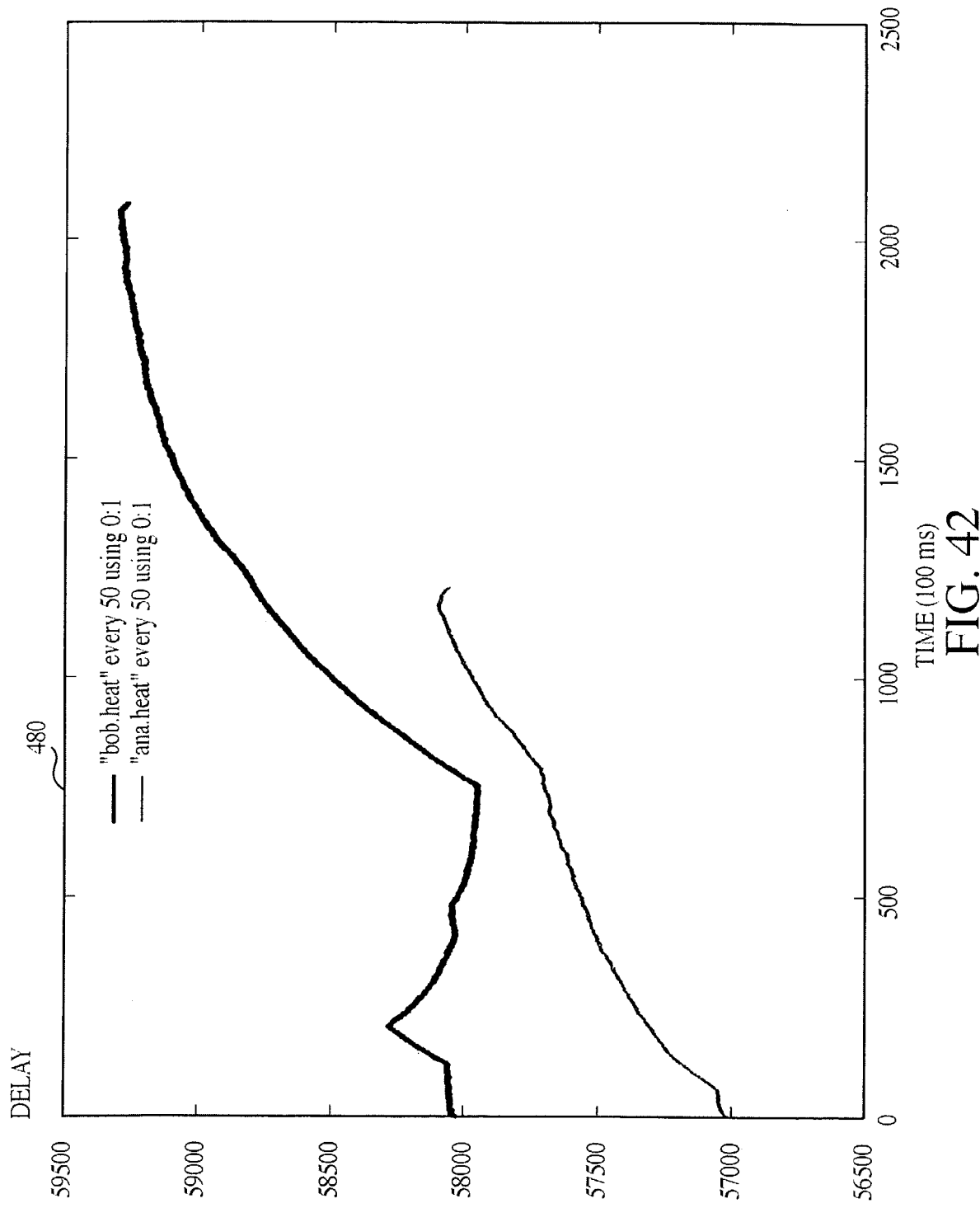

Referring to FIG. 42, a graph 480 shows frequency measurement values versus time (in half-second sampling intervals) as the ambient temperature varied from 25° C. to 50° C. The two FPGAs did not undergo the same temperature changes at the same time. The horizontal axis represents time (with 100 ms as unit). The vertical axis represents delay. The variation in frequency is about 50000 ppm for uncompensated measurements.

Figure 43:
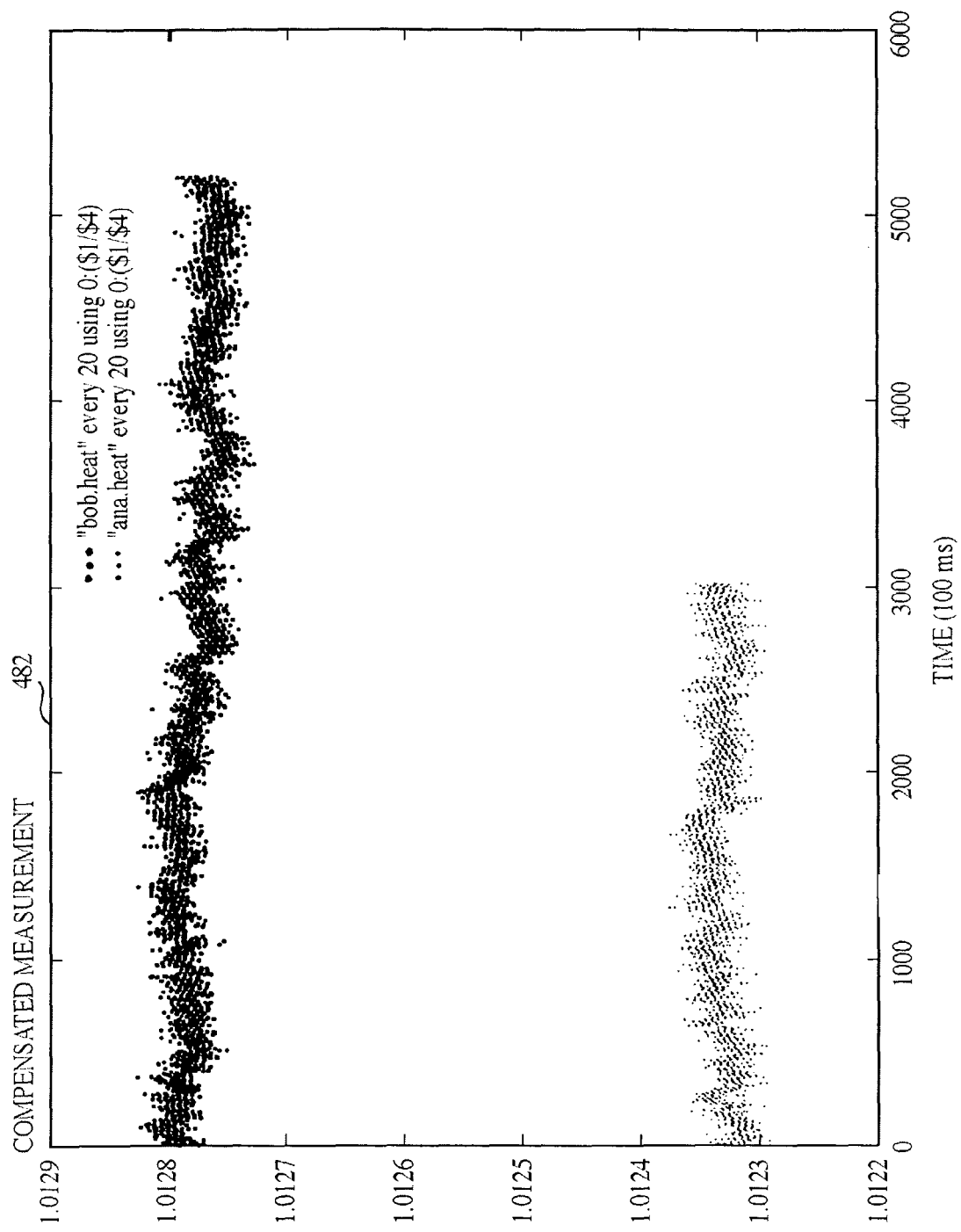

Referring to FIG. 43, a graph 482 shows that with compensated measurement, the variation in frequency is reduced to 100 ppm. The horizontal axis represents time (with 100 ms as unit). The vertical axis represents compensated measurement.

Figure 44:
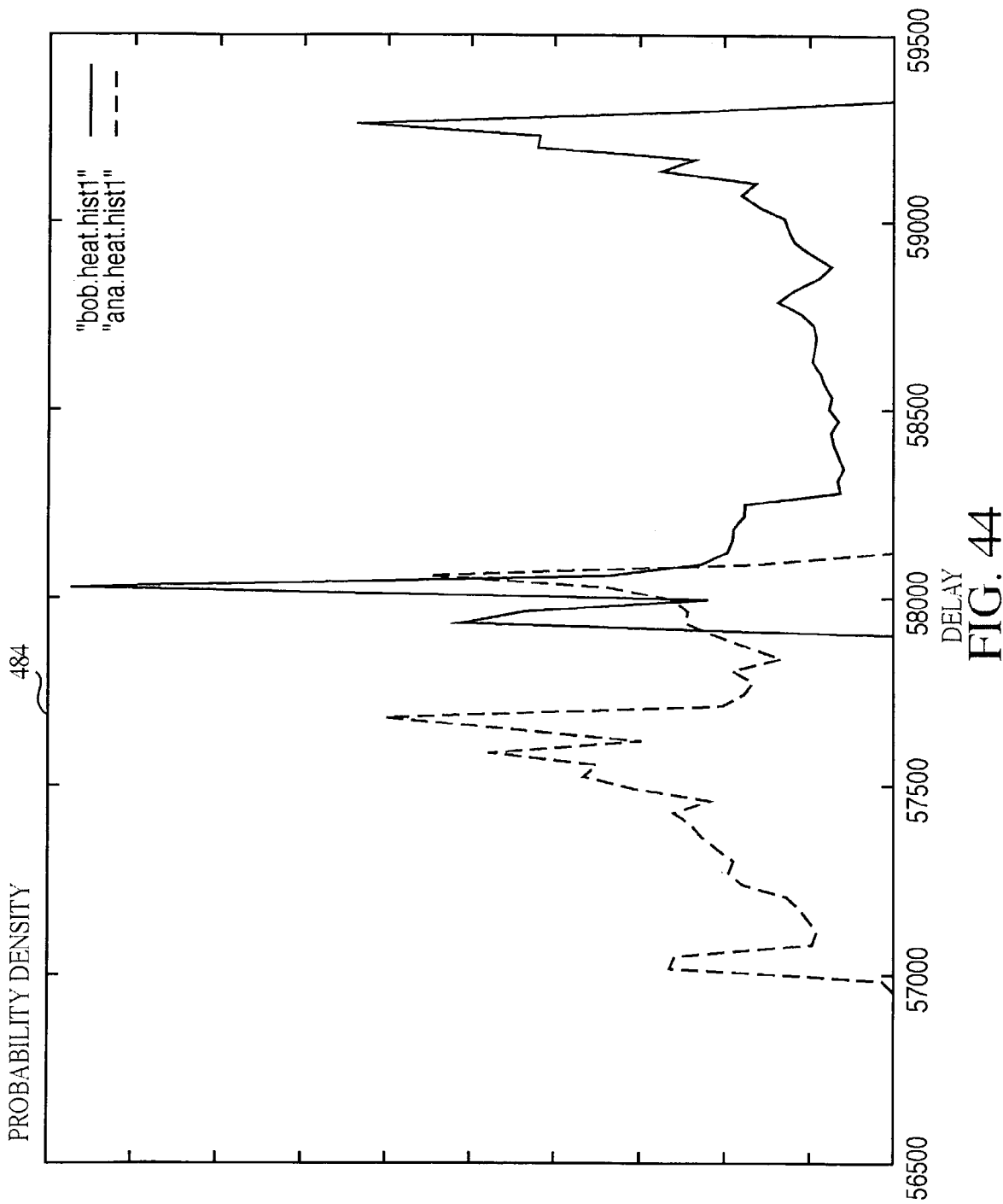

Referring to FIG. 44, a graph 484 shows histograms of the measurements in FIG. 42. The horizontal axis represents delay. The vertical axis represents probability density.

Figure 45:
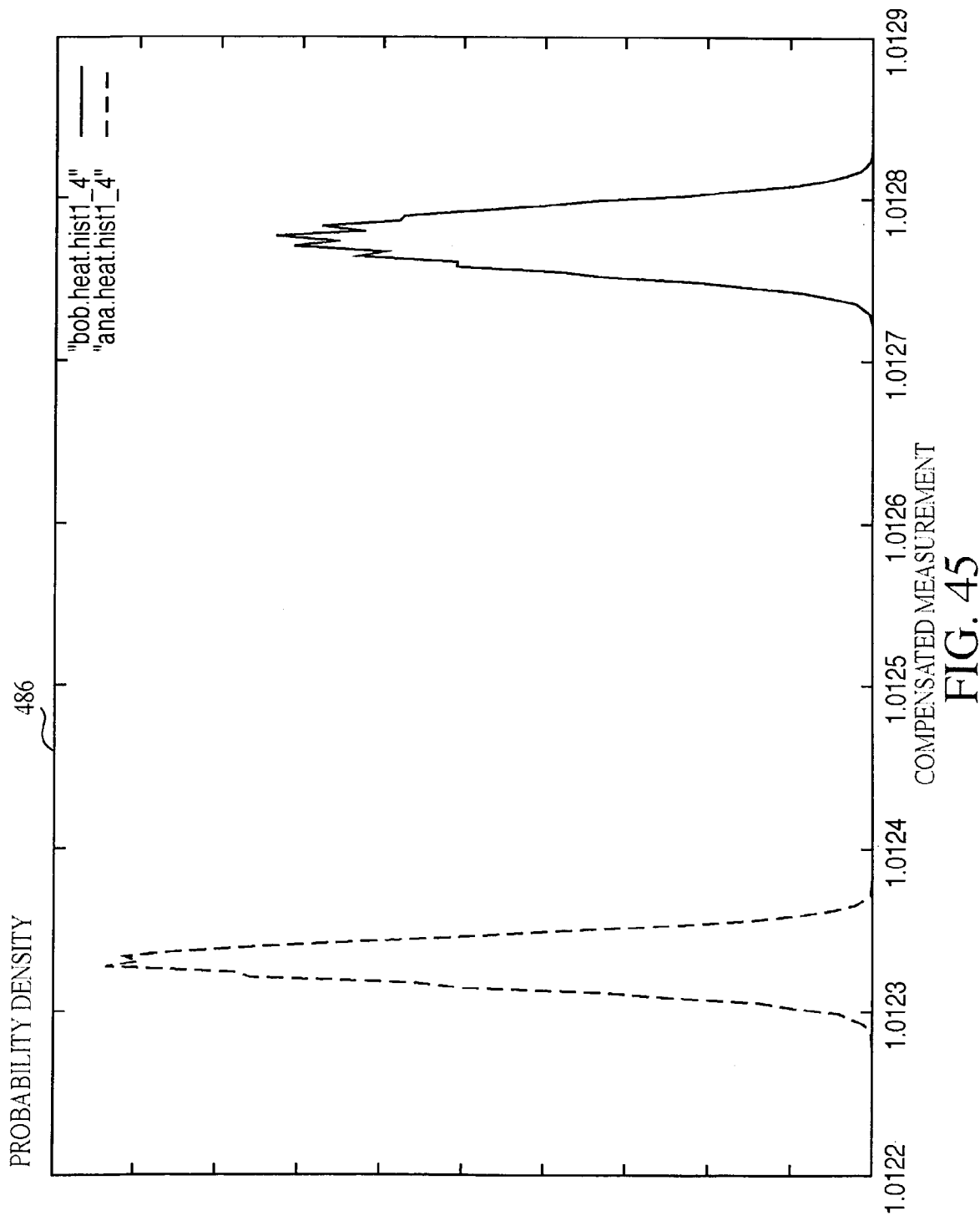

Referring to FIG. 45, a graph 486 shows histograms of the measurements in FIG. 43. The horizontal axis represents compensated measurement. The vertical axis represents probability density. Graphs 482 and 486 show that two FPGAs can be differentiated with compensated measurement despite a 25° C. temperature variation.

Figure 46:
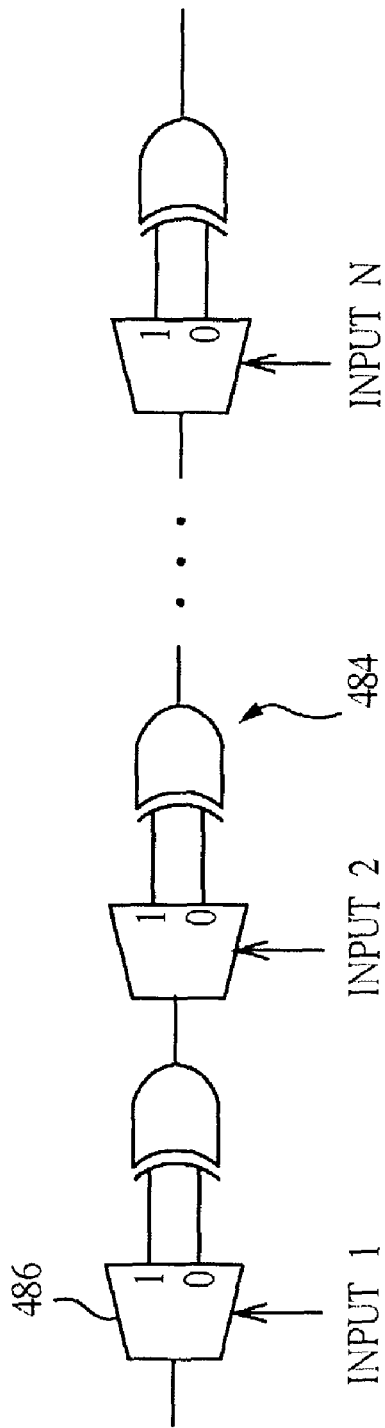
FIGS. 46 and 47 show delay circuits used in the experiment.
Figure 47:
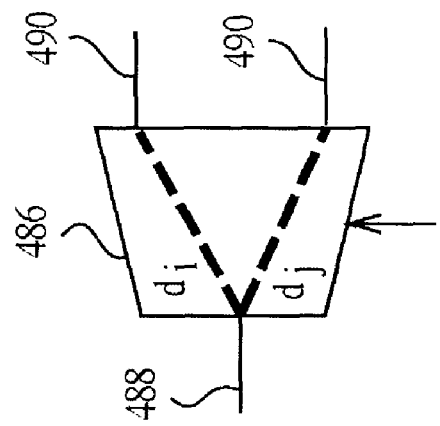

Referring to FIGS. 46 and 47, an experiment was made on two PUF circuits that included a demultiplexer circuit 484 with 12 stages of demultiplexer 486. Each demultiplexer 486 switches a signal on an input 488 to one of the two outputs 490.

Figure 48:
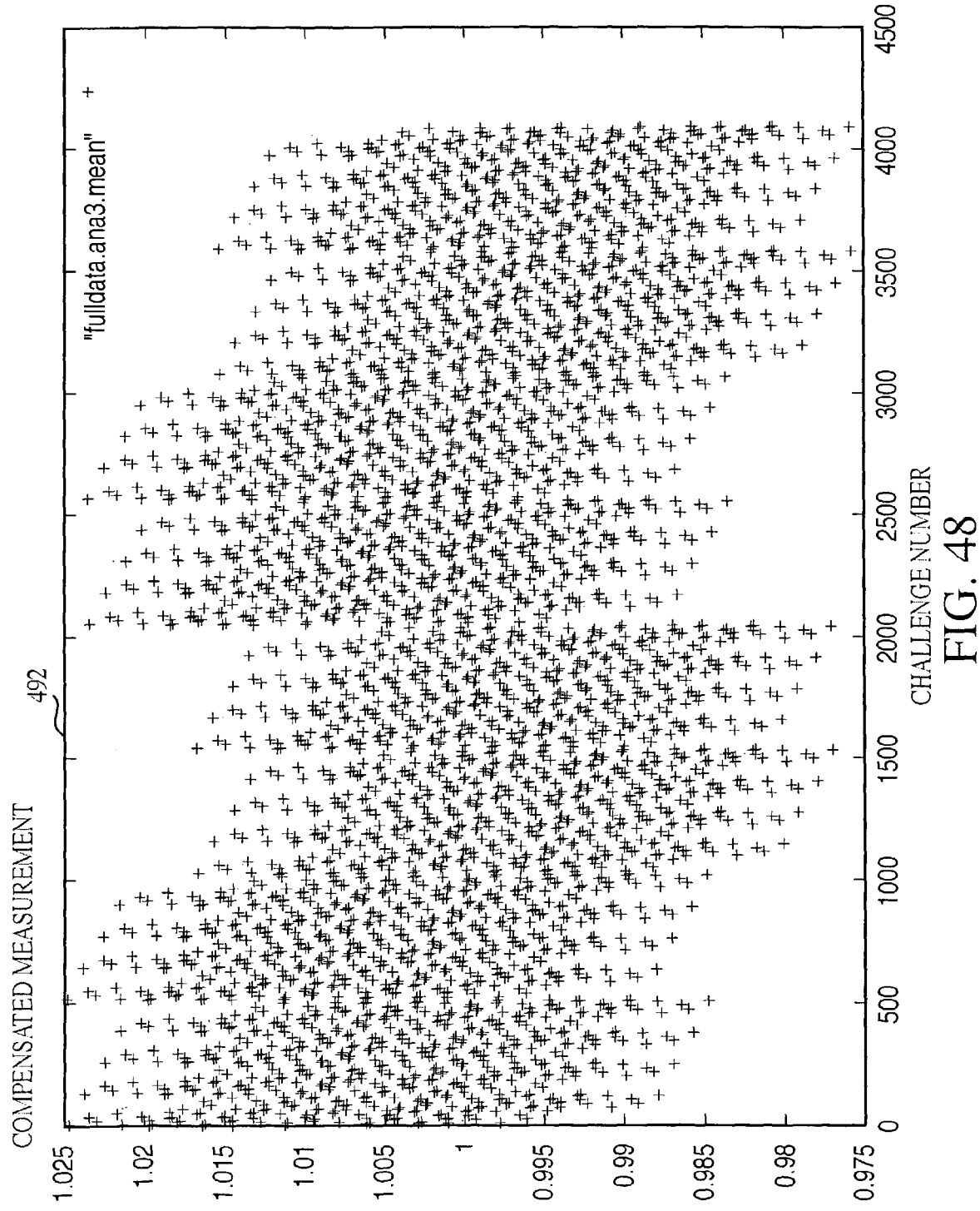
FIGS. 48 and 49 are graphs showing experimental data.
Figure 49:
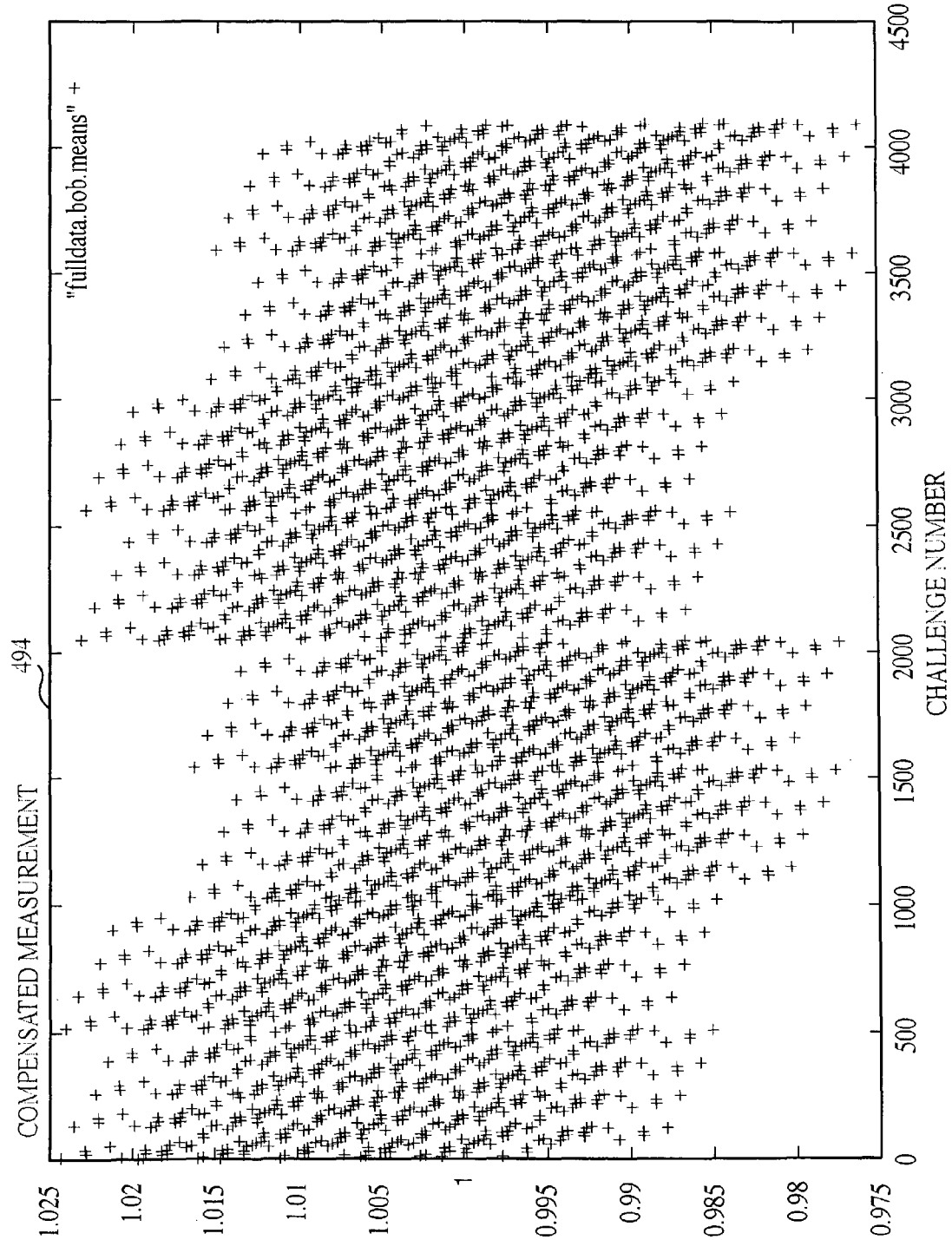

Referring to FIGS. 48 and 49, graphs 492 and 494 show compensated path delays measurements versus challenges for the demultiplexer circuit 484 on two different FPGAs. In each graph, the horizontal axis represents the challenge number, and the vertical axis represents compensated measurement. The graphs show that there is a dependency of the response on the challenge. The graphs show certain patterns in the relationship between challenges and responses. This pattern is common to the two FPGAs and is due to large differences between paths in given stages of the delay circuit. To see a difference between the two FPGAs, one has to look at the small scale differences between the two plots (i.e., looking for 1% variations on a plot that covers 50% variations). These differences appear in the difference in texture between the plots for the two chips.

Physically Obfuscated Keys

Figure 50A:
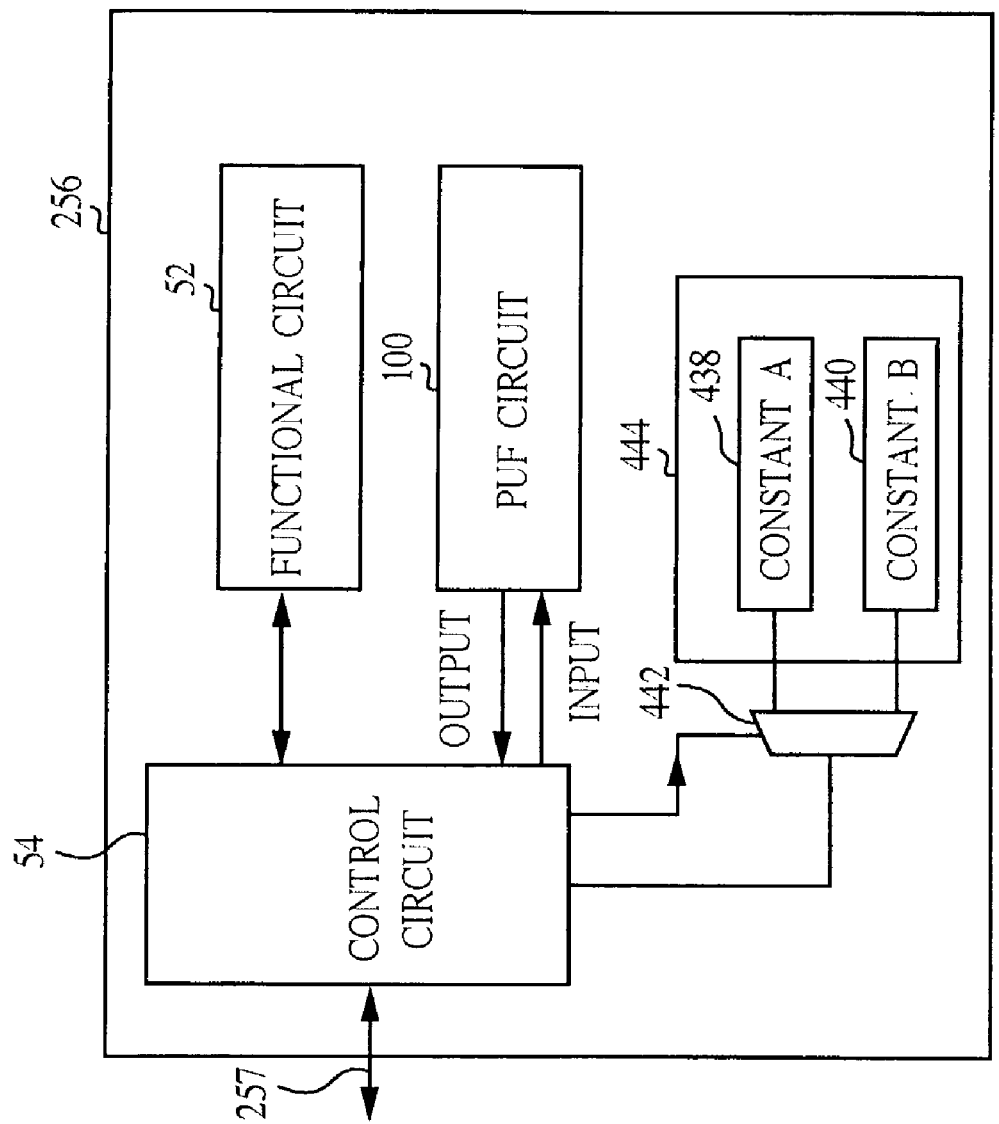
FIGS. 50A and 50B show obfuscated PUF chips.

Referring to FIG. 50A, an example of a CPUF chip 256 uses constant values stored on the chip to generate secrets (or keys) that allows authentication of the chip or computation results of the chip. Chip 256 includes a functional module 52, a PUF circuit 100, and a control module 54. Chip 256 receives a program sent by a user through I/O port 257 that instructs functional circuit to compute a result. Chip 256 additionally includes an EEPROM 444 that stores two constant numbers, constant A and constant B, that are written into the memory after chip 256 is fabricated. Control module 54 controls a multiplexer 442 to select one of the two numbers, and uses the selected number as a prechallenge to generate a challenge that is sent to PUF circuit 100 to generate a first secret. Control module 54 uses the first secret to encrypt and sign the computation result from functional module 52 to generate a "semi-encrypted and signed" message. Signing a message means generating a MAC for the message. Control module 54 then controls multiplexer 442 to select the other of the two numbers, uses the selected number to cause PUF circuit 100 to generate a second secret. Control module 54 uses the second secret to encrypt and sign the semi-encrypted and signed message to generate a fully-encrypted and signed message, which is then output to a user of chip 256.

Chip 256 is designed so that the wiring of delay lines in PUF circuit 100 covers control module 54 and the output of PUF circuit 100 An adversary cannot measure the output of PUF circuit 100 unless he goes through the overlaid wiring, which will cause the physical characteristics of PUF circuit 100 to change. Even if an adversary can measure the first secret, he will not be able to obtain the second secret since the PUF circuit has been modified when he measures the first secret. The adversary will not be able to obtain both secrets to decrypt or compromise the final message.

Figure 50B:
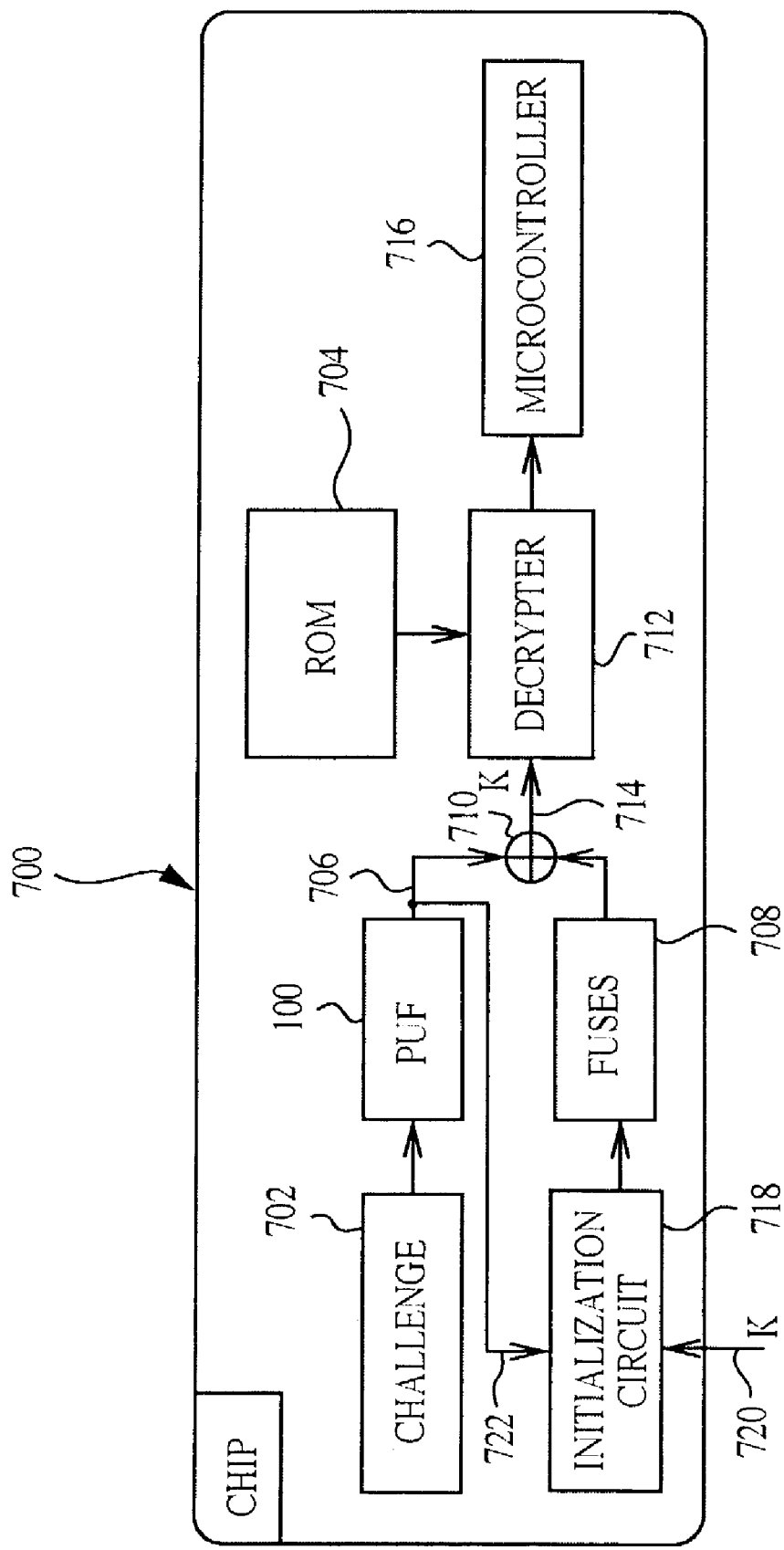

Referring to FIG. 50B, a CPUF chip 700 contains a PUF circuit 100 that generates a response used to decrypt content that is stored in a ROM 704. PUF The content in ROM 704 is encrypted using a k-bit key K. PUF circuit 100 is hard-wired to receive a challenge 702 stored on chip 700, and output a k-bit response on line 706. The response on line 706 is combined with the contents of fuses 708 through an exclusive-or operation to produce key K on line 714. The fuses represent '0' or '1' depending on whether it is burned out or not. A decrypter 712 receives the key K and decrypts the contents of ROM 704. The contents of ROM 704 can be, e.g., a program. A microcontroller 716 performs computations according to the decrypted content.

A number of chips 700 are fabricated based on a common design. To reduce the cost of fabricating these chips, the same ROM 704 is used for each chip 700, so the key K is the same for all chips. The response from the PUF circuit 100 is different for each chip, but by setting the fuse bits appropriately for each chip, the key that is sent to decrypter 712 through line 714 can be set to be the same key that is needed to decrypt the content of ROM 704.

In one example of fabricating the chips, the fuse bits are set while the chip is in testing by the manufacturer. An initialization circuit 718 receives the key K from the manufacturer through line 720, and receives the response from PUF circuit 100 through line 722. Initialization circuit 718 calculates the fuse bits that is needed to generate the correct key K, and burns the fuses 708 accordingly. In this way, the response from PUF circuit 100 never leaves chip 700.

Chip 700 cannot be cloned. Even if an adversary is able to determine the state of the fuses, he cannot determine the response of PUF circuit 100. Thus, the value of K can remain secret.

PUFs Using Synchronous Logic Circuit

A PUF circuit may be implemented using a clocked circuit so that the output of the circuit in response to an input is different when the period of the clock cycle is different. When a set of integrated circuit chips having clocked circuits are fabricated using a set of lithography masks, each chip is unique in its delay characteristics due to variations in manufacturing across different dies, wafers, and processes. The clocked circuit is designed on assumption that certain timing constraints are met. The delays of components and wires are characterized for worst-case behavior, and the clock period is selected to be larger than the worst-case delay over all register-to-register paths, taking into account the hold time and setup time constraints of the registers. When the clock period is sufficiently large, despite the variations in the delay characteristics, different chips will have the same combinational logic functionality. By purposely decreasing the period of the clock signal driving the clocked circuit so that the timing constraints are not met, different chips with the exact same functionality will have different behaviors because their delay characteristics are different.

To identify a given chip, a sequence of input stimuli is sent to the chip. A clock period is selected so that the input stimuli stimulates particular wires and gates. The output response of the chip is sampled at a particular time. By ensuring that the input stimuli exercises a large number of paths in the chip and choosing the sampling time appropriately, the output response will depend on the delays of a large number of gates and wires in the chip. The input stimuli and associated response of the chip become the secret signature of the chip.

The number of paths in the chip grows exponentially with the number of inputs or gates in the chip. Given an input stimulus, the delay of some subset of gates will determine the output response of the chip. Because there is an exponential number of input stimuli, it is very difficult to guess which stimuli were used to create the signature.

Figure 51:
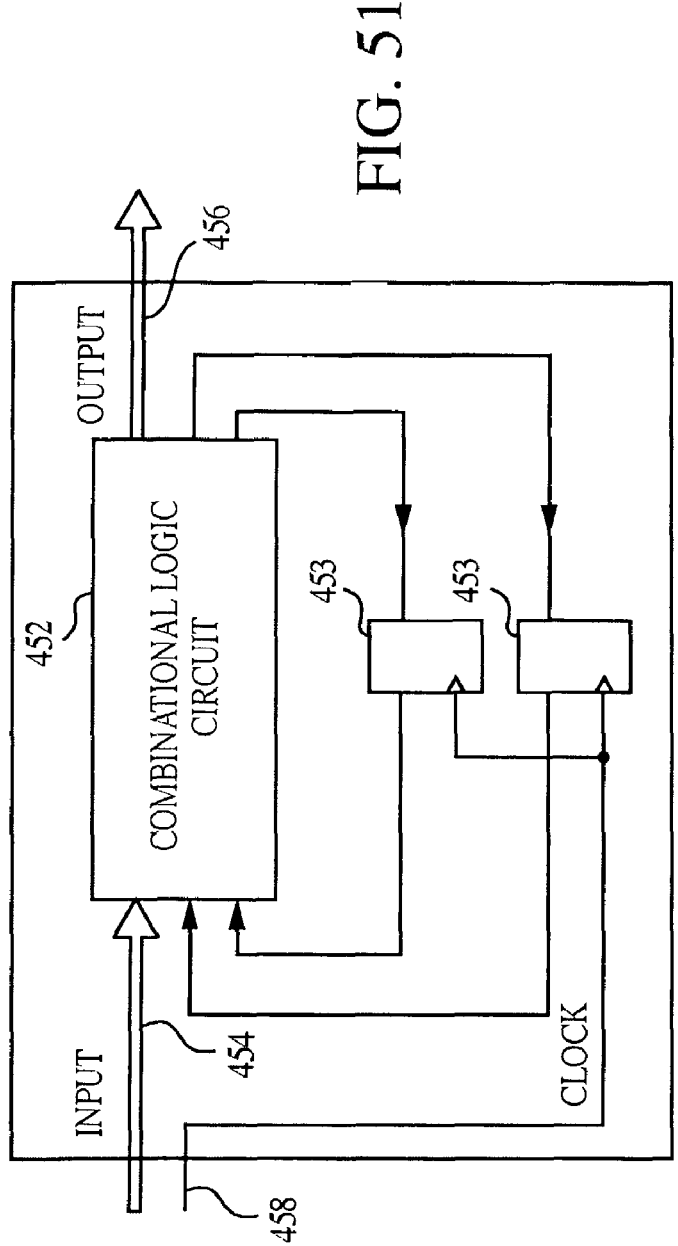
FIGS. 51-53 show PUF circuits.

Referring to FIG. 51, a PUF circuit 450 can be represented by a combinational logic circuit 452 with feedback loops broken by registers 453. Circuit 452 maps an input bit-vector on a line 454 to an output bit-vector on a line 456. The mapping depends on the period of a clock signal on a line 458. By varying the period of the clock signal, the same input bit-vector will stimulate different wires and components in circuit 452 to produce a different output bit-vector in an unpredictable way. The unpredictability comes from the variations in the circuit due to variations in the fabrication process. Also, the delay of each gate, wire, or path is a complex function of transitions on nearby wires, the values of capacitances being discharged and charged by the input stimulus.

To use PUF circuit 450, the input stimuli on line 454 and the period of clock signal on line 458 are chosen so that variations in the clock signal will produce different outputs on line 456. Assume that the input on line 454 is an n-bit wide bit-vector, and the output on line 456 is an m-bit wise bit-vector. The input signal on line 454 is a sequence of input transitions (i.e., from low to high or high to low). For example, if line 454 is 3-bit wide, then an example of a sequence of 3 transitions is ⟨1,0,1⟩→⟨0,0,0⟩→⟨1,1,0⟩. The number of sequences of input transitions is exponential in the number of transitions, and each sequence of input transitions can correspond to different clock periods. The different input stimuli and responses are used as the secret signature of PUF circuit 450.

Secret Signature

In general, the secret signature can be viewed as a set of signatures $\{S\}$, where each signature $s_j \in S$ includes $\langle V_i^j, \text{clock\_period}_i^j, O_i^j \rangle$, $1 \leq i \leq K_j$.

$$V_i^j = (v_{i1}^j, \ldots, v_{iK_j}^j)$$

is a sequence of inputs to the circuit, where each $$v_{ik}^j$$

is an n-bit vector applied to the n inputs of circuit 452. $\{O_i^j\}$ is the sequence of output responses of the circuit, and is a vector of $K_j$ bit-vectors generated at the m-bit outputs. Clock_period$_i^j$ is the clock period that the circuit is to be clocked at. $\{V_i^j, \text{clock\_period}_i^j\}$ will be referred to as an input stimulus, and $\{O_i^j\}$ will be referred to as the circuit response. To determine $\{O_i^j\}$, $\{V_i^j\}$ is applied to the circuit using $\{\text{clock\_period}_i^j\}$ as clock period, and the output of circuit 452 on line 456 is measured. The input stimulus and circuit responses are stored in a secure location and indexed by a serial number of chip 450.

When a chip that claims to be "foo" needs to be authenticated by an authenticating authority (AA), the AA selects a signature $s_j$ from the set of signatures $\{S\}$ that is indexed to the serial number of the chip "foo". The AA uses the input stimulus $\{V_i^j, \text{clock\_period}_i^j\}$ to stimulate the chip and measures a response from the chip. If the measured response is different from $\{O_i^j\}$, then the chip is not "foo". If the responses match, then AA repeats the process with a different signature $s_{j'}$.

The probability that $\{O_i^j\}$ is the same for two distinct chips depend on the number of delay relationships that need to be satisfied in order for the two chips to have the same responses. For example, a path delay may have to be less than the clock period or more than the clock period by a certain amount so as to prevent the output from producing a glitch, i.e., go from 0 to 1 and back to 0, or vice versa. As another example, for two sub-paths of a circuit to maintain their relative relationship across different chips, their delays may have to differ by an amount greater than 5%.

As an illustration, let $K_j=2$ and assume that a $\langle v_{i1}, v_{i2} \rangle$ input pair causes a single transition to propagate through a single path in the chip to the output. If the delay of the path is D, then depending on whether D$\leq$clock_period$_2$ or D>clock_period$_2$, different responses will result. Assume that the AA uses a pair of signatures from S, the secret signature of the chip "foo", and that the pair of signatures are $\{\{\{w_a, w_b\}, D-\epsilon, \{o_c, o_d\}\}, \{\{w_a, w_b\}, D+\epsilon, \{o_c', o_d'\}\}\}$. For the input stimulus in the first signature, the transition along the path in the chip will not make it in time to be clocked. For the input stimulus in the second signature, the transition will make it in time. In this case, the output response will be different for the two stimuli when they are applied to the chip "foo".

If the adversary wishes to produce a counterfeit chip "bar", the delay of its path has to be in the interval $(D-\epsilon, D+\epsilon]$ to produce the same output response as "foo" for both stimuli. The smaller $\epsilon$ is, the lower the probability that this can be achieved. Let the probability of the two chips producing the same output response for the pair of signatures as $p_i$. It is clear that $p_i < 1$. If there are T pairs of signatures like these for T different paths, then the probability that the counterfeit will have the same signatures will be $p_i^T \to 0$, as T grows large, assuming that the delays of the paths are independent—which will be true if the paths do not share any devices or wires.

By using input stimuli in the secret signature that sensitize multiple paths, the computational barrier presented to the adversary is increased. While there will still be a single transition at the output, there will be more devices and wires, whose delays affect the time that the transition occurs. This can decrease the probability that two chips have the same response to a signature.

Consider that the delay of each gate and wire in a set of chips fabricated with the same set of lithography masks follows a normal distribution with a mean of 1 ns, and a standard deviation of 0.05 ns. If a path is a sequence of 100 gates and wires, then the path delay follows a normal distribution with mean of 100 ns and a standard deviation of 0.5 ns. Assume that the path in the given chip has a delay equal to the mean of 100 ns. Then, the probability of another IC has a path delay within 0.5 ns of 100 is 0.68. Assuming a measurement accuracy of 0.5 ns, the probability that these two chips will produce the same output for a single stimulus is 0.68. If 64 input stimuli are applied to sensitize 64 different sets of paths, then the probability that outputs for 64 stimuli are all the same is less than $10^{-10}$. Therefore, given the original chip with the mean path delay, the probability that one or more of a million chips fabricated using the same lithography masks have the same signature is approximately $10^6 \times 10^{-10} = 10^{-4}$.

To compensate for temperature changes, when signatures are generated for chip 450 in FIG. 20, different signatures are generated for different temperatures. During authentication, the signature of a particular chip at a particular temperature is used.

To make the adversary's task more difficult, conducting particles can be scattered in the chips packaging so that the delays of gates and wires has a small dependence (e.g., +/−5%) on the packaging used.

Figure 52:
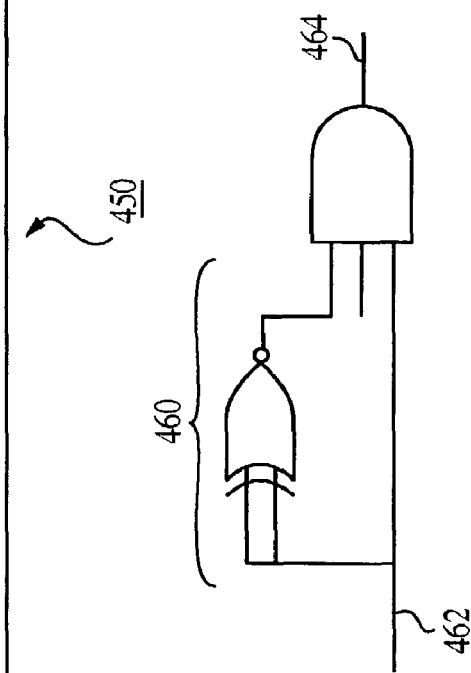

Referring to FIG. 52, a "glitch generator" 460 may be added to make a path (e.g., from a line 462 to a line 464) non-single event sensitizable. A path P is "single event sensitizable" if there exists an input vector pair such that under arbitrary delays in the circuit, the event propagates along the path P. Doing so prevents the adversary from obtaining an affine system of equations by applying input stimuli and measuring output path delays, and solving the equations to create a model of the gate and wire delays.

Example Circuit

Figure 53:
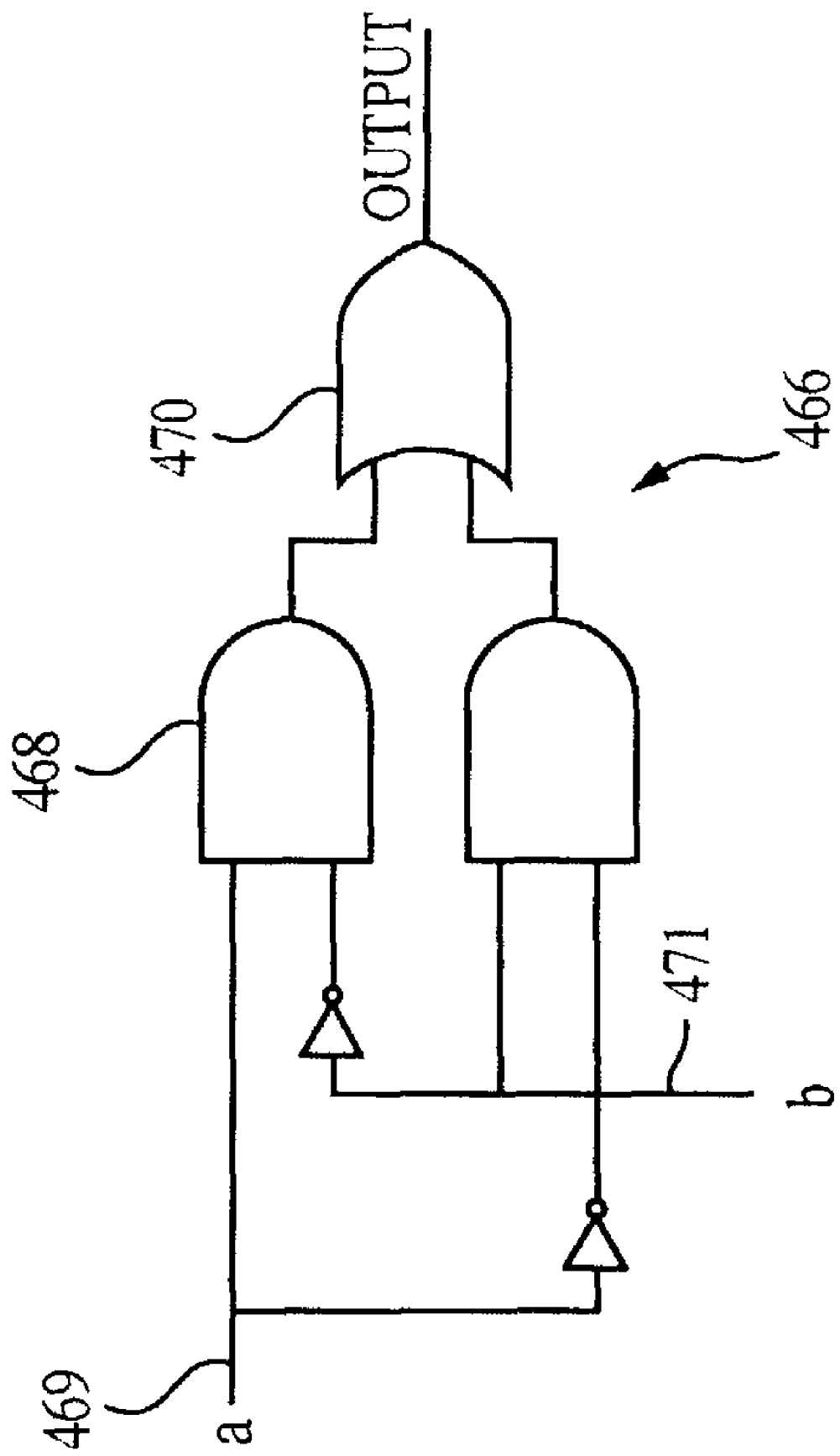

Referring to FIG. 53, a circuit 466 implements the function $f(a,b) = a \oplus b$. Assume that circuit 466 is part of a clocked circuit, and that the output of circuit 466 is used by another circuit one clock cycle after input signals a and b appear on lines 469 and 471, respectively. Depending on the length of the clock cycle, the output of circuit 466 would be different. Assume that the delays in the gates, including the inverters, are all 1, and the delays of the wires are 0. If the circuit is clocked at clock_period$\geq$3, then circuit 466 will respond like $f(X)$ for all X. Assume that Y=⟨a=0,b=0⟩. If X=⟨a=0,b=1⟩ is applied after Y and the clock period is clock_period$\geq$2, the output of circuit 466 will be 1, the same as $f(X)$. However, if circuit 466 is clocked with a period such that 1$\leq$clock_period<2, the output will be 0. If the clock period is chosen to be 1.95, then it is possible that a different circuit fabricated using the same lithography masks will still produce 1 as output for the sequence of (Y, X) pair above, if the delay of either the top AND gate 468 or the OR gate 470 is less than 0.95.

If Y=⟨a=1,b=0⟩ is applied, followed by X=⟨a=0,b=1⟩, then ƒ(X)=1. The output of circuit 466 is 1 if clock_period≧3, the output is 0 if 2≦clock_period<3, and output is 1 if clock_period<2.

Choosing Input Stimulus and Clock Period

To determine which stimuli and clock period to use for a given PUF circuit, a model of the PUF circuit having approximate delays of the wires and gates in the chip can be used. Let the timing-approximate model be called $A_f$. An analysis can be performed on the model $A_f$ and find what the waveform at the output would look like for any input stimulus, i.e., vector pair. This analysis takes linear time in the size of the chip. A particular transition in the output waveform can be chosen. Two clock periods is chosen, one ∈ before the transition and ∈ after the transition. A transition is selected such that the output is steady for a time larger than ∈ on either side of the transition. The PUF circuit is then verified to ensure that the PUF circuit produces the same response as $A_f$ for the chosen input stimulus and clock periods. If the responses are the same, ∈ can be made smaller and the verification is repeated. If the responses are different, the clock periods or input stimulus is changed and the verification is repeated.

The set of signatures needs to be large enough such that the probability of two chips producing the same response to the input stimuli in the signature is very small. For a probability of $10^{-10}$, 64 stimuli is required. The storage requirements of the signature is largely dictated by the size of the input stimulus in each signature, which is $$\sum_j N \times K_j$$

bits, where N is the number of inputs to the chip, and $K_j$ is the length of the input stimulus of the $j^{th}$ signature. The number of inputs N is limited by the package. Usually, N≦500 and $K_j$≧2.

The PUF chip may have a global reset that places it in a known state. Otherwise, a transfer sequence that places the chip in a known state can be applied before the first signature is applied. Assume $K_j$=2, one authentication requires about 100 kilobytes to store the set of signatures.

Other Implementations

A number of examples of the invention have been described. Nevertheless, it will be understood that various modifications may be made without departing from the spirit and scope of the invention. For example, in FIG. 13A, the random hash module $h_3$ 192 may be replaced by a "distance d encoder." Such an encoder implements a mapping such that images of different elements always differ on at least d bits, which means that at least d bits of the input to the PUF circuit 188 cannot be directly chosen by the attacker.

In FIG. 14, the functional module 52 and the control module 54 may be implemented using a single microprocessor. The microprocessor performs computations and processing of data based on the software codes it receives. In FIG. 50, a simpler CPUF chip can be constructed by using one constant (e.g., the chip serial number) that is passed through a hash function to become the prechallenge used by control module 54 to generate the challenge to PUF circuit 100. Integrated circuit 102 may include more than one self oscillating loop circuits 114 to allow measurement of many signal delays simultaneously. Delay circuit 116 may be replaced by other types of circuits in which the delay is a complicated function of the challenge. In some CPUF implementations where it is not necessary to execute arbitrary algorithms, the program's actions may be implemented in hardware. The functional circuitry and the PUF does not have to be on the same chip; they can reside on different semiconductor chips in a multi-chip module. The input and output of the PUF circuit may be analog values rather than digitized values.

Figure 54:
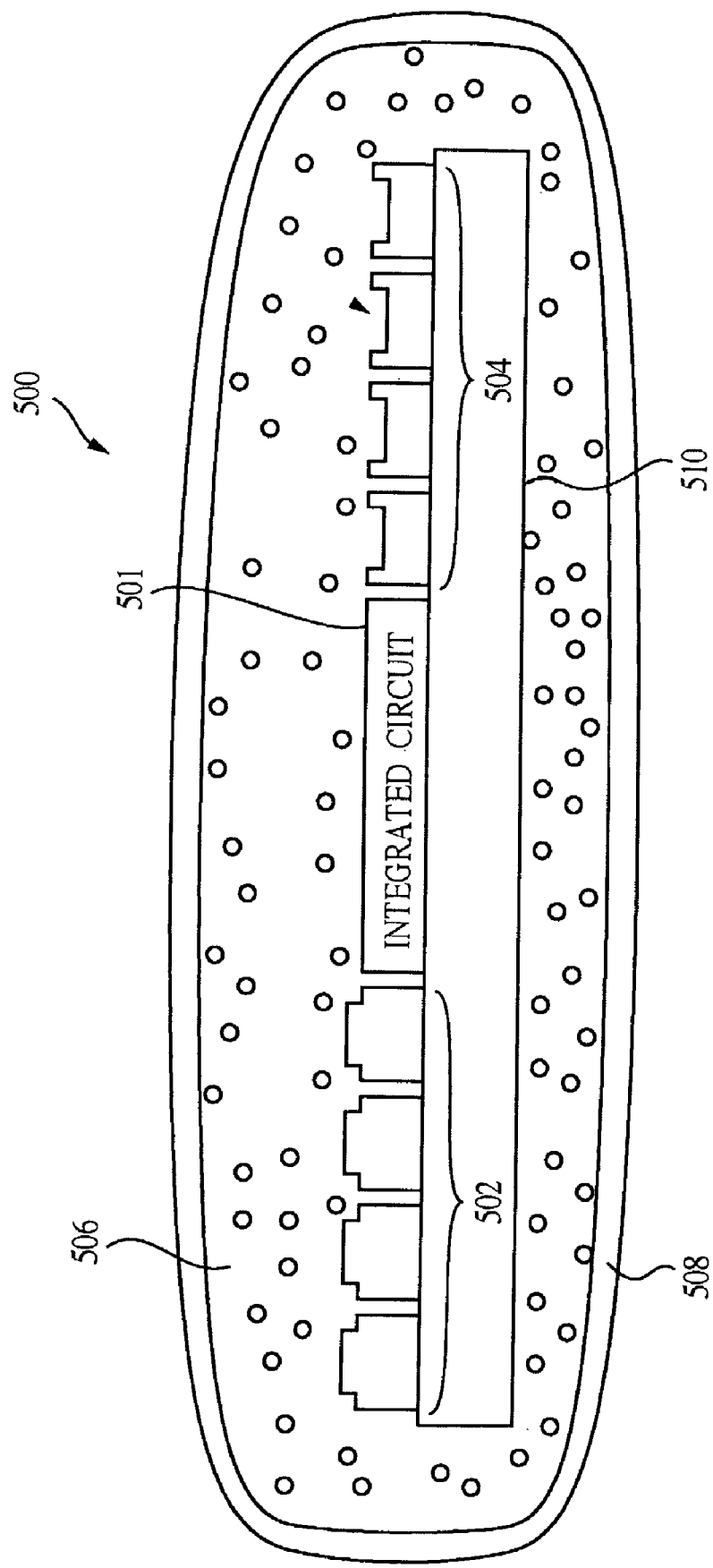
FIG. 54 shows a PUF device.

The measurable physical characteristics may be characteristics other than path delays. For example, referring to FIG. 54, PUF device 500 includes an integrated circuit 501, a light emitting diode (LED) array 502 and a charged coupled device (CCD) array 504, all of which are fabricated on a substrate 510. An epoxy 506 encloses the LED array 502 and CCD array 504. Epoxy 506 is coated with a reflective layer 508 so that light emitted by the LEDs of array 502 will be reflected by reflective layer 508 and detected by CCD array 504. As the light passes through epoxy 506, a speckle pattern that is unique to epoxy 506 will be detected by CCD array 504. When different combinations of LEDs in LED array 502 is illuminated, CCD array 504 will detect different speckle patterns. Only a few LEDs are turned on at the same time to maintain the contrast of the speckle pattern.

When several PUF devices are fabricated, the epoxy layer will have a slightly different optical transmission property for each device. Thus, the same combination of LEDs will produce different speckle patterns at the CCD array for different devices. A control signal that determines the combination of LEDs can be seen as a "challenge", and the pattern detected by CCD array 504 can be seen as a "response." Such challenge-response pairs can be used to authenticate the identity of PUF device 500. An advantage of using epoxy is that epoxy is stable through a substantial range of temperature. Thus, circuit for compensating effects of environmental variations can be made simpler.

Figure 55:
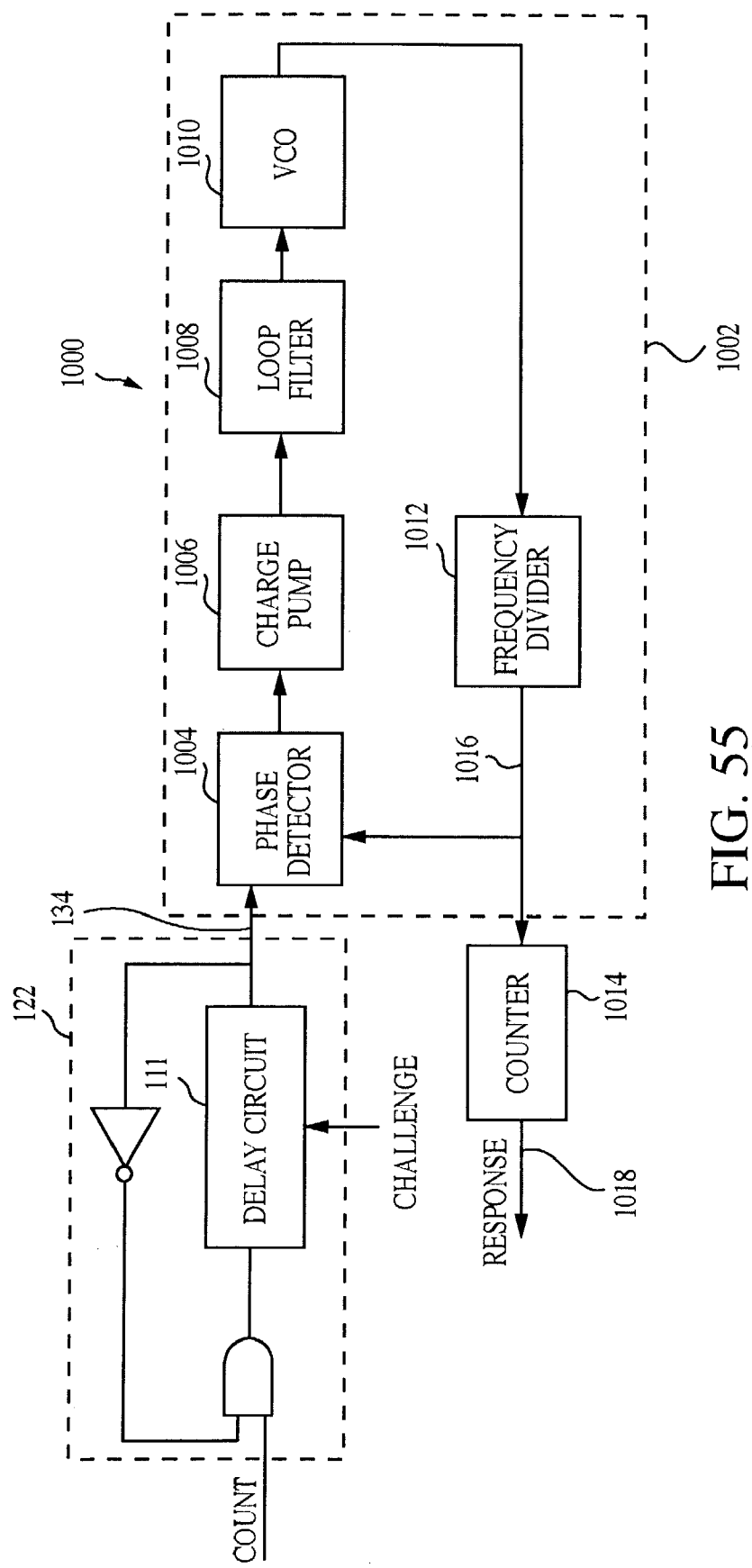
FIG. 55 shows a PUF circuit using a PLL to measure oscillation frequency.

An alternative method of measuring the oscillation frequency of the oscillating loop 122 in PUF circuit 101 of FIG. 3 is to use a phase lock loop (PLL) circuit. Referring to FIG. 55, a PUF circuit 1000 includes an oscillator loop 122 and a PLL circuit 1002 used to measure the oscillation frequency of the oscillator loop. Oscillator loop 122 includes a delay circuit 111 that receives an input (or challenge). PLL circuit 1002 includes a phase detector 1004, a charge pump 1006, a loop filter 1008, a voltage controlled oscillator (VCO) 1010, a frequency divider 1012, and a counter 1014. Frequency divider 1012 generates an output on signal line 1016, which is sent to phase detector 1014. By comparing the signal on line 1016 with the signal on line 134 (which comes from oscillating loop 122), PLL circuit 1002 settles to a state in which the signals on lines 1016 and 134 have the same frequency. Counter 1014 determines the frequency, and generates an output on line 1018 which becomes the output (or response) of PUF circuit 1000.

Figure 56:
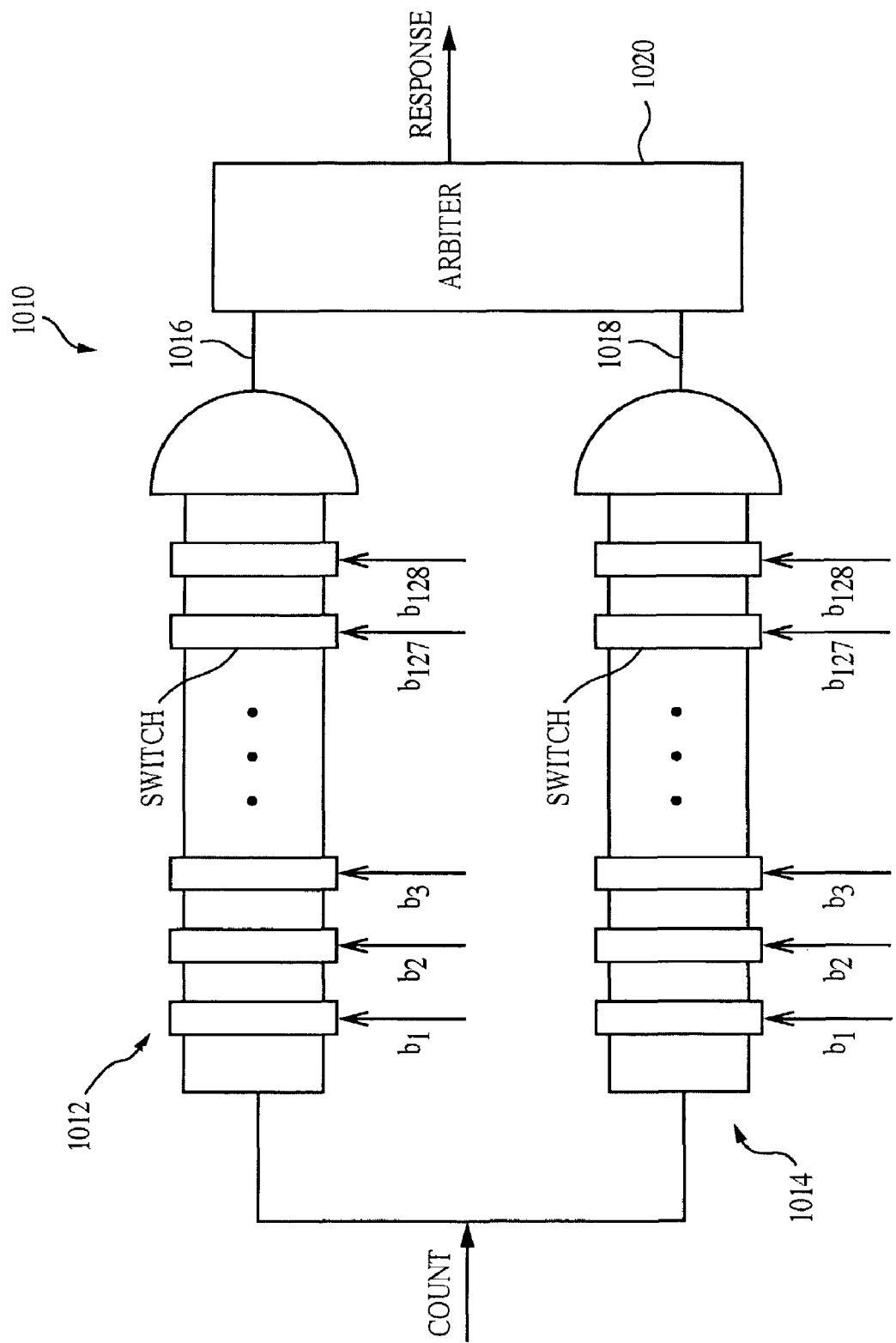
FIG. 56 shows a PUF circuit.

Referring to FIG. 56, a PUF circuit 1010 includes a delay circuit 1012 and a delay circuit 1014. Each of delay circuits 1012 and 1014 receives an 128-bit challenge that selects one of $2^{128}$ signal paths in the delay circuit. A transition (rising or falling edge) of a "Count" signal is sent to both delay circuits 1012 and 1014. The rising edge passes through the signal paths in delay circuits 1012 and 1014, and exits the delay circuits at lines 1016 and 1018, respectively. The signals on lines 1016 and 1018 are sent to an arbiter 1020, which produces a "1" if a transition on line 1016 arrives faster than a transition on line 1018, and produces a "0" if the transition on line 1018 arrives faster.

A one-bit digital response can be obtained without measuring oscillation frequency. This circuit produces a compensated value directly since temperature variations will have the same effect on delay circuits 1012 and 1014. Transitions in delay circuits 1012 and 1014 are both sped up (or slowed down) and will not change the output value. An arbiter is a simple circuit that can be realized using a flip-flop with the two inputs being the data input and the clock input. If the data arrives before the clock, the flip-flop produces a 1, else 0. Here, the signal on line 1016 is used as the data input, and the signal on line 1018 is used as the clock input. To produce a 64-bit response, sixty-four 128-bit challenges are sent through the PUF circuit 1010.

In FIG. 14, functional module 52 and control module 54 were implemented as software subroutines that are run on microprocessor 51. In an alternative example, the functional module 52 and control module 54 can be implemented using dedicated hardware circuits.

In FIGS. 16, 17, 19-22, 25, and 27-29, the PUF circuit 100 can be replaced by an improved PUF circuit 186 (FIG. 13A).

In FIG. 50, the control circuit 54 and functional circuit 52 may be replaced by a microcontroller that receives program codes and perform control and computational functions.

Accordingly, other embodiments are within the scope of the following claims.

The invention claimed is:

1. A method for authentication of a first device from a group of devices fabricated based on a common design, each device implementing a first function the method comprising:
   authenticating the first device by application of the first function whose output depends on an applied multiple bit digital input and on a fabrication characteristic of an integrated circuit that varies among devices in the group of devices as a result of random variations in fabrication of the integrated circuits of the devices, including
   receiving a signal at the first device that encodes a first identifier,
   applying a one-way function using the first identifier as an argument to produce an output of the one-way function, and
   applying the first function to the output of the one-way function.

2. The method of claim 1 wherein applying the one-way function further uses a second identifier as an argument.

3. The method of claim 2 wherein the second identifier includes an identification of the device.

4. The method of claim 3 wherein the identification of the device includes a serial number stored in the device.

5. The method of claim 2 wherein the second identifier includes an identification of a personality number.

6. The method of claim 1 further comprising:
   determining response information using the result of applying the first function to the first identifier; and
   transmitting a response signal from the first device encoding the response information.

7. The method of claim 6 wherein determining the response information includes applying a one-way function using the result of applying the first function to the first identifier as an argument.

8. The method of claim 7 further comprising providing a result signal encoding a result generated by the device, and wherein applying the one-way function further uses an argument determined from the result.

9. The method of claim 7 further comprising accepting code for executing an operation on a processor in the device, and wherein applying the one-way function further uses an argument determined from the code.

10. The method of claim 7 further comprising accepting a command for execution in the device, and wherein applying the one-way function further uses an argument determined from the command.

11. The method of claim 10 wherein providing the response signal includes providing an acknowledgement that the command was executed in the device.

12. A method for authenticating a first device from a group of devices fabricated based on a common design, each device implementing a function, the method comprising:
   in a first operating mode,
      accepting a first signal at the first device encoding a first identifier,
      applying a first one-way function using the first identifier as an argument,
      applying the result of the first one-way function to the function whose output depends on an applied multiple bit digital input and on a fabrication characteristic of an integrated circuit that varies among devices in the group as a result of random variations in fabrication of the integrated circuits of the devices, and
      providing a first response signal that encodes the result of applying the first one-way function and the result of the function whose output depends on the fabrication characteristic of an integrated circuit; and
   in a second operating mode,
      accepting a second selection signal at the first device encoding a second identifier,
      applying the function whose output depends on the fabrication characteristic to the second identifier,
      applying a second one-way function using the result of applying the function whose output depends on the fabrication characteristic as an argument, and
      providing a second response signal that encodes the result of applying the second one-way function.

13. The method of claim 12 wherein the second identifier is the same as the result of applying the first one-way function using the first identifier as an argument.

14. A method, comprising:
   providing a first device from a group of devices fabricated based on a common design, each device implementing a first function whose output depends on an applied multiple bit digital input and depends on a fabrication characteristic of an integrated circuit that varies among devices in the group as a result of random variations in fabrication of the integrated circuit of the device, each device having a processor;
   accepting code for executing an operation on a processor of the first device;
   applying a one-way function using a first argument determined from the code; and
   providing from the first device a result that depends on the result of applying the one-way function and on an application of the first function whose output depends on the characteristic that is unique to the device.

15. The method of claim 14 wherein applying the one-way function further comprises using a second argument determined by application of the first function whose output depends on the characteristic that is unique to the device.

16. The method of claim 15 wherein the code comprises a public encryption key.

17. The method of claim 16, further comprising determining the second argument by using the public encryption key to encrypt a value derived from the measured characteristic.

* * * * *